(12) United States Patent
Asano et al.

(10) Patent No.: US 7,346,170 B2
(45) Date of Patent: Mar. 18, 2008

(54) INFORMATION PROCESSING SYSTEM AND METHOD

(75) Inventors: Tomoyuki Asano, Kanagawa (JP); Yoshitomo Osawa, Kanagawa (JP); Tateo Oishi, Saitama (JP); Ryuji Ishiguro, Tokyo (JP); Ryuta Taki, Kanagawa (JP)

(73) Assignee: Sony Corporation (JP)

( * ) Notice: Subject to any disclaimer, the term of this patent is extended or adjusted under 35 U.S.C. 154(b) by 793 days.

(21) Appl. No.: 10/204,731

(22) PCT Filed: Dec. 21, 2001

(86) PCT No.: PCT/JP01/11236

§ 371 (c)(1),
(2), (4) Date: Jan. 23, 2003

(87) PCT Pub. No.: WO02/052780

PCT Pub. Date: Jul. 4, 2002

(65) Prior Publication Data

US 2003/0185396 A1    Oct. 2, 2003

(30) Foreign Application Priority Data

Dec. 26, 2000   (JP)   ............................. 2000-395844

(51) Int. Cl.
*H04L 9/00*   (2006.01)
*H04K 1/00*   (2006.01)
(52) U.S. Cl. .................... 380/278; 713/177; 705/51
(58) Field of Classification Search ............. None
See application file for complete search history.

(56) References Cited

U.S. PATENT DOCUMENTS 5,748,736 A    5/1998   Mittra 6,049,878 A    4/2000   Caronni et al.

(Continued)

FOREIGN PATENT DOCUMENTS

JP    11-187013 A1    7/1999

(Continued)

OTHER PUBLICATIONS

Wong, C. k. ,et al., "Secure Group Communications Using Key Graphs", In: Proceedings of ACM SIGCOMM'98, (1998), pp. 68 to 79.*

(Continued)

*Primary Examiner*—Christopher Revak
(74) *Attorney, Agent, or Firm*—Lerner, David, Littenberg, Krumholz & Mentlik, LLP

(57) ABSTRACT

An information processing system and method are disclosed in which information processing is performed using an enabling key block (EKB) in association with a tree structure including category subtrees. A key tree is produced, which include subtrees that are grouped in accordance with categories and are managed by category entities. The EKB includes data produced by selecting a path in the key tree and encrypting a higher-level key in the selected path using a lower-level key in the selected path. The EKB is then provided to a device. A requester, which requests production of the EKB, may produce a root key or may request a key distribution center (KDC) to produce a root key. If the (KDC) produces the EKB, it may also request a category entity to produce a sub-EKB.

17 Claims, 64 Drawing Sheets

U.S. PATENT DOCUMENTS

| | | | |
|---|---|---|---|
| 6,240,188 B1* | 5/2001 | Dondeti et al. | 380/284 |
| 6,880,081 B1* | 4/2005 | Itkis | 713/163 |
| 6,911,974 B2* | 6/2005 | Asano et al. | 345/204 |
| 7,043,024 B1* | 5/2006 | Dinsmore et al. | 380/278 |
| 7,167,564 B2* | 1/2007 | Asano et al. | 380/279 |
| 7,269,257 B2* | 9/2007 | Kitaya et al. | 380/45 |
| 2002/0147906 A1* | 10/2002 | Lotspiech et al. | 713/158 |
| 2002/0150250 A1* | 10/2002 | Kitaya et al. | 380/277 |
| 2003/0044017 A1* | 3/2003 | Briscoe | 380/277 |
| 2003/0161474 A1* | 8/2003 | Matsuzaki et al. | 380/277 |
| 2003/0185396 A1* | 10/2003 | Asano et al. | 380/277 |
| 2005/0060334 A1* | 3/2005 | Kawamoto et al. | 707/102 |
| 2005/0210014 A1* | 9/2005 | Asano | 707/3 |
| 2005/0234949 A1* | 10/2005 | Asano | 707/101 |

FOREIGN PATENT DOCUMENTS

| | | |
|---|---|---|
| WO | WO-01/03364 A1 | 1/2001 |
| WO | WO-01/03365 A1 | 1/2001 |

OTHER PUBLICATIONS

Canetti, R. et al. "Multicast Security: A Taxonomy and Some Efficient Constructions", IEEE (1999), pp. 708-716.*

Poovendran, R. et al. "An Information Theoretic Analysis of Rooted-Tree Based Secure Multicast Key Distribution Schemes", Lecture Notes in Computer Science (1999), vol. 1666, pp. 624-638. □□.*

Dondeti, L. R., et al., "A Duel Encryption Protocol For Scalable Secure Multicasting", In: Proceedings of IEEE international Symposium On Computers And Communications, (1999), pp. 2 to 8, Anatomy of the dual encryption protocol.

Moyer, et al., "A Survey Of Security Issues In Multicast Communications", IEEE Network, Nov./Dec. 1999, vol. 13, No. 6, pp. 12 to 23.

Waldvogel, M., et al., "The VersaKey Framework: Versatile Group Key Management", IEEE Journal on Selected Areas In Communications, Sep. 1999, vol. 17, No. 9, pp. 1614 to 1631.

Wong, C. k.,et al., "Secure Group Communications Using Key Graphs", In: Proceedings of ACM SIGCOMM'98, (1998), pp. 68 to 79, (http://www.acm.org/sigcom/sigcom98/tp/technical.html).

Wallner et al., "Key Management for Multicast: Issues and Architectures", Network Working Group, Jul. 1, 1997.

* cited by examiner

FIG. 4

(A) EKB (ENABLING KEY BLOCK): EXAMPLE 1

NODE KEYS OF VERSION OF t ARE TRANSMITTED TO DEVICES 0, 1, AND 2

| VERSION: t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

(B) EKB (ENABLING KEY BLOCK): EXAMPLE 2

NODE KEYS OF VERSION OF t ARE TRANSMITTED TO DEVICES 0, 1, AND 2

| VERSION: t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

FIG. 11
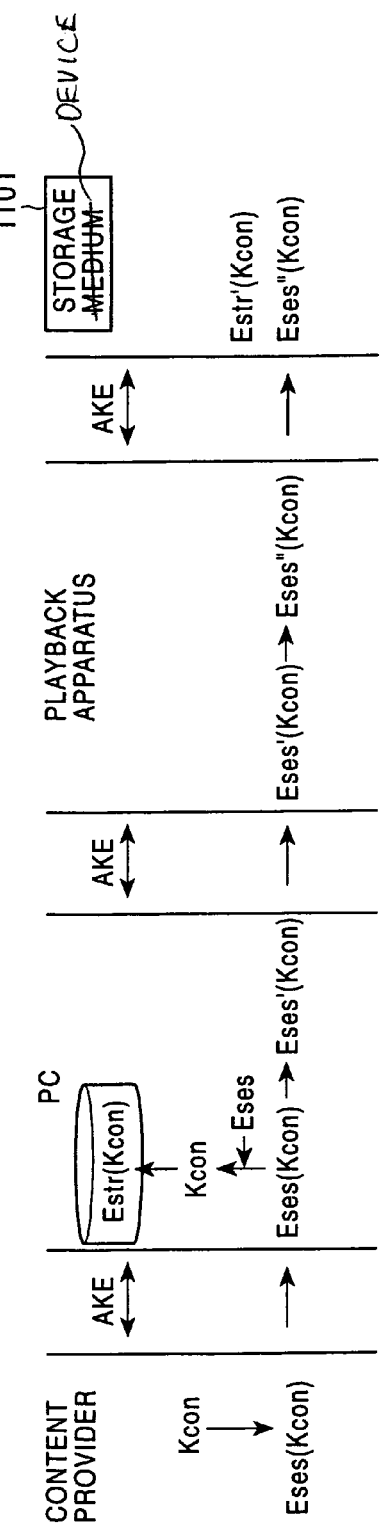
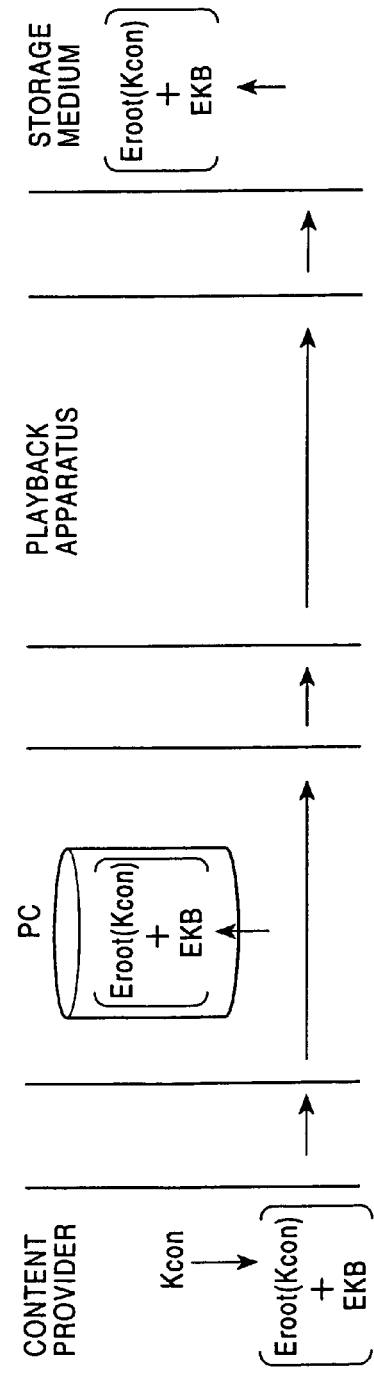
(a) TRANSMISSION OF A CONTENT KEY ACCORDING TO THE CONVENTIONAL TECHNIQUE
(b) TRANSMISSION OF A CONTENT KEY USING AN EKB

FIG. 24
(a)
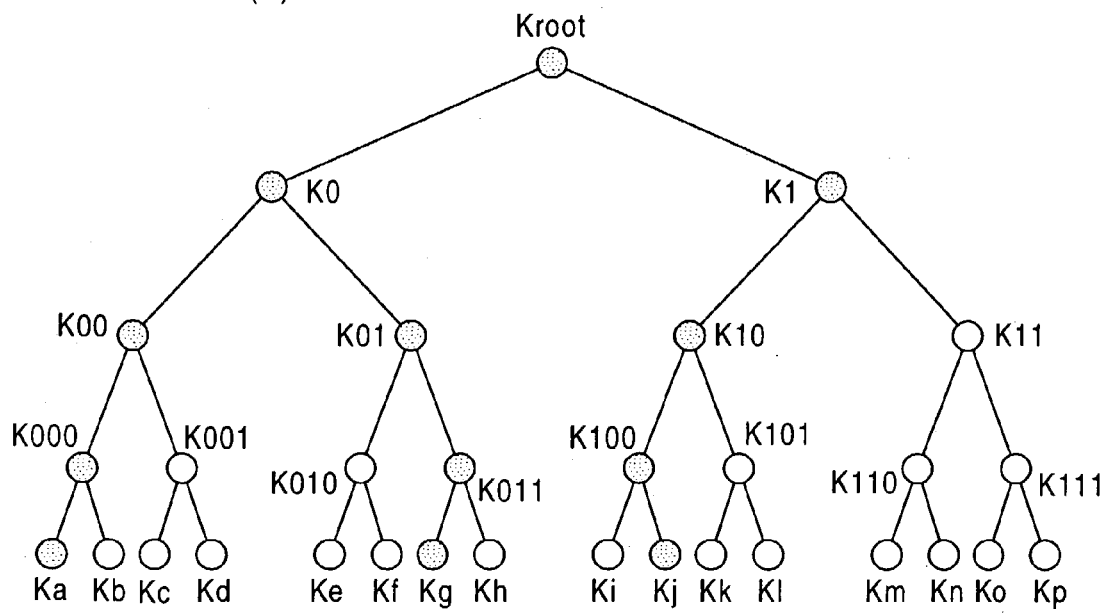
(b)
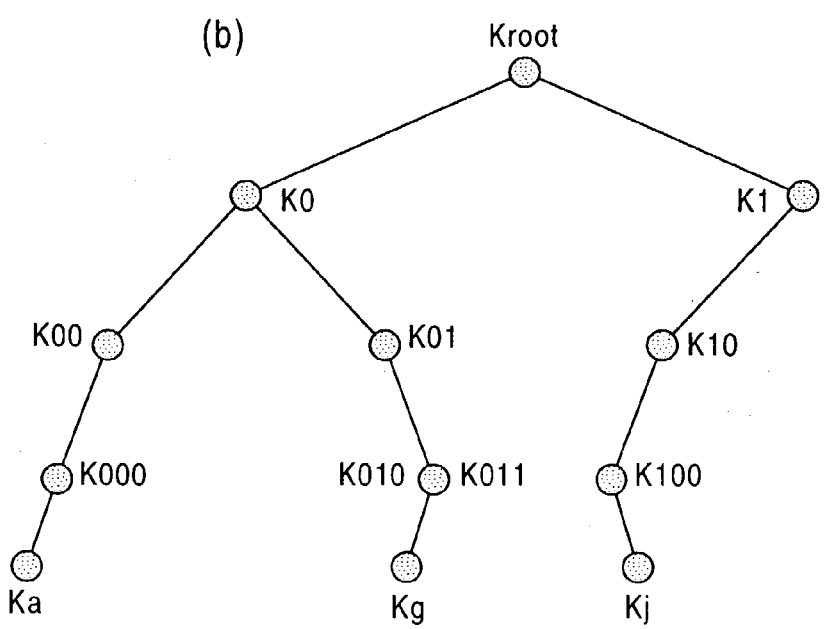

PROVISION OF RESERVED NODES

REVOCATION OF A DEVICE

EXAMPLE OF SETTING OF CAPABILITY OF EACH CATEGORY TREE

EXAMPLE OF SETTING OF CAPABILITY OF EACH CATEGORY TREE

FIG. 50

| EKB TYPE IDENTIFICATION NUMBER | NODE | DESCRIPTION |
|---|---|---|
| 1 | NODE ID OF MS | FOR MEMORY STICKS |
| 2 | NODE ID OF PHS | FOR PHS |
| 3 | NODE ID OF MS AND NODE ID OF PHS | FOR MEMORY STICKS + PHS |
| 4 | MD | FOR MD |
| 5 | · · · · · · | · · · · · · |

FIG. 56

SUB EKB IN FORMAT B
(NO DEVICES ARE REVOKED)

THE TAG PART OF THE SUB EKB IS GIVEN AS 110, 010, 000, 111, 111, AND THE KEY PART IS GIVEN AS Enc(K110, Kroot), Enc(K111, Kroot).

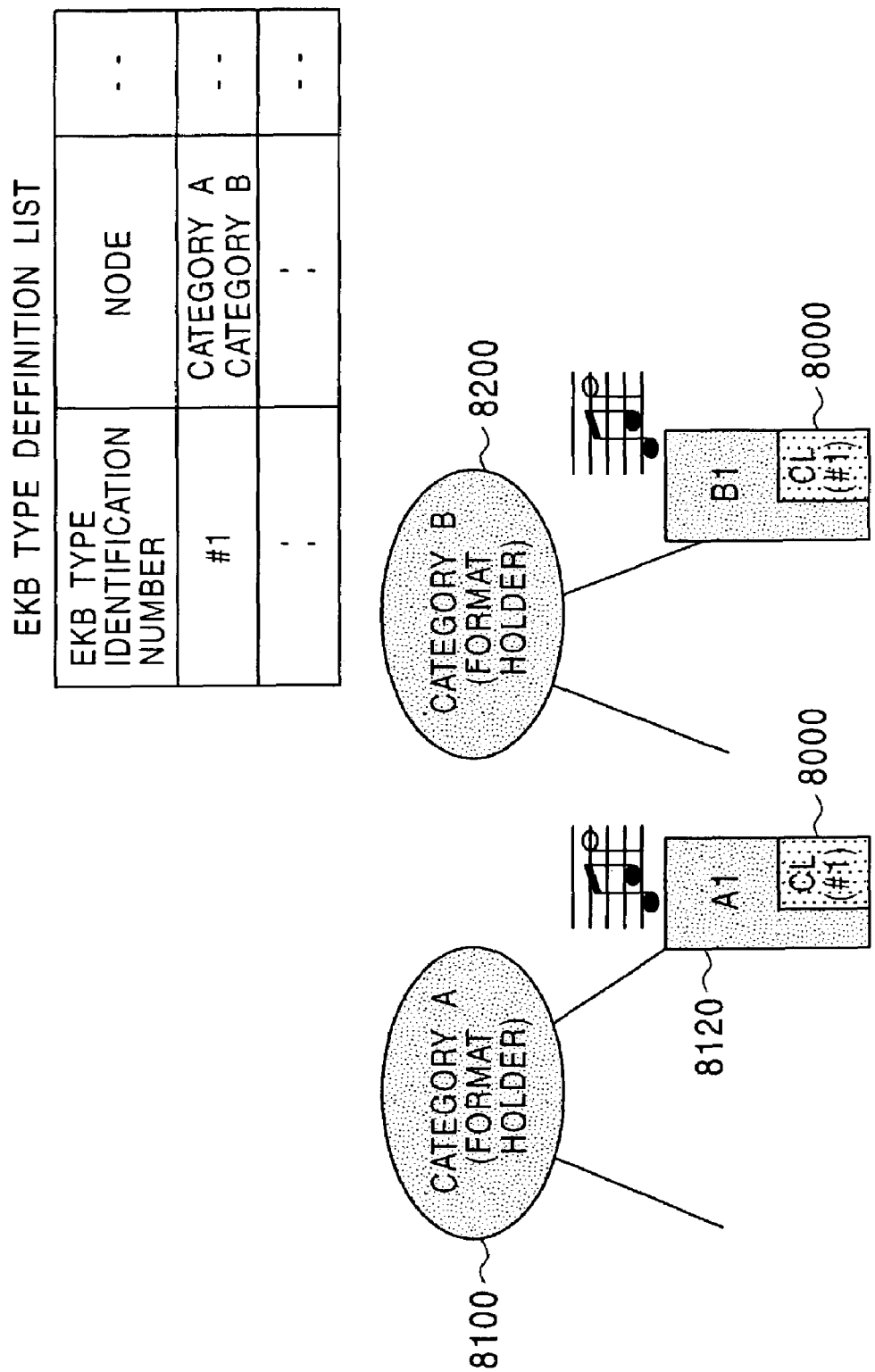

INFORMATION PROCESSING SYSTEM AND METHOD

BACKGROUND OF THE INVENTION

The present invention relates to an information processing system, an information processing method, and an information storage medium, and particularly to a data distribution system and method for providing various kinds of data such as content data to an authorized user by means of a process including a cryptographic process. More particularly, the present invention relates to an information processing system, an information processing method, and an information storage medium, in which a key block is produced using a hierarchical-tree key distribution technique depending on a device to which content is to be provided, and the key block is used in encryption of the content and also in transmission of a content key, thereby ensuring that the content, the content key, and other data are securely provided.

It is now very popular to distribute various kinds of software data such as a game program, audio data, and image data (hereinafter, such data will be referred to as content) via a network such as the Internet or via a distributable storage medium such as a DVD or a CD. After loading such content data onto a PC (Personal Computer) or a game machine of a user via data transmission, or after loading a storage medium on which content data is stored onto the PC or the game machine, the user can enjoy played-back content. Content stored on a storage medium may be stored into a storage device such as a memory card or a hard disk disposed in a PC or a recording/playing-back apparatus so that the content can be reproduced from the storage device.

An information apparatus such as a video game machine or a PC may include an interface for receiving content via a network or accessing a DVD or a CD, and further include a RAM, a ROM, or the like, used as a memory area for storing control means, a program, and data needed to reproduce content.

Various kinds of contents such as music data, video data, or a program may be read from a storage medium and played back on an information apparatus itself such as a game machine or a PC used as a playback device or played back on a display or by a speaker connected to the information apparatus. This may be done in response to a command input by a user directly to the information apparatus or indirectly via input means connected to the information apparatus.

In general, the right of distribution of software contents such as a game program, music data, or video data is held by producers or sellers of the software content. Software content is generally distributed under specific usage limitations to secure that only authorized users can use software content and that unauthorized copies thereof cannot be made.

One technique of limiting usage to specific users is to encrypt content. More specifically, content such as audio data, video data, or a game program is distributed via the Internet or the like after encrypting the content, and a decryption key, which is means for decrypting the encrypted content, is given only to authorized users.

The encrypted data can be converted into its original form (plaintext) by performing a predetermined decryption process upon the encrypted data. The technique of encrypting and decrypting information using an encryption key and a decryption key is well known in the art.

Various techniques of encrypting and decrypting data using an encryption key and a decryption key are known. One of them is a technique known as common key cryptography. In the common key cryptography, the same key, called a common key, is used as both an encryption key for encrypting data and a decryption key for decrypting the encrypted data. The common key is given only to authorized users so that unauthorized users who do not have the common key cannot access the data. A specific example of the common key cryptography is that based on the DES (Data Encryption Standard).

An encryption key for encrypting data and a decryption key for decrypting the encrypted data can be obtained from a password or the like using a unidirectional function such as a hash function. Herein, the unidirectional function refers to a function whose input is very difficult to guess from an output thereof. Although an encryption/decryption key can be generated using an output obtained by applying a unidirectional function to, for example, a password determined by a user, it is substantially impossible to determine, from the obtained encryption/decryption key, the password that is original data from which the encryption/decryption key is generated.

Another known technique is public key cryptography in which an encryption key used for encryption and a decryption key used for decryption are generated in accordance with different algorithms. In the public key cryptography, a public key, which is allowed to be used by any unspecified user, is issued by a particular user, and a document to be provided to that particular user is encrypted using the public key issued by the particular user. The document encrypted using the public key can only be decrypted using a secret key corresponding to the encryption key used to encrypt that document. The secret key is held only by the user who issued the public key, and thus the document encrypted using the public key can be decrypted only by the user having the secret key. A representative example of the public key cryptography is that based on the RSA (Rivest-Shamir-Adelman) algorithm. Using one of above-described cryptography techniques, it is possible to realize a system in which encrypted contents can be decrypted only by authorized users.

In such a content distribution system, encrypted contents are provided to users via a network or via a storage such as a DVD or a CD, and content keys used to decrypt the encrypted contents are provided only to authorized users. To prevent a content key from being copied in an unauthorized manner, it has been proposed to encrypt a content key and provide the encrypted content key to an authorized user so that only the authorized user can decrypt the encrypted content key using a decryption key held only by the authorized user.

A judgment of whether one is an authorized user or not is generally made by performing authentication between a user device and a content provider who is a sender of content, before transmitting content or a content key. In a usual authentication process, if the user is determined to be authorized, a session key is produced which can be used only during the present communication, and data such as content or a content key is transmitted after encrypting it using the session key. Authentication may be performed using the common key cryptography or the public key cryptography. In the case where authentication is performed using the common key encryptography, a common key for system-wide use is needed. This results in inconvenience in renewal. On the other hand, in the case where the public key encryptography is employed, undesirably complex calculations using a memory with an undesirably high capacity are required.

SUMMARY OF THE INVENTION

It is an object of the present invention to provide a technique of securely transmitting data only to authorized users without having to perform mutual authentication between a sender and a receiver, by using an encrypted key block which can be used (decrypted) in a plurality of category trees defined as subtrees in a hierarchical key distribution tree.

More specifically, it is an object of the present invention to provide an information processing system, an information processing method, and an information storage medium, in which an enabling key block (EKB) including encrypted key data which can be decrypted by one or more selected category trees is produced, thereby making it possible for devices belonging to any one of the selected category trees to use the enabling key block (EKB) An EKE type definition list, indicating which EKB type can be processed or decrypted by which category tree, is used thereby making it possible to perform production and management of enabling key blocks (EKBs) in a highly efficient manner.

According to a first aspect of the present invention, there is provided an information processing system in which a key tree is formed to the key tree includes a plurality of leaves, a root, and a plurality of nodes existing in paths from the plurality of leaves to the root. A plurality of devices are assigned to at least some of the leaves. A plurality of keys are assigned to the root, to at least some of the leaves, and to at least some of the nodes. An enabling key block (EKB) includes encrypted data produced by selecting one of the paths in the key tree and encrypting a higher-level key in the selected path using a lower-level key in the selected path such that the encrypted data can be decrypted only by a selected one of the plurality of devices that is capable of using a node key set corresponding to the selected path. The EKB is provide to the selected device. An EKB requester is operable to issue an EKB production request. The EKB production request is selected from the group consisting of (i) a first EKB production request to produce the EKB including an already-produced root key, and (ii) a second EKB production request to produce the EKB including a new root key. A key distribution center (KDC) is operable to receive the EKB production request, to generate the EKB including the already produced root key in response to the first EKB production request, and to generate the EKB including the new root key in response to the second EKB production request.

In an embodiment of the information processing system according to the present invention, at least one category entity is also provided. In this case, the key tree further includes a plurality of sub-trees serving as category trees that are grouped in accordance with categories and managed by the at least one category entity. The EKB requester is operable to select an EKB type identifier for identifying an EKB type. The EKB type identifier is selected on the basis of an EKB type definition list representing the correspondence between the EKB type identifier and identification data capable of identifying at least one of the category trees that is operable to process EKBs of the EKB type identified by the EKB type identifier. The EKB requester is operable to output, as the first or second EKB production request, the EKB production request including the selected EKB type identifier.

In an embodiment of the information processing system according to the present invention, the EKB type definition list is acquired from a storage means or an accessible site on a network.

In an embodiment of the information processing system according to the present invention, the identification data is a node ID serving as a node identifier of a selected one of the plurality of nodes in at least one of the category trees.

In an embodiment of the information processing system according to the present invention, the EKB type definition list includes a description of a chosen one of the plurality of devices belonging to a selected one of the plurality of category trees.

According to a second aspect of the present invention, there is provided an information processing system in which a key tree is formed. The key tree includes a plurality of leaves, a root, and a plurality of nodes existing in paths from the plurality of leaves to the root. The key tree also includes a plurality of sub-trees serving as category trees that are grouped in accordance with categories. A plurality of devices are assigned to at least some of the leaves. A plurality of keys are assigned to the root, to at least some of the leaves, and to at least some of the nodes. An enabling key block (EKB) includes encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB is provided to the selected device. At least one category entity is operable to manage the plurality of sub-trees and to produce sub-enabling key blocks (sub-EKBs). An EKB request is operable to issue an EKB production request. A key distribution center (KDC) is operable to produce the EKB in response to the EKB production request, and to output a request to the at least one category entity to produce a sub-EKB that can be processed by the category entity. The EKB can be processed in at least one of the plurality of category trees. The KDC is operable to produce the EKB based on the sub-EKB received from the at least one category entity.

In an embodiment of the information processing system according to the present invention, the system further includes an EKB type identifier for identifying an EKB type. The EKB type identifier is selected on the basis of an EKB type definition list, which represents the correspondence between the EKB type identifier and identification data that is capable of identifying at least one category tree. The category tree is operable to process EKBs of the EKB type identified by the EKB type identifier. The KDC is operable to extract the identification data of a chosen one of the category trees by searching the EKB type definition list based on the EKB type identifier included in the EKB production request. The KDC is also operable to produce a selected EKB that can be processed in common by the selected category trees defined in the EKB type definition list.

In an embodiment of the information processing system according to the present invention, if a selected category entity receives a sub-EKB production request from the KDC, the selected category entity is operable to produce a a selected one of the sub-EKBs. The selected sub-EKB is capable of being processed in accordance with a key related to a selected one of the leaves or a selected one of the nodes, which belongs to a selected one of the category trees.

In an embodiment of the information processing system according to the present invention, the key tree further includes a root tree, a top-level category tree and a sub-category tree. The root tree has a multilevel tree structure at the top. The top-level category tree is directly connected to the root tree. The sub-category tree is located at a level below the top-level category tree and is connected to the top-level category tree. The at least one category entity manages the top-level category tree and the sub-category tree, and produces a selected sub-EKB that can be processed based on at least one key assigned to a selected one of the nodes or a selected one of the leaves in the top-level category tree and the sub-category tre.

According to a third aspect of the present invention, there is provided an information processing method for use in a system having a key tree. The key tree includes a plurality of leaves, a root, and a plurality of nodes existing in paths from the respective leaves to the root. A plurality of devices are assigned to at least some of the leaves. A plurality of keys are assigned to the root, at least some of the leaves, and at least some of the nodes. An enabling key block (EKB) production request is output to a key distribution center (KDC). The EKB production request is selected from the group consisting of (i) a first EKB production request to produce an EKB including an already-produced root key, and (ii) a second EKB production request to produce the EKB including a new root key. The key distribution center (KDC) produces the EKB, which includes encrypted data that is produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB also includes the already-produced root key in the case of the first EKB production request, or the new root key in the case of the second EKB production request. The method also includes providing the EKB to the selected device.

In an embodiment of the information processing method according to the present invention, the key tree further includes a plurality of sub-trees serving as category trees that are grouped in accordance with categories and managed by at least one category entity. An EKB type identifier for identifying an EKB type is selected based on an EKB type definition list representing the correspondence between the EKB type identifier and identification data capable of identifying at least one of the category trees that is operable to process EKBs of the EKB type identified by the EKB type identifier. The EKB production request, including the selected EKB type identifier, is output as the first or the second EKB production request.

In an embodiment of the information processing method according to the present invention, the EKB type definition list is acquired from a storage means or an accessible site on a network.

In an embodiment of the information processing method according to the present invention, the identification data is a node ID serving as a node identifier of a selected one of the plurality of nodes in at least one of the category trees.

In an embodiment of the information processing method according to the present invention, the EKB type definition list includes a description of a chosen one of the plurality of devices belonging to a selected one of the plurality of category trees.

According to a fourth aspect of the present invention, there is provided an information processing method for use in a system having a key tree. The key tree includes a plurality of leaves, a root, a plurality of nodes existing in paths from the respective leaves to the root, and a plurality of sub-trees serving as category trees that are grouped in accordance with categories and managed by category entities. A plurality of devices are assigned to at least some of the leaves. A plurality of keys are assigned to the root, to the plurality of leaves, and to the plurality of nodes. An enabling key block (EKB) is produced in response to an EKB production request issued by an EKB requester. The EKB includes encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB is provided to the selected device. Selected ones of the category entities are requested to produce a sub-enabling key block (sub-EKB) that can be processed by the selected category entities. The selected category entities manage a selected one of the category trees capable of encrypting the EKB. The EKB is produced based on the sub-EKB received from the selected category entities.

In an embodiment of the information processing method according to the present invention, an EKB type definition list is established, representing a correspondence between an EKG type identifier for identifying an EKB type and identification data capable of identifying selected ones of the category trees that are operable to process EKBs of the EKB type identified by the EKB type identifier. The identification data of the selected category tree is extracted by searching the EKB type definition list based on the EKB type identifier included in the EKB production request. The sub-EKB is produced by one or more of the category entities that correspond to the extracted identification data. The EKB is produced at a key distribution center (KDC), which includes the EKB type definition list such that the EKB can be processed in common by specified ones of the category trees defined in the EKB type definition list.

In an embodiment of the information processing method according to the present invention, a sub-EKB production request is received at the selected category entities from a key distribution center (KDC). The sub-EKB is produced, and the sub-EKB is capable of being processed in accordance with a key related to a selected one of the leaves or a selected one of the nodes belonging to a chosen one of the category trees.

In an embodiment of the information processing method according to the present invention, the key tree further includes a root tree, a top-level category tree and a sub-category tree. The root tree has a multilevel tree structure at the top. The top-level category tree is directly connected to the root tree. The sub-category tree is located at a level below the top-level category tree and is connected to the top-level category tree. One of the category entities manages the top-level category tree and the sub-category tree and produces the sub-EKB which can be processed based on selected ones of the keys assigned to a selected one of the nodes or a selected one of the plurality of leaves in the top-level category tree and the sub-category tree.

According to the fifth aspect of the present invention, there is provided a recording medium recorded with a computer program for performing information processing using an enabling key block (EKB) in a system having a key tree. The key tree includes a plurality of leaves, a root, and a plurality of nodes existing in paths from the plurality of leaves to the root. A plurality of devices are assigned to at least some of the leaves. A plurality of keys are assigned to the root, to at least some of the leaves, and to at least some of the nodes. An EKB production request is received. The EKB production request is selected from the group consisting of (i) a first EKB production request to produce an EKB including an already-produced root key, and (ii) a second EKB production request to produce the EKB including a new root key. The EKB is produced, including encrypted data that is produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB also includes the already-produced root key in the case of the first EKB production request or the new root keyin the case of the second EKB production request. The EKB is also provided to the selected device.

According to a sixth aspect of the present invention, there is provided a recording medium recorded with a computer program for performing information processing using an enabling key block (EKB) in a system having a key tree. The key tree includes a plurality of leaves, a root, and a plurality of nodes existing in paths from the plurality of leaves to the root. A plurality of devices are assigned to at leas some of the leaves. A plurality of keys are assigned to the root, to at least some of the leaves, and to at least some of the nodes. An EKB type definition list is established, representing a correspondence between an EKB type identifier for identifying an EKB type and identification data capable of identifying at least one category tree that is operable to process EKBs of the EKB type identified by the EKB type identifier. The identification data of the at least one category tree is extracted from the EKB type definition list. A request is output to at least one category entity to produce a sub-enabling key block (sub-EKB) that can be processed in the at least one category tree. The category entity managing the category tree corresponds to the identification data. The sub-EKB is received from the at least one category entity. The EKB is produced in accordance with the sub-EKB so that the EKB can be processed in the category tree. The EKB includes encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB is provided to the selected device.

According to the seventh aspect of the present invention, there is provided an information processing system in which a key tree is formed, including a plurality of leaves, a root, and a plurality of nodes existing in paths from the plurality of leaves to the root. A plurality of devices are assigned to at least some of the leaves. A plurality of keys are assigned to the root, to at least some of the leaves, and to at least some the nodes. An enabling key block (EKB) is produced. The EKB includes encrypted data produced by selecting one of the paths in the key tree and encrypting a higher-level key in the selected path using a lower-level key in the selected path such that the encrypted data can be decrypted only by a selected one of the devices capable of using a node key set corresponding to the selected path. The EKB is provided to the selected device. The EKB is a combined EKB having key data. The combined EKB is produced by combining sub-enabling key blocks (sub-EKBs) that can be decrypted in at least one sub tree of the key tree. The key data is stored in a fixed-length data field.

In an embodiment of the information processing system according to the present invention, the system further comprises a key distribution center (KDC). The at least one sub tree is a category tree categorized in accordance with a category and managed by a category entity. Each sub-EKB is capable of being processed with a selected one of the keys. The selected key is associated with one of the leaves or one of the nodes belonging to the category tree. The KDC is operable to produce the EKB so that the EKB can be processed by the category tree.

In an embodiment of the information processing system according to the present invention, the system further includes a key distribution center (KDC). Each sub-EKB has its own algorithm and key data length During production of the combined EKB, the KDC stores the key data in the fixed-length data field.

In an embodiment of the information processing system according to the present invention, the system further includes a tag. Here, at least part of the key data is encrypted key data, which is produced by encrypting each of the keys assigned to respective ones of the nodes using a lower-level node key or a lower-level leaf key. The tag indicates the presence or absence of encrypted key data associated with a node or a leaf below and to the left or right of a node location of the encrypted key data stored in the combined EKB.

In an embodiment of the information processing system according to the present invention, the combined EKB includes a first key as the encrypted key data. The first key corresponds to a node or a leaf of a hierarchical tree reconstructed by selecting one of the paths to form a simplified tree. The simplified tree includes, at its lowest level, an endpoint node or an endpoint leaf that is capable of decrypting the combined EKB and then removing an unnecessary node from the simplified tree.

In an embodiment of the information processing system according to the present invention, the combined EKB has a key tree structure produced by rearranging encrypted key data included in selected ones of the sub-EKBs in accordance with locations of the nodes or the leaves in the key tree.

According to an eighth aspect of the present invention, there is provided an information storage medium having information stored thereon. The information comprises an enabling key block (EKB), a key tree, data, and a plurality of keys. The key tree includes at least one sub-tree serving as a category tree categorized in accordance with a category. The category tree includes a plurality of leaves, a root, and a plurality of nodes existing in paths from the leaves to the root. The data identifies an assignment of a plurality of devices to at least some of the leaves. The plurality of keys are assigned to the root, to at least some of the leaves, and to at least some of the nodes. The EKB includes encrypted data that is produced by selecting one of the paths in the key tree and encrypting a higher-level key in the selected path using a lower-level key in the selected path. The encrypted data can be decrypted only by a selected one of the devices capable of using a node key set corresponding to the selected path. The EKB has the form of a combined EKB including key data. The combined EKB is produced by combining sub-enabling key blocks (sub-EKBs) that can be decrypted in the at least one sub tree of the key tree. The key data is stored in a fixed-length data field.

In an embodiment of the information storage medium according to the present invention, each sub-EKB has its own algorithm and key data length, and a key data storage area of the combined EKB has a fixed length.

According to a ninth aspect of the present invention, there is provided an information processing method for use in a system having a key tree. The key tree includes a plurality of leaves, a root, and a plurality of nodes existing in paths from the leaves to the root. A plurality of devices are assigned to at least some of the leaves. A plurality of keys are assigned to the root, to at least some of the leaves, and to at least some of the nodes. A plurality of sub-enabling key blocks (sub-EKBs) are provided. The sub-EKBs are combined to produce an EKB having the form of a combined EKB that can be decrypted in selected sub-trees of the key tree. The EKB includes encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB also includes key data stored in a fixed-length data field. The EKB is provided to the selected device.

In an embodiment of the information processing method according to the present invention, the plurality of sub-trees are category trees grouped in accordance with categories and managed by category entities. The EKB is produced by a key distribution center (KDC) based on the sub-EKBs. The EKB is capable of being processed in common by the category trees. The sub-EKBs are produced using the category entities. The sub-EKBs are capable of being processed in accordance with one of the keys which is related to a selected one of the leaves or a selected one of the nodes belonging to a selected one of the category trees.

In an embodiment of the information processing method according to the present invention, each of the sub-EKBs has its own algorithm and key data length. In producing the combined EKB based on the sub-EKBs, the KDC stores the key data in the fixed-length data field.

In an embodiment of the information processing method according to the present invention, the EKB further includes encrypted key data and a tag. The key data is produced by encrypting the keys assigned to the nodes of the key tree using a lower-level node key or a lower-level leaf key. The tag indicates the presence or the absence of additional encrypted key data at a chosen node or a chosen leaf below and to the left or right of a node location of the encrypted key data stored in the enabling key block (EKB).

In an embodiment of the information processing method according to the present invention, the EKB further includes a first key having encrypted key data. The first key corresponds to a node or a leaf of a hierarchical tree reconstructed by selecting a path forming a simplified tree. The simplified tree includes, at its lowest level, an endpoint node or an endpoint leaf that is capable of decrypting EKB and then removing an unnecessary node from the simplified tree.

In an embodiment of the information processing method according to the present invention, the combined EKB has a key tree structure produced by rearranging encrypted key data included in selected ones of the sub-EKBs in accordance with locations of the nodes or the leaves in the key tree.

According to a tenth aspect of the present invention, there is provided a recording medium recorded with a computer program for producing an enabling key block (EKB) in a system having a key tree. The key tree includes a plurality of leaves, a root, and a plurality of nodes existing in paths from the leaves to the root. A plurality of devices are assigned to at least some of the leaves. A plurality of keys are assigned to the root, to at least some of the leaves, and to at least some of the nodes. A plurality of sub-enabling key blocks (sub-EKBs) are provided. The sub-EKBs are combined to produce an EKB having the form of a combined EKB that can be decrypted in selected sub-trees of the key tree. The EKB includes encrypted data produced by selecting one of the paths in the key tree and encrypting a higher-level key in the selected path using a lower-level key in the selected path such that the encrypted data can be decrypted only by a selected one of the devices capable of using a node key set corresponding to the selected path. The EKB also includes key data stored in a fixed-length data field. The EKB is provided to the selected device.

According to an eleventh aspect of the present invention, there is provided an information processing system comprising a key tree, a plurality of devices, a plurality of keys, a plurality of sub-enabling key blocks (sub-EKBs) and an enabling key block (EKB). The key tree includes a plurality of leaves, a root, and a plurality of nodes existing in paths from the leaves to the root. The plurality of devices are assigned to at least some of the leaves. The plurality of keys are assigned to the root, to at least some of the leaves, and to at least some of the nodes. The EKB includes encrypted data produced by selecting one of the paths in the key tree and encrypting a higher-level key in the selected path using a lower-level key in the selected path such that the encrypted data can be decrypted only by a selected one of the devices capable of using a node key set corresponding to the selected path. The EKB also includes data indicating a data length of a sub-EKB storage area corresponding to each of the sub-EKBs and sub-EKB identification data. The EKB has the form of a combined EKB produced by combining the sub-EKBs that can be decrypted in selected ones of the sub-trees such that the sub-EKBs are stored in the combined EKB while maintaining original key arrangements.

In an embodiment of the information processing system according to the present invention, the system further comprises at least one category entity and a key distribution center (KDC). The sub-trees are category trees grouped in accordance with categories and managed by the category entity. Each of the sub-EKBs is an EKB that is capable of being processed in accordance with a selected key related to one of the leaves or one of the nodes belonging to a selected one of the category trees. The KDC is operable to produce the EKB based on the sub-EKBs, and the EKB can be processed in common by the category trees.

In an embodiment of the information processing system according to the present invention, each of the sub-EKBs has its own algorithm and key data length.

In an embodiment of the information processing system according to the present invention, the system further comprises a plurality of category entities. The sub-trees are category trees grouped in accordance with categories and managed by the category entities. Each of the sub-EKBs is an EKB capable of being processed in accordance with a selected key related to one of the leaves or one of the nodes belonging to a selected one of the category trees. The sub-EKB identification data is a node ID serving as a node identifier of a chosen node in one of the category trees.

In an embodiment of the information processing system according to the present invention, the sub-EKBs stored in the combined EKB includes encrypted key data produced by encrypting node keys assigned to selected nodes of the key tree using a lower-level node key or a lower-level leaf key, and a tag indicating the presence or the absence of additional encrypted key data associated with a node or a leaf below and to the left or right of a node location of each of the encrypted key data.

In an embodiment of the information processing system according to the present invention, the sub-EKBs stored in the combined EKB include a first key as the encrypted key data. The first key corresponds to a node or a leaf or a hierarchical tree reconstructed by selecting a path forming a simplified tree. The simplified tree includes, at its lowest level, an endpoint node or a leaf capable of decrypting a respective one of the sub-EKBs and then removing an unnecessary node from the simplified tree.

According to a twelfth aspect of the present invention, there is provided an information storage medium having information stored thereon. The information comprises a key tree, data identifying an assignment of a plurality of devices, a plurality of keys, a plurality of sub-enabling key blocks (sub-EKBs), sub-EKB identification data associated with the sub-EKBs, data indicating a data length of a sub-EKB storage area corresponding to each sub-EKB, and an enabling key block (EKB). The key tree includes a sub-tree serving as a category tree categorized in accordance with a category. The category tree includes a plurality of leaves, a root, and a plurality of nodes existing in paths from the leaves to the root. The plurality of devices are assigned to at least some of the leaves. The plurality of keys are assigned to the root, to at least some of the leaves, and to at least some of the nodes. The EKB includes encrypted data produced by selecting one of the paths in the key tree and encrypting a higher-level key in the selected path using a lower-level key in the selected pathsuch that the encrypted data enables only a selected one of the devices capable of using a node key set corresponding to the selected path to decrypt the EKB. The EKB has the form of a combined EKB produced by combining the sub-EKBs that can be decrypted in selected sub-trees of the key tree.

In an embodiment of the information storage medium according to the present invention, each sub-EKB has its own algorithm and key data length.

According to thirteenth aspect of the present invention, there is provided an information processing method for use in a system having a key tree. The key tree includes a plurality of leaves, a root, and a plurality of nodes existing in paths from the leaves to the root. A plurality of devices are assigned to at least some of the leaves. A plurality of keys are assigned to the root, to the leaves, and to the node. A plurality of sub-enabling key blocks (sub-EKBs) are provided. Selected ones of the sub-EKBs that can be decrypted in selected sub-trees of the key tree are combined to produce an enabling key block (EKB). The EKB has the form of a combined EKB. The selected sub-EKBs are stored in the combined EKB while maintaining original key arrangements. The EKB includes encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. The EKB also includes data indicating a data length of a sub-EKB storage area corresponding to each of the selected sub-EKBs and sub-EKB identification data. The EKB is provided to the selected device.

In an embodiment of the information processing method according to the present invention, the sub-trees are category trees grouped in accordance with categories and managed by category entities. The EKB is capable of being processed in common by the category trees. In this case, the sub-EKBs are produced using the category entities. The sub-EKB are capable of being processed in accordance with one of the keys which is related to a selected one of the leaves or a selected one of the nodes belonging to a selected one of the category trees.

In an embodiment of the information processing method according to the present invention, each sub-EKB has its own algorithm and key data length.

In an embodiment of the information processing method according to the present invention, the sub-trees are category trees grouped in accordance with categories and managed by category entities. Each of the sub-EKBs is an EKB that is capable of being processed in accordance with a selected key related to one of the leaves or one of the nodes belonging to a selected one of the category trees. The sub-EKB identification data is a node ID serving as a node identifier of a chosen one of the nodes in the selected category tree.

In an embodiment of the information processing method according to the present invention, the sub-EKBs stored in the combined EKB include encrypted key data produced by encrypting node keys assigned to selected nodes of the key tree using a lower-level node key or a lower-level leaf key, and a tag indicating the presence or the absence of additional encrypted key data at a chosen node or a chosen leaf below and to the left or right of a node location of the encrypted key data.

In an embodiment of the information processing method according to the present invention, the sub-EKBs stored in the combined EKB include a first key as the encrypted key data. The first key corresponds to a node or a leaf of a hierarchical tree reconstructed by selecting a path forming a simplified tree. The simplified tree includes, at its lowest level, an endpoint node or a leaf capable of decrypting a respective one of the sub-EKBs and then removing an unnecessary node from the simplified tree.

According to a fourteenth aspect of the present invention, there is provided a recording medium recorded with a computer program for producing an enabling key block (EKB) in a system having a key tree. The key tree includes a plurality of leaves, a root, and a plurality of nodes existing in paths from the leaves to the root. A plurality of devices are assigned to at least some of the leaves. A plurality of keys are assigned to the root, to at least some of the leaves, and to at least some of the nodes. An enabling key block (EKB) is produced. The EKB includes encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path. A sub-enabling key block (sub-EKB) is selected that can be decrypted in each of the sub-trees of the key tree. Sub-EKB identification data and data indicating a data length of a sub-EKB storage area corresponding to the selected sub-EKB is added to the EKB. The EKB is provided to the selected device.

In the present invention, by using the encrypted key tree distribution technique based on the hierarchical tree structure in which devices are assigned to leaves of an n-ary tree, a content key used as an encryption key of content, an authentication key used in authentication, or a program code is transmitted together with an enabling key block.

Furthermore, the data size of the enabling key block is reduced by employing a data format including an encrypted key data part and a tag part indicating the locations of encrypted keys, thereby making it possible to perform decryption easily and quickly. That is, data is produced in an encrypted form that can be decrypted only by an authorized device whereby the data is securely provided to the authorized device.

Furthermore, an enabling key block (EKB) is produced so as to include encrypted key data that can be decrypted in selected one or more category trees thereby making it possible for any device belonging to any one of those selected category trees to use the enabling key block (EKB). The EKB is produced and managed in a highly efficient manner by using the EKB type definition list representing which EKB can be processed or decrypted in which category tree.

A program storage medium according to the present invention is a medium which provides a computer program in a computer-readable form to a general-purpose computer system executable of various program codes. The medium is not limited to a particular type, but various types of media, for example, a storage medium such as a CD, FD, or MD or a transmission medium such as a network may be employed.

The program storage medium defines a cooperative relationship in structure or function, for realizing a function of a particular computer program on a computer system, between the computer program and the storage medium. That is, by installing a particular computer program onto a computer system via a program storage medium, it becomes possible to achieve a cooperative operation on the computer system thereby achieving functions similar to those achieved by the other aspects of the present invention.

In the present invention, the term "system" is used to describe a logical collection of a plurality of devices, and it is not necessarily required that the plurality of devices are disposed in a single case.

These and other objects and features of the present invention will become more apparent from the following detailed description of embodiments with reference to the accompanying drawings.

BRIEF DESCRIPTION OF THE DRAWINGS

FIG. 4 is a diagram showing an example of an enabling key block (EKB) used to distribute various keys and data in the information processing system according to the present invention.

FIG. 11 is diagram showing a process of distributing content using an enabling key block (EKB) in the information processing system according to the present invention, wherein, for the purpose of comparison, a process of distributing content according to a conventional technique is also shown.

FIG. 24 is a diagram showing a process of producing a simplified enabling key block (EKB), in the information processing system according to the present invention.

FIG. 50 is a diagram showing a data format of an EKB type definition list used in the information processing system according to the present invention.

FIG. 56 is a diagram showing an sub-EKB production process performed in the information processing system according to the present invention.

FIG. 64 is a diagram showing a revocation process in a recording system in the information processing system according to the present invention.

DETAILED DESCRIPTION

Outline of System

Figure 1:
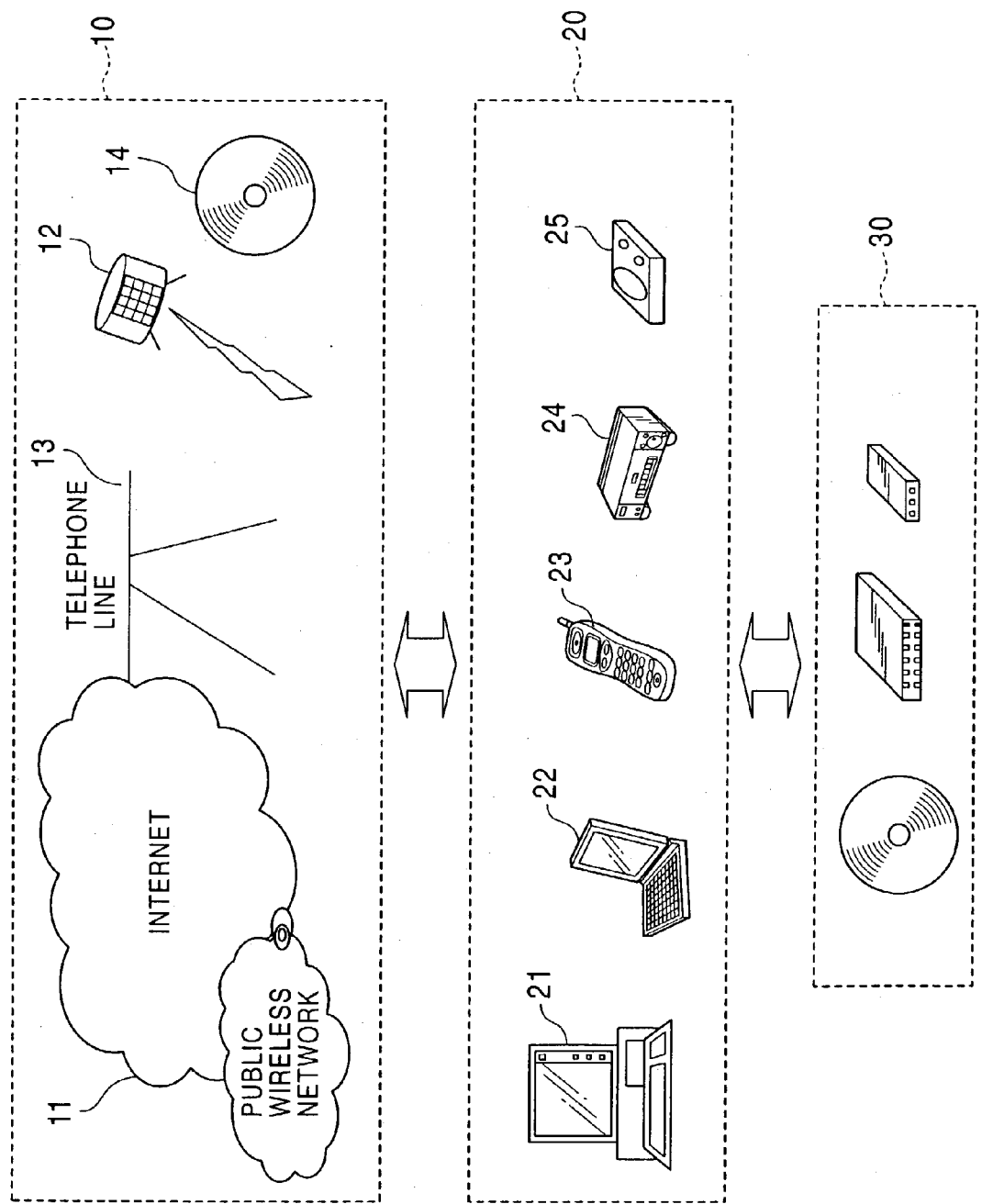
FIG. 1 is a diagram showing an example of an information processing system according to the present invention.

FIG. 1 illustrates an example of a content distribution system based on an information processing system according to the present invention. A device on a content transmission side 10 transmits content or a content key in an encrypted form to various devices on a content reception side 20. A device on the reception side 20 plays back video data or audio data or executes a program using the content or the content key acquired by decrypting the received encrypted content or encrypted content key. Transmission of data between the content transmission side 10 and the content reception side 20 is performed via a network such as the Internet or via a distributable storage medium such as a DVD or a CD.

Specific examples of transmission means used on the content transmission side 10 include the Internet 11, satellite broadcasting 12, a telephone line 13, and a medium 14 such as a DVD or CD. Specific examples of devices on the content reception side 20 include a personal computer (PC) 21, a portable computer (PD) 22, a portable device 23 such as a portable telephone or PDA (Personal Digital Assistant), a recording/playing-back apparatus 24 such as a DVD player or a CD player, and a playback device 25 such as a game terminal. The devices on the content reception side 20 can acquire a content transmitted from the content transmission side 10 via communication means such as a network or via a medium 30.

Device Configuration

Figure 2:
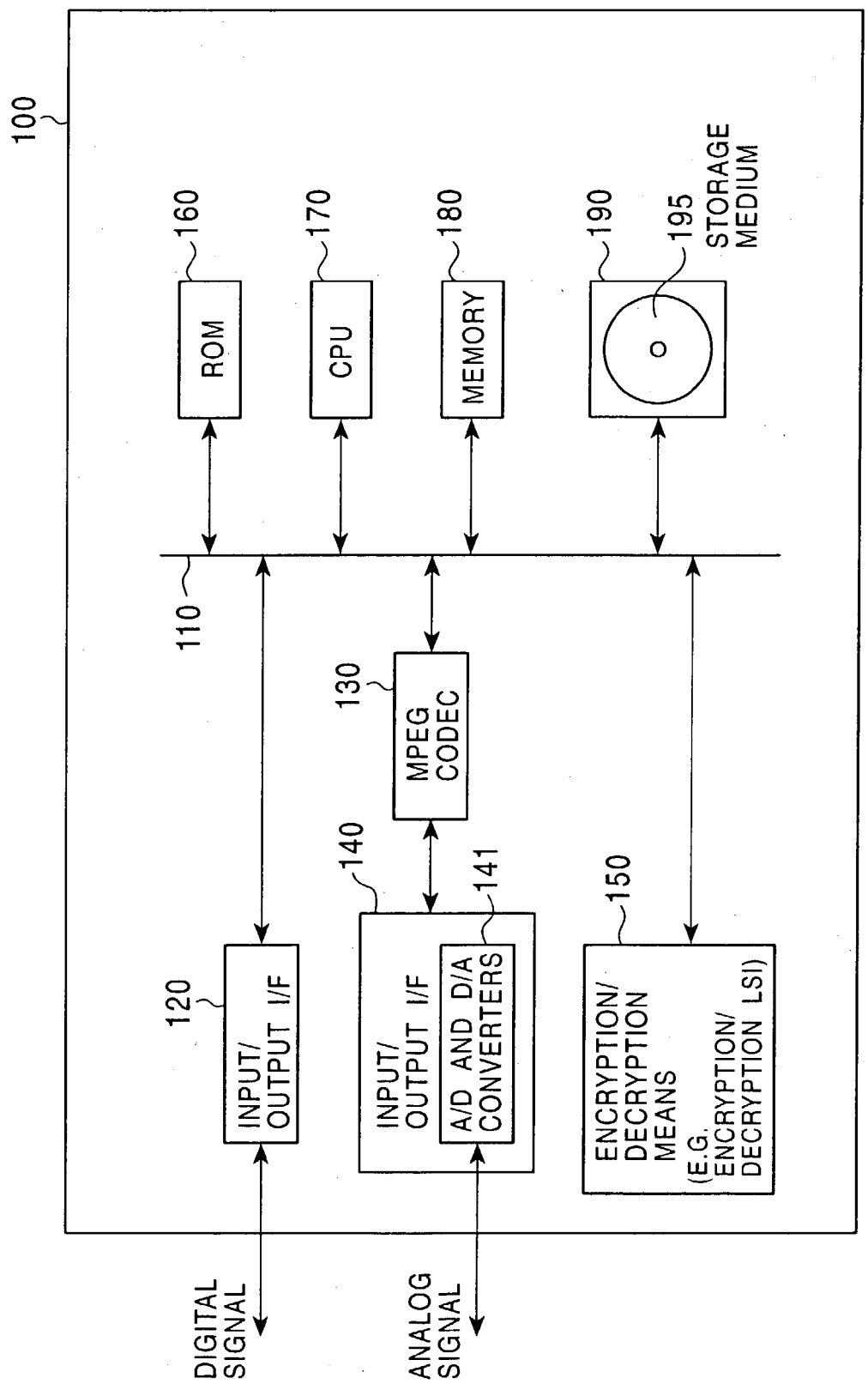
FIG. 2 is a block diagram showing an example of a recording/reproducing apparatus used in the information processing system according to the present invention.

FIG. 2 is a block diagram illustrating a configuration of a recording/reproducing apparatus 100 that is an example of devices on the content reception side 20 shown in FIG. 1. The recording/reproducing apparatus 100 includes an input/output interface 120, an MPEG (Moving Picture Experts Group) codec 130, an input/output interface 140 including an A/D and D/A converter 141, cryptography (encryption/description) means 150, a ROM (Read Only Memory) 160, a CPU (Central Processing Unit) 170, a memory 180, and a drive 190 for driving a storage medium 195, wherein these parts are connected to each other via a bus 110.

The input/output interface 120 receives a digital signal representing content such as video data, audio data, or a program provided from the outside and outputs the received digital signal over the bus 110. The input/output interface 120 also receives a digital signal via the bus 110 and outputs the received digital signal to the outside. The MPEG codec 130 MPEG-decodes MPEG-coded data supplied via the bus 110 and outputs the resultant decoded data to the input/output interface 140. The MPEG codec 130 also MPEG-encodes a digital signal supplied from the input/output interface 140 and outputs the resultant encoded signal over the bus 110. The input/output interface 140 includes the A/D and D/A converter 141. The input/output interface 140 receives content in the form of an analog signal from the outside and converts it into digital form using the A/D and D/A converter 141. The resultant digital signal is output to the MPEG codec 130. Conversely, if the input/output interface 140 receives a digital signal from the MPEG codec 130, the input/output interface 140 converts it into analog form using the A/D and D/A converter 141 and outputs the resultant analog signal to the outside.

The cryptography means 150 is formed of, for example, a one-chip LSI (Large Scale Integrated Circuit) so as to serve to encrypt/decrypt a digital content signal supplied via the bus 110 and also serve to perform authentication. The resultant encrypted/decrypted data is output over the bus 110. The cryptography means 150 may be realized not only using a one-chip LSI but may also be realized by software or a combination of software and hardware. A specific manner of forming the cryptography means 150 using software will be described later.

The ROM 160 stores program data used by the recording/reproducing apparatus. The CPU 170 controls various parts such as the MPEG codec 130 and the cryptography means 150 by executing the program stored in the ROM 160 or the memory 180. The memory 180 may be realized using, for example, a nonvolatile memory so as to serve to store the program executed by the CPU 170 or data used by the CPU 170. Key sets used in the encryption/decryption process performed by the device are also stored in the memory 180. The key sets will be described later. The drive 190 reads (reproduces) digital data from the storage medium 195 by driving the storage medium 195 capable of storing and reproducing digital data, and the drive 190 outputs the read digital data over the bus 110. Conversely, if digital data is received via the bus 110, the drive 190 supplies the received data to the storage medium 195 so that the digital data is stored onto the storage medium 195.

The storage medium 195 is a medium capable of storing digital data, and specific examples thereof include an optical disk such as a DVD or a CD, a magnetooptical (MO) disk, a magnetic disk, a magnetic tape, or a semiconductor memory such as a RAM. In the present embodiment, the storage medium 195 is assumed to be removably mounted on the drive 190, although the storage medium 195 may be disposed in a fixed fashion in the recording/reproducing apparatus 100.

The cryptography means 150 shown in FIG. 2 may be realized using a one-chip LSI or using software or a combination of software and hardware.

Distribution Keys on the Basis of a Tree Structure

A manner of assigning an encryption key to each device and a manner of distribution data are described below for a case in which encrypted data is transmitted from a device on the transmission side 10 to a device on the reception side 20 shown in FIG. 1.

Figure 3:
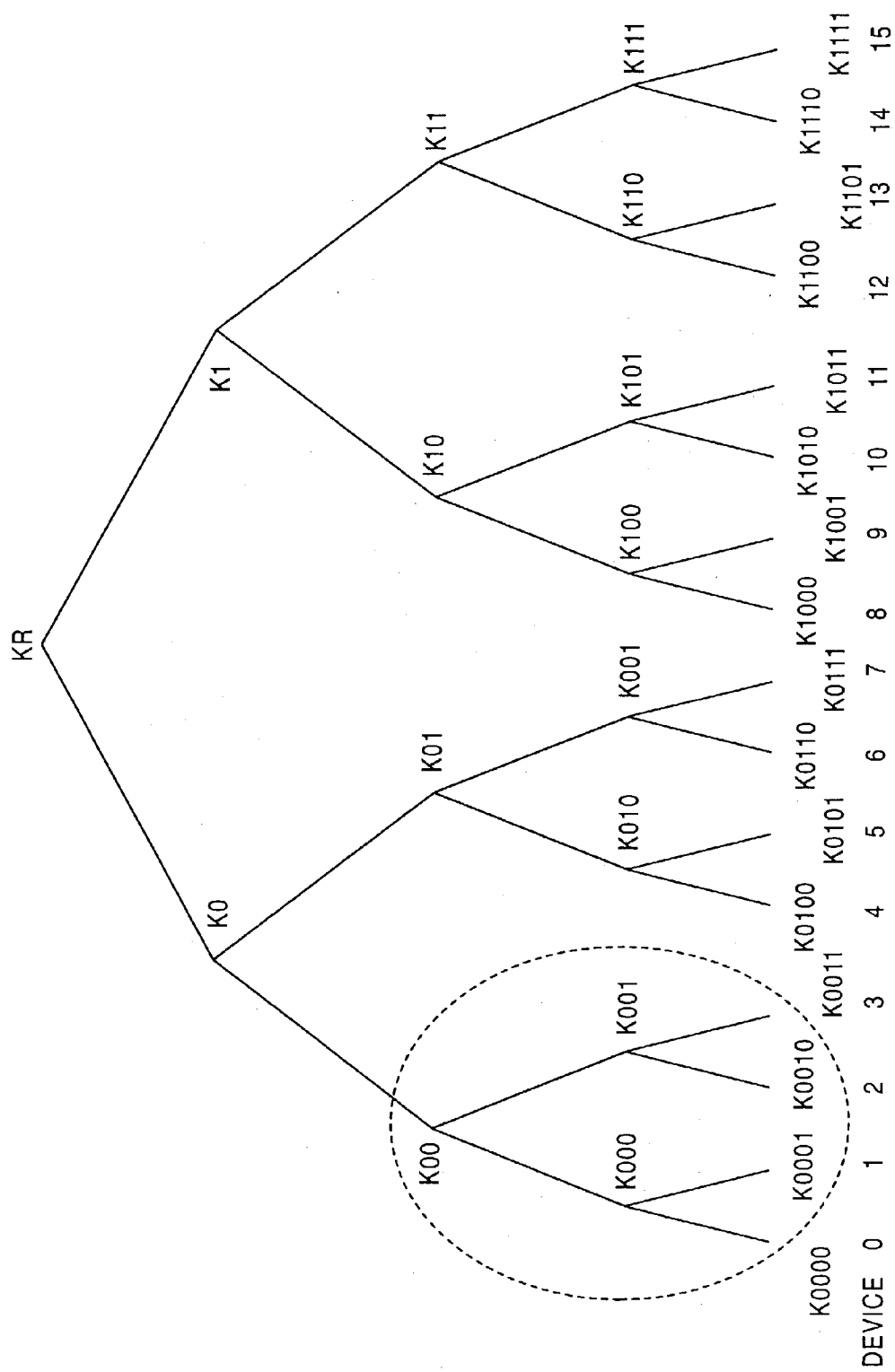
FIG. 3 is a tree structure diagram showing various keys and a process of encrypting data used or performed in the information processing system according to the present invention.

In FIG. 3, numbers from 0 to 15 at the bottom denote respective devices on the content reception side 20. That is, leaves in the hierarchical tree structure shown in FIG. 3 denote respective devices.

When devices 0 to 15 are produced or shipped, or at a proper time thereafter, a key set including a leaf key assigned to a leaf corresponding to a device and also including node keys assigned to respective nodes present in a path from that leaf to the root in the hierarchical tree structure shown in FIG. 3 is stored in each device. K0000 to K1111 shown at the bottom of FIG. 3 denote leaf keys assigned to the respective devices 0 to 15, and KR to K111 at levels from the top to the second level as counted from the bottom denote node keys.

In the tree structure shown in FIG. 3, for example, a device 0 has a leaf key K0000 and node keys K000, K00, K0, and KR. Similarly, a device 5 has K0101, K010, K01, K0, and KR, and a device 15 has K1111, K111, K11 K1, and KR. Although in the specific example shown in FIG. 3, the tree includes only sixteen devices 0 to 15 and the tree has a symmetric four-level structure, the tree may include a greater number of devices and may have a different number of levels other than 4.

Each device in the tree structure shown in FIG. 3 may be of various types which may use various types of storage media such as a storage device fixedly disposed in a device or a removable storage medium such as a DVD, a CD, an MD, or a flash memory. Furthermore, various types of application services may be provided via this tree structure. That is, the hierarchal tree structure for use in distribution of content or content keys, such as that shown in FIG. 3, is formed so as to adapt to such various types devices and various types applications.

In a system including such various types of devices and various types of applications, parts thereof are properly grouped. For example, in FIG. 3, a part enclosed by a dotted line is set as one group including devices 0, 1, 2, and 3, which use the same type of storage medium. For the devices included in this group enclosed by the dotted line, common content in an encrypted form may be transmitted at the same time from a provider, or a content key that can be used by all devices in the group may be transmitted. Each device in the group transmits content payment data in an encrypted form to a provider or a clearance institution. When content providers or institutions such as a clearance institution transmit data to devices, they may transmit data at the same time to all devices 0, 1, 2, and 3 in the group enclosed by the dotted line in FIG. 3. The tree shown in FIG. 3 may include a plurality of such groups. Content providers or institutions such as a clearance institution, which transmit and receive data to and from devices, function as message data distribution means.

All node keys and leaf keys may be managed in a unified fashion by one key management center, or node keys and leaf keys may be managed on a group-by-group basis by message data distribution means such as providers or clearance institutions that transmit and receive data to and from the respective groups. In a case where secrecy of a key is broken, node keys and leaf keys are renewed by the key management center, the providers, or the clearance institutions.

In the present tree structure, as can be seen from FIG. 3, all four devices 0, 1, 2, and 3 included in one group have common node keys K00, K0, and KR. Use of such common node keys makes it possible to provide, for example, a common content key only to the devices 0, 1, 2, and 3. For example, if the node key K00 that are held by all devices 0, 1, 2, and 3 is employed as a content key, it is possible to provide the content key that can be used in common only by the devices 0, 1, 2, and 3, without necessitating an additional key transmission process. If a content key Kcon is encrypted using the node key K00 and a value Enc(K00, Kcon) obtained as a result of encryption is distributed to the devices 0, 1, 2, and 3 via a network or a storage medium, then only the devices 0, 1, 2, and 3 can acquire the content key Kcon by decrypting the encryption value Enc(K00, Kcon) using the node key K00 that are held in common by these devices. Herein, Enc(Ka, Kb) denotes data that is obtained by encrypting Kb using Ka.

At a some point of time t, if it turns out that keys K0011, K001, K00, K0, and KR held by the device 3 have been analyzed by a hacker and secrecy of the key has been broken, it is needed to isolate the device 3 from the system to protect data transmitted or received in the system (the group including the devices 0, 1, 2, and 3). For this purpose, it is needed to change the node keys K001, K00, K0, and KR to new keys K(t)001, K(t)00, K(t)0, K(t)R and transmit the new keys to the devices 0, 1, and 2. Herein, K(t)aaa denotes a renewed key of generation of t obtained by renewing a key Kaaa.

Distribution of renewed keys is described below. Renewal of keys is achieved by supplying a table representing block data called an enabling key block (EKB) such as that shown in FIG. 4(A) to the devices 0, 1, and 2 via a network or a storage medium. The enabling key block (EKB) includes encrypted new keys to be distributed to devices corresponding to leaves in the tree structure shown in FIG. 3. The enabling key block (EKB) is also called a key renewal block (KRB).

The enabling key block (EKB) shown in FIG. 4(A) includes block data that can be used for renewal of keys only by devices that need renewal of node keys. In the specific example shown in FIG. 4(A), the block data is produced for the purpose of distributing renewed node keys of generation of t to the devices 0, 1, and 2 in the tree structure shown in FIG. 3. As can be seen from FIG. 3, the devices 0 and 1 need K(t)00, K(t)0, and K(t)R as renewed node keys, and the device 2 needs K(t)001, K(t)00, K(t)0, and K(t)R as renewed node keys.

As can be seen from FIG. 4(A), the EKB includes a plurality of encrypted keys. An encrypted key Enc(K0010, K(t)001) described at the bottom is produced by encrypting renewed node key K(t)001 by the leaf key K0010 held by the device 2, and thus the device 2 can acquire the renewed node key K(t)001 by decrypting Enc(K0010, K(t)001) using the leaf key of the device 2. Using this renewed node key K(t)001 obtained via decryption, an encrypted key Enc(K(t)001, K(t)00) in the second row as counted from the bottom in FIG. 4(A) can be decrypted into the renewed node key K(t)00. Similarly, an encrypted key Enc(K((t)00, K(t)0) in the second row as counted from the top in FIG. 4(A) can be decrypted into the renewed node key K(t)0, and an encrypted key Enc(K(t)0, K(t)R) at the top in FIG. 4(A) can be decrypted into K(t)R. On the other hand, for the devices K0000 and K0001, the node key K000 is not needed to renew, and thus only renewed keys K(t)00, K(t)0, and K(t)R are needed for the devices K0000 and K0001. The devices K0000 and K0001 acquire K(t)00 by decrypting an encrypted key Enc(K000, K(t)00) at the third row as counted from the top in FIG. 4(A), and acquire the renewed node key K(t)0 by decrypting the encrypted key Enc(K(t)00, K(t)0) at the second row as counted from the top in FIG. 4(A). Furthermore, K(t)R is acquired by decrypting the encrypted key Enc(K(t)0, K(t)R) at the top in FIG. 4(A). In this way, the devices 0, 1, and 2 can acquire the renewed key K(t)R. In FIG. 4(A), indexes indicate the absolute addresses of the node keys and leaf keys used as decryption keys.

In a case where the node keys K(t)0 and K(t)R in high levels of the tree structure shown in FIG. 3 are not needed to renew, but only the node key K00 is needed to renew, the enabling key block (EKB) may be formed such as shown in FIG. 4(B) whereby the renewed node key K(t)00 can be distributed to the devices 0, 1, and 2.

The EKB shown in FIG. 4(B) may be used to distribute a new content key to be used in common by a particular group. For example, let us assume that the devices 0, 1, 2, and 3 in the group enclosed by the dotted line in FIG. 3 use a particular type of storage media and that a new common content key K(t)con is needed. In this case, the renewed content key K(t)con for use in common is encrypted using K(t)00 obtained by renewing the node key K00 used in common by the devices 0, 1, 2, and 3, and resultant encrypted data Enc(K(t), K(t)con) is distributed together with the EKB shown in FIG. 4(B). This method of distribution allows data to be distributed such that the distributed data cannot be decrypted by the other devices, such as the device 4.

That is, the devices 0, 1, and 2 can acquire the content key K(t)con that is valid at the point of time t by decrypting the encrypted data described above using K(t)00 that can be obtained by processing the EKB.

Distribution of Content Key Using EKB

Figure 5:
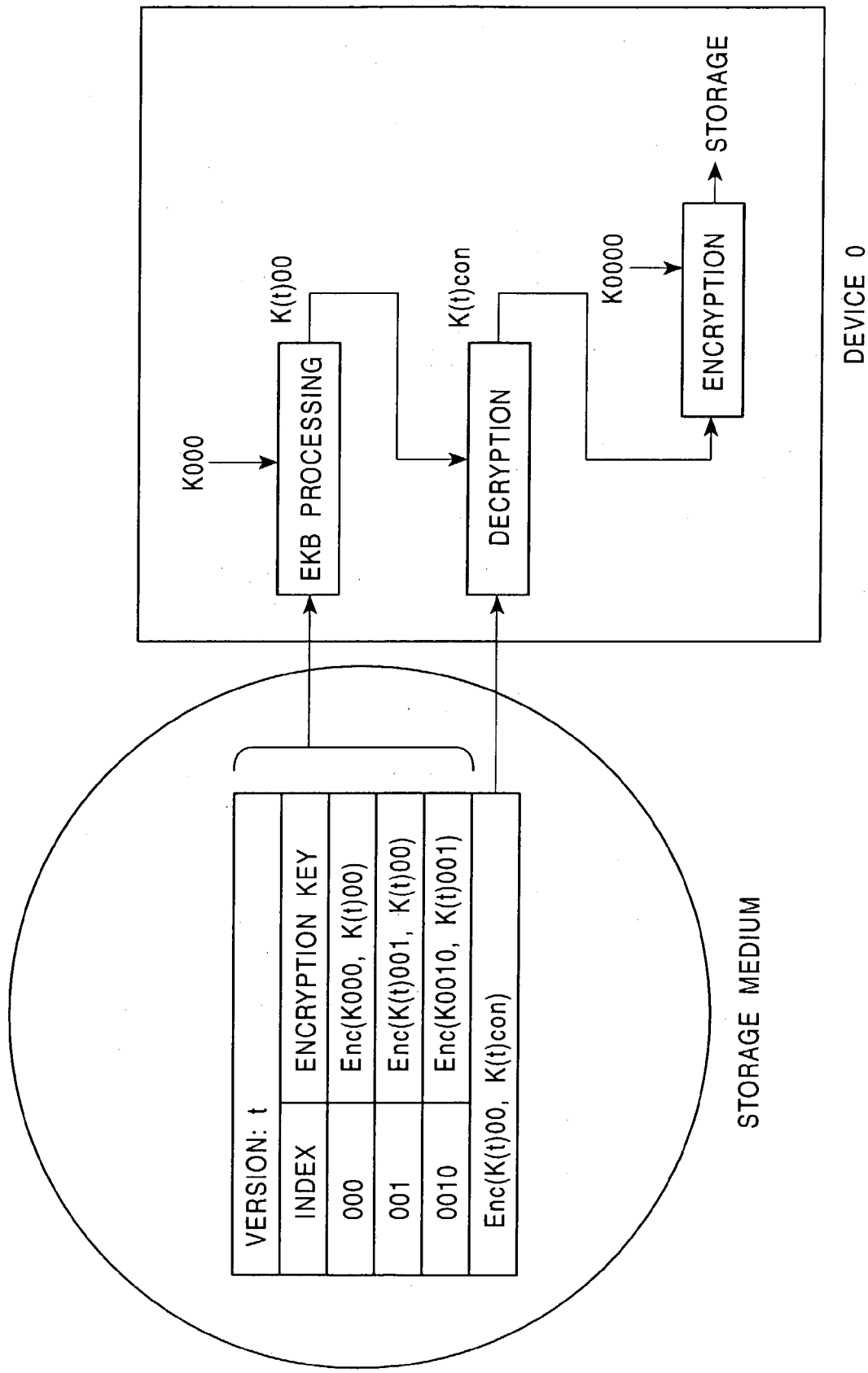
FIG. 5 is a diagram showing an example of a manner of distributing a content key using an enabling key block (EKB) and an example of a decryption process, in the information processing system according to the present invention.

FIG. 5 illustrates a specific example of a process performed by the device 0 to obtain the content key K(t)con which is valid at the point of time t from the data Enc(K(t) 00, K(t)con), which has been produced by encrypting the new common content key K(t)con using K(t)00 and supplied together with the EKB shown in FIG. 4(B) to the device 0 via a storage medium. In this case, the content key K(t)con is message data encrypted by the EKB.

As shown in FIG. 5, the device 0 produces the node key K(t)00 by processing the EKB of the generation of t stored on the storage medium using the node key K000, which is already held by the device 0, in a similar manner as described above. Thereafter, the renewed content key K(t) con is acquired by means of decryption using the renewed node key K(t)00. Furthermore, the renewed content key K(t)con is encrypted using the leaf key K0000 held only by the device 0 so that the content key K(t)con can be used at any time thereafter.

Format of EKB

Figure 6:
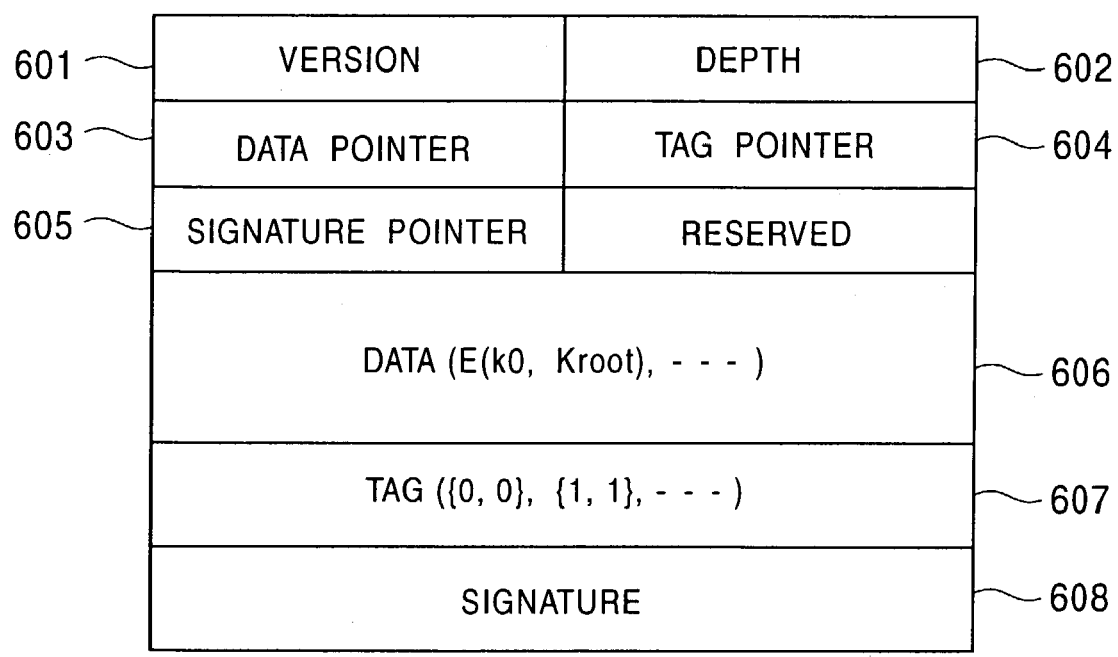
FIG. 6 is a diagram showing an example of a format of an enabling key block (EKB) used in the information processing system according to the present invention.

FIG. 6 shows an example of a format of an enabling key block (EKB). A version 601 is an identifier indicating the version of the enabling key block (EKB). The version serves not only to identify the newest EKB but also to indicate the correspondence with contents. The depth 602 indicates the number of layers of a hierarchical tree of devices to which the enabling key block (EKB) is distributed. A data pointer 603 points to a location of a data field in the enabling key block (EKB). A tag pointer 604 points to a location of a tag field, and a signature pointer 605 points to a location of a signature.

The data field 606 is used to store encrypted data such as a renewed node key. For example, data of encrypted keys associated with a renewed node key, such as that shown in FIG. 5, is stored in the data field 606.

Figure 7:
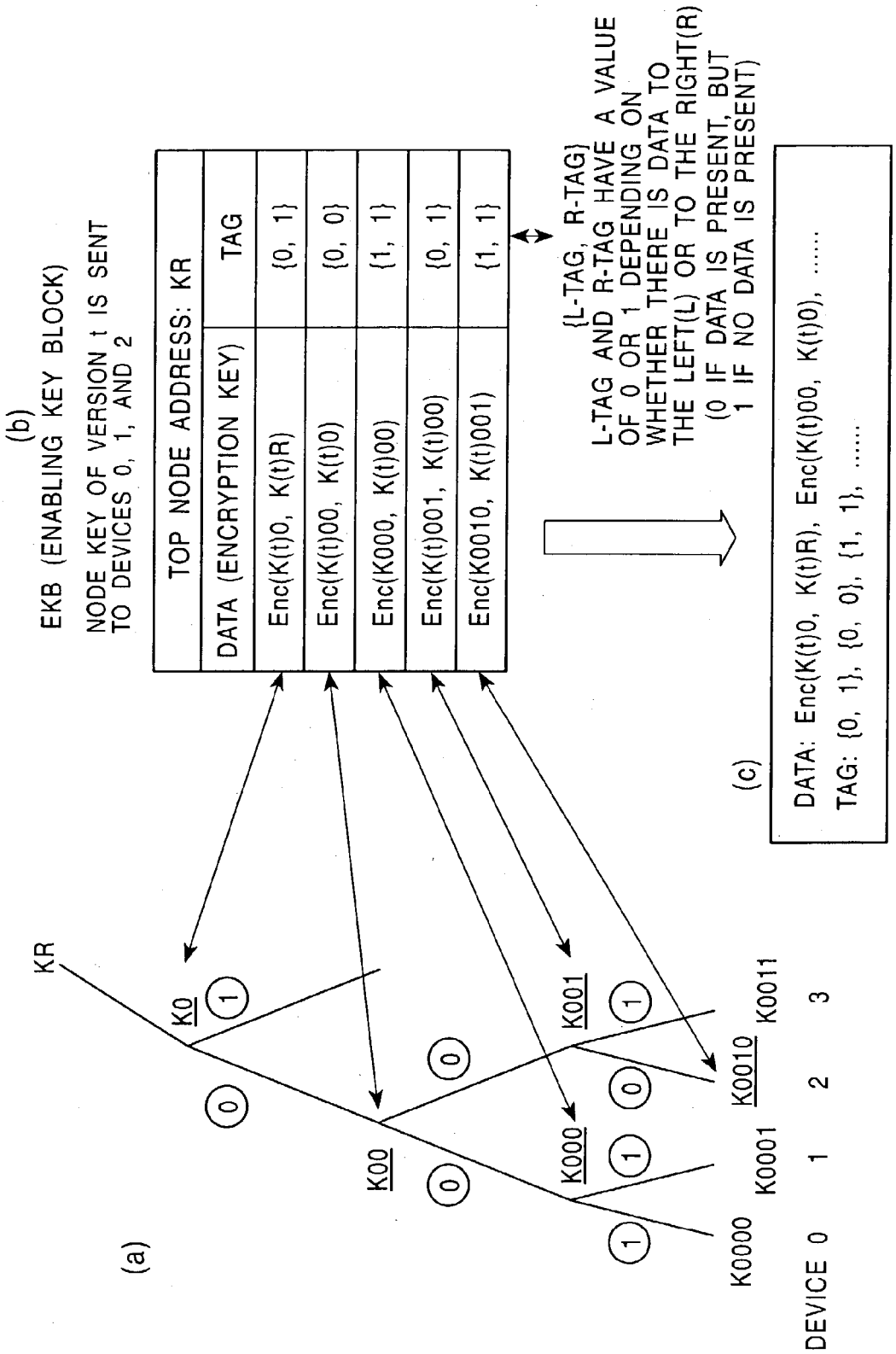
FIG. 7 is a diagram illustrating tags in an enabling key block (EKB) used in the information processing system according to the present invention.

The tag field 607 is used to store tags indicating the locations of the encrypted node keys and leaf key stored in the data field 606. The rule of determining the tags is described below with reference to FIG. 7. In a specific example shown in FIG. 7, the enabling key block (EKB) described above with reference to FIG. 4(A) is transmitted as the data. A table (b) in FIG. 7 shows the data that is transmitted in this specific example. Herein, the address of a top node in the encrypted keys is referred to as a top node address. In this case, because a renewed root key K(t)R is included in the encrypted keys, the top node address becomes KR. The data Enc(K(t)0, K(t)R) at the top correspond to a location of the hierarchical tree shown in (a) of FIG. 7. The location in the heretical tree for the next data Enc(K(t)00, K(t)0) is lower left to the location of the previous data. When there is data, the tag is set to 0, while the tag is set to 1 when there is no data. The tag is represented in the form of {L-tag, R-tag}, wherein L-tag denotes a left tag and R-tag denotes a right tag. In the case of the data Enc(K(t)0, K(t)R) in the top row, there is data to the left thereof, and thus the L-tag is set to 0, while the R-tag is set to 1 because there is no data to the right thereof. Tags are set for all data in a similar manner. As a result, a sequence of data and a sequence of tags are produced as shown in FIG. 7(c).

The tags indicate the locations of data Enc(Kxxx, Kyyy) in the tree structure. Key data Enc(Kxxx, Kyyy) stored in the data field is a simple sequence of encrypted keys, and thus the tags are used to indicate the locations, in the tree, of encrypted keys stored in the data field 606. Instead of using the tags, the locations in the tree may be represented by adding node indexes to the corresponding encrypted data, as described earlier with reference to FIG. 4. More specifically, the node indexes may be added as follows:

0: Enc (K(t)0, K(t)root)
00: Enc (K(t)00, K(t)0)
000: Enc (K (t) 000, K (T) 00)

and so on. However, use of the indexes results in redundancy in the data, and thus a greater data size is needed to describe the data, which is undesirable in transmission via a network. In contrast, if the tags are used as index data indicating the locations of keys, the locations of keys can be indicated by data with a smaller data size.

Referring back to FIG. 6, the format of EKB is described further. A signature is a digital signature written by a key management center, a content provider, or a clearance institution, which has issued the enabling key block (EKB). When a device receives the EKB, the device verifies the signature to determine whether the received enabling key block (EKB) is a correct one issued by an authorized enabling key block (EKB) issuer.

Distribution of a Content Key and Content Using an EKB

In the example described above, only the content key is transmitted together with the EKB. Content encrypted using a content key may also be transmitted together with a content key encrypted using a content key encryption key and the content key encryption key encrypted using an EKB, as described below.

Figure 8:
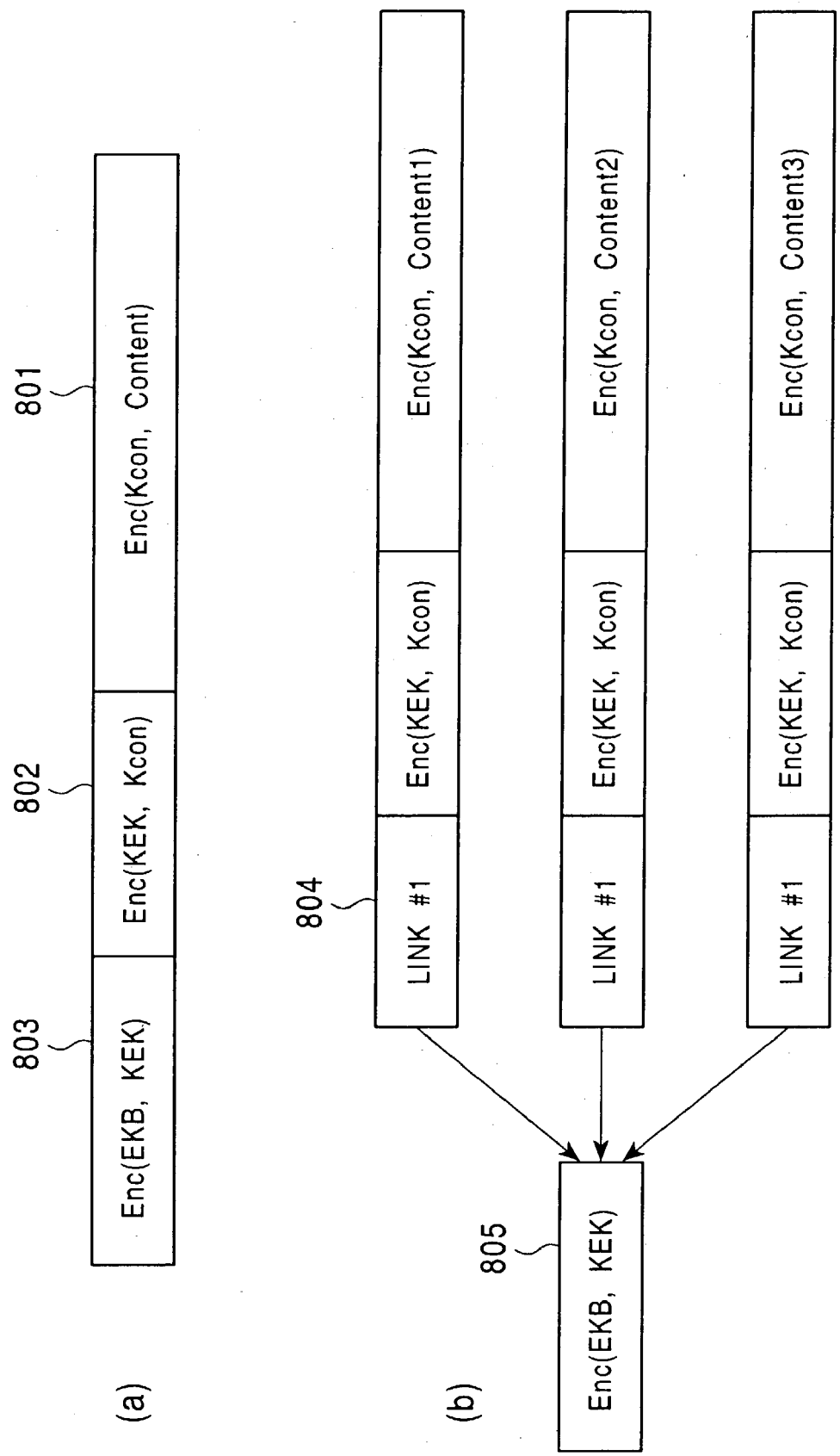
FIG. 8 is a diagram showing an example of a data format used to distribute an enabling key block (EKB) together with a content key and content, in the processing system according to the present invention.

FIG. 8 shows a data format used for the present purpose. In the data format shown in FIG. 8(a), Enc(Kcon, content) 801 denotes data produced by encrypting the content using the content key (Kcon). Enc(KEK, Kcon) 802 is data produced by encrypting the content key (Kcon) using the content key encryption key (KEK). Enc(EKB, KEK) 803 denotes data produced by encrypting the content key encryption key KEK using the enabling key block (EKB).

Herein, the node key (K000, K000, . . . ) shown in FIG. 3 or the root key (KR) may be employed as the content key encryption key KEK, or a key encrypted using the node key (K000, K00, . . . ) or the root key (KR) may be employed.

FIG. 8(b) shows a data format that may be used when a plurality of contents are stored on a medium, and all contents use the same encrypted data Enc(EKB, KEK) 805. In this case, data pointing to Enc(EKB, KEK) is added to the respective content data, instead of adding the same Enc (EKB, KEK) to the respective content data.

Figure 9:
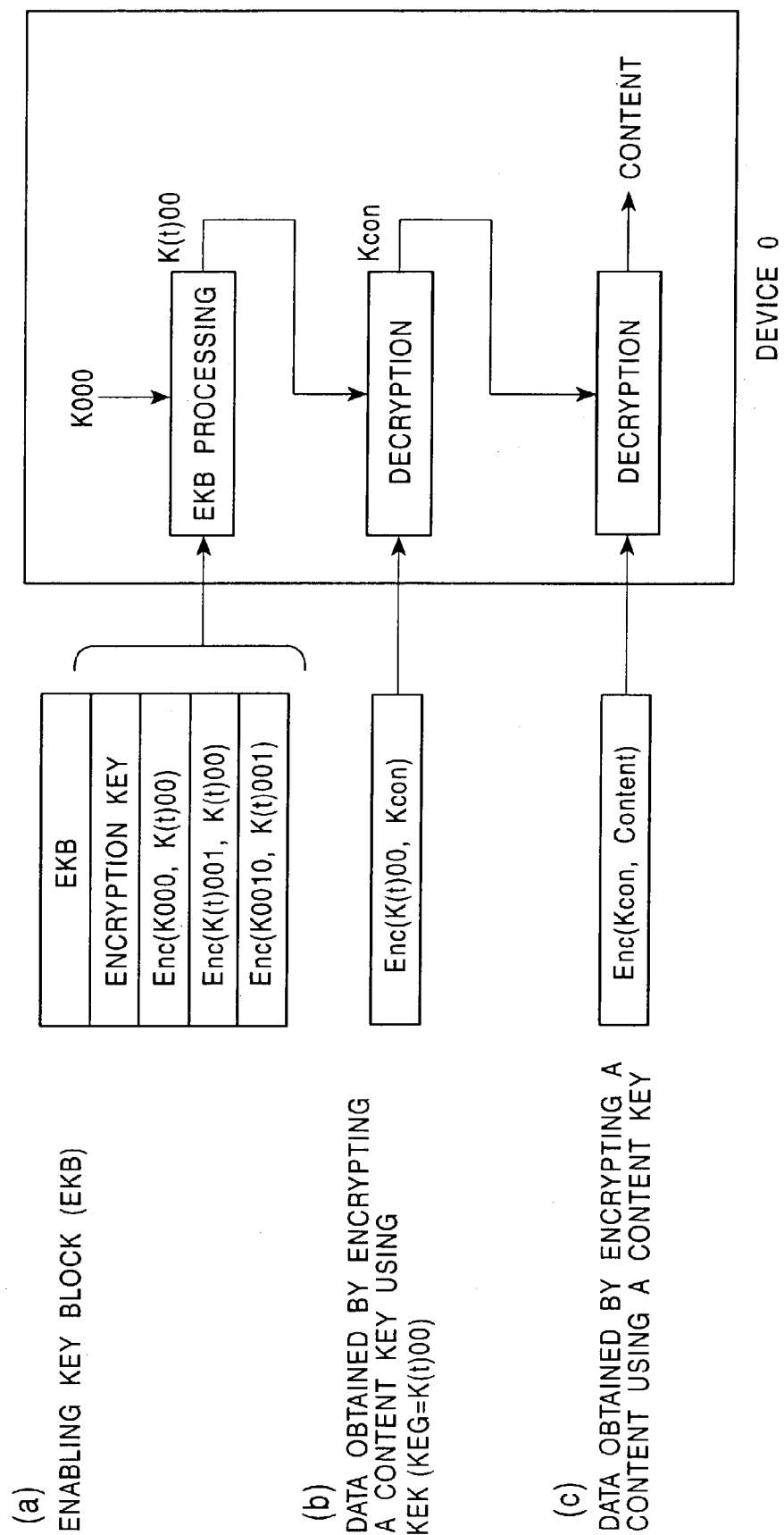
FIG. 9 is a diagram showing an example of a process performed by a device in a case where an enabling key block (EKB) is distributed together with a content key and content, in the processing system according to the present invention.

FIG. 9 shows an example in which the content key encryption key KEK is employed as a renewed node key K(t)00 to be used instead of the node key K00 shown in FIG. 3. In the case where the device 3 in the group enclosed by the dotted line in FIG. 3 has been revoked because of exposure of secrecy of a key, if the enabling key block (EKB) shown in FIG. 9(a), data produced by encrypting the content key (Kcon) using the content key encryption key (KEK=K(t)00) shown in FIG. 9(b), and data produced by encrypting the content using the content key (Kcon) shown in FIG. 9(c) are supplied to the other members in the group, that is, to the devices 0, 1, and 2, the devices 0, 1, and 2 can acquire the content.

A decryption procedure performed by the device 0 is shown on the right-hand side of FIG. 9. First, the device 0 acquires the content key decryption key (KEK=K(t)00) from the received enabling key block by performing a decryption process using the leaf key K000 held by the device 0. The device 0 then acquires the content key Kcon by means of decryption using K(t)00 and finally acquires the content by means of decryption using the content key Kcon. Thus, the device 0 can obtain the content. Similarly, the devices 1 and 2 can acquire the content key encryption key (KEK=K(t)00) by processing the EKB according to their own procedures and can further acquire the content.

Even if the devices 4, 5, 6, and so on of the other groups shown in FIG. 3 received similar data (EKB), they cannot acquire the content key encryption key (KEK=K(t)00) using the leaf keys or node keys held by them. The revoked device 3 can also not acquire the content key encryption key (KEK=K(t)00) using the leaf key or node keys held by the device 3. Thus, only the authorized devices can decrypt the content and can use the decrypted content.

Thus, the above-described method of transmitting a content key using an EKB makes it possible to securely distribute encrypted content using a small amount of data such that only authorized users can decrypt the encrypted content.

In the example described above, the enabling key block (EKB), the content key, and the encrypted content are securely distributed via the network. Alternatively, the enabling key block (EKB), the content key, and the encrypted content may be stored on a storage medium such as a DVD or a CD and the storage medium may be supplied to a user thereby providing the enabling key block (EKB), the content key, and the encrypted content to the user. In this case, if the encrypted content and the enabling key block (EKB) are stored on the same storage medium so that the encrypted content can be decrypted using the content key that can be obtained by decrypting the enabling key block (EKB), it is possible to realize a simple content distribution system that allows only limited authorized user devices to use distributed encrypted content by decrypting it using a leaf key or node keys held by the user devices.

Figure 10:
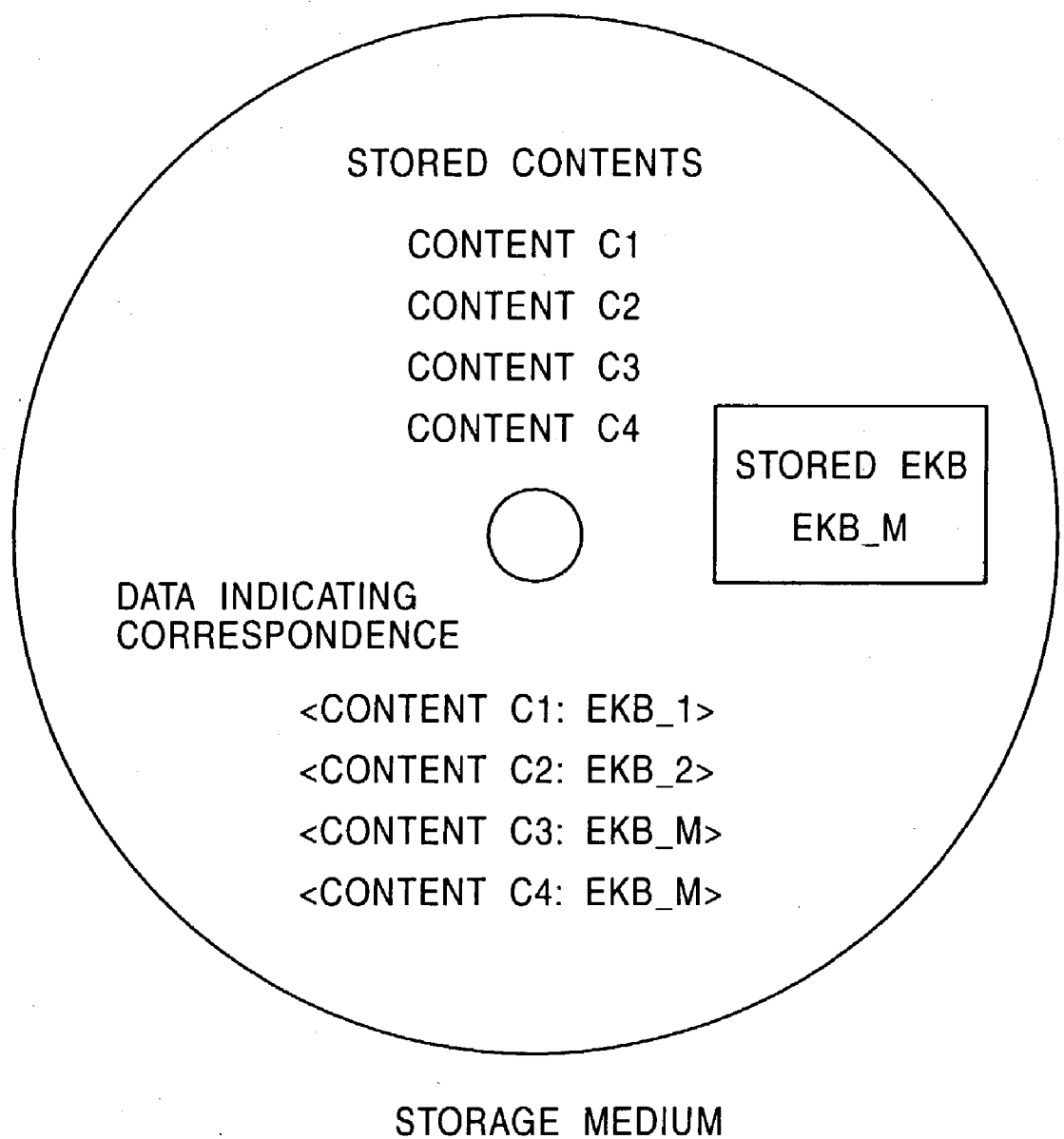
FIG. 10 is a diagram showing correspondence between an enabling key block (EKB) and content for a case in which an enabling key block (EKB) and contents are stored on a storage medium, in the information processing system according to the present invention.

FIG. 10 shows an example in which encrypted contents and enabling key blocks (EKB) are stored together on a storage medium. In this specific example shown in FIG. 10, contents C1 to C4 are stored on a storage medium, and data indicating the correspondence between the respective contents and enabling key blocks (EKB) is stored on the same storage medium, and furthermore an enabling key block of version M (EKB_M) is also stored. For example, EKB_1 is used to produce a content key Kcon1 used to encrypt the content C1, and EKB_2 is used to produce a content key Kcon2 used to encrypt the content C2. In this example, because the enabling key block (EKB_M) of version M is stored on the storage medium, and because the contents C3 and C4 are related to the enabling key block (EKB_M), it is possible to acquire the content key for the contents C3 and C4 by decrypting the enabling key block (EKB_M). On the other hand, because EKB_1 and EKB_2 are not stored on the disk, it is needed to acquire them via another means such as a network communication or another storage medium to decrypt the content keys C1 and C2.

FIG. 11 shows a comparison between a process of distributing a content key using an EKB and a process of distributing a content key according to the conventional technique, for a case in which the content keys are distributed among a plurality of devices. The conventional technique is shown in the upper half area (a) of FIG. 11, and the technique using the enabling key block (EKB) according to the present invention is shown in the lower half area (b) of FIG. 11. In FIG. 11, Ka(Kb) denotes data produced by encrypting Kb using Ka.

In the conventional technique, as shown in (a), authentication and key exchange (AKE) are performed between devices to verify that transmitting and receiving devices are authorized devices and to produce a session key Kses to be used in common by both devices. If and only if the authentication is successfully passed, a content key Kcon is encrypted using the session key Kses and the resultant encrypted data is transmitted.

For example, a PC shown in FIG. 11(a) can acquire Kcon by decrypting encrypted content key Kses(Kcon) using a received session key. Furthermore, the PC can encrypt the acquired content key Kcon using a storage key Kstr held by the PC and store resultant encrypted data into a memory of the PC.

In FIG. 11(a), even in a case where a content provider wants to transmit data such that only a storage device 1101 shown in FIG. 11(a) can use the data, if there are a PC and a playback apparatus between the content provider and the storage device 1101, it is needed to perform authentication as shown in FIG. 11(a) and then transmit a content key encrypted using a session key. In this case, the PC and the playback apparatus existing between them can acquire the content key by decrypting the encrypted content key using the session key produced via the authentication process and acquired by the PC and the playback apparatus.

On the other hand, in the example shown in the lower half area (b) of FIG. 11 in which a content provider transmits an enabling key block (EKB) and data (Eroot(Kcon)) in the specific example shown in FIG. 11(b)) produced by encrypting a content key Kcon using a node key or a root key that is obtained by processing the enabling key block (EKB), only a device which can process the received EKB can perform decryption to acquire the content key Kcon.

Therefore, if an enabling key block (EKB) is produced such that it can be used only by a device (e.g., storage medium) located on the right end in FIG. 11(b), and if the enabling key block (EKB) is transmitted together with data produced by encrypting a content key Kcon using a node key or a root key that can be obtained by processing the EKB, a device such as a PC or a playback apparatus existing between the content provider and the device on the right end cannot process the EKB using the leaf key or node key held in the PC or the playback apparatus. Therefore, it is possible to securely transmit a content key that can be used only with an authorized device without necessitating a process between transmitting and receiving devices, such as authentication, production of a session key, and encryption of the content key Kcon using the session key.

When it is desired to transmit a content key such that it can also be used by the PC and the playback apparatus, if an enabling key block (EKB) is produced such that it can be processed by any of these devices which should be allowed to use the content key, and if the resultant EKB is transmitted, then these device can acquire the content key.

Distribution of an Authentication Key Using an Enabling Key Block (EKB) (By Means of Common Key Cryptography)

In the distribution of data or a key using an enabling key block (EKB) according to the above-described technique, the enabling key block (EKB) and the content or the content key that are transmitted between devices are encrypted into the same form. Therefore, there is a possibility that an unauthorized copy is made by a so-called replay attack technique in which data is stolen and recorded by tapping a data transmission line and the recorded data is transferred later. To prevent data from being copied in an unauthorized manner, it is effective to perform authentication and key exchange as in the conventional technique. Thus, herein, a technique is disclosed in which an authentication key Kake used in authentication and key exchange is transmitted to a device. This is done using an enabling key block (EKB) according to the above-described technique, thereby allowing the common authentication key to be used as a secure secret key and thus allowing authentication to be performed according to the common key cryptography technique. That is, in this technique, the authentication key is transmitted as message data encrypted by an EKB.

Figure 12:
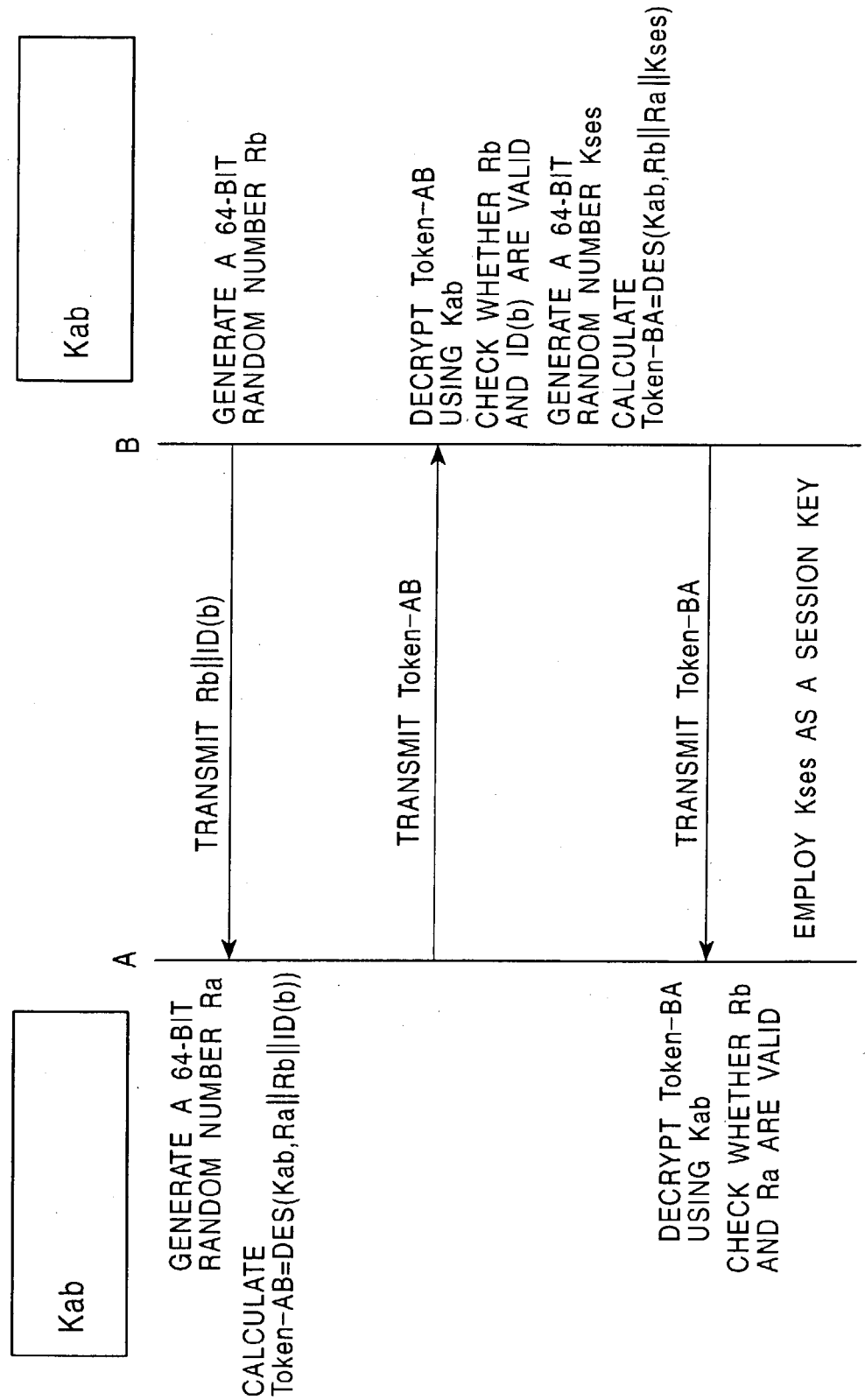
FIG. 12 is a diagram showing an authentication sequence using a common key cryptographic technique, performed in the information processing system according to the present invention.

FIG. 12 shows a mutual authentication method using common key cryptography (according to ISO/IEC9798-2). In the example shown in FIG. 12, a common key cryptography technique based on the DES is employed, another similar common key cryptography technique may also be employed. In FIG. 12, a device B first generates a 64-bit random number Rb and transmits Rb, together with an identifier ID(b) of the device B, to a device A. In response to receiving Rb and ID(b), the device A generates a 64-bit random number Ra and encrypts Ra, Rb, and ID(b) using a key Kab in the CBC mode of the DES, in the order of Ra, Rb, and ID (b). The resultant encrypted data is returned to the device B. Herein, the key Kab is a key that is used as a secret key in common by the devices A and B and that is stored in a storage device of each of the devices A and B. The encryption using the key Kab in the CBC mode of the DES may be performed as follows. In the process using the DES, the exclusive OR between the initial value and Ra is calculated and the result is encrypted by the DES encryption unit using a key Kab, thereby obtaining encrypted data E1. The exclusive OR between E1 and Rb is calculated and the result is encrypted by the DES encryption unit using the key Kab, thereby obtaining encrypted data E2. Furthermore, the exclusive OR between the encrypted data E3 and ID(b) is calculated, and the result is encrypted by the DES encryption unit using the key Kab, thereby obtaining encrypted data E3. The obtained encrypted data E1 to E3 (Token-AB) are transmitted.

If the device B receives the encrypted data, the device B decrypts the received data using the key Kab (authentication key) as the secret key used in common. More specifically, the decryption of the received data is performed as follows. First, the encrypted data E1 is decrypted using the authentication key Kab to obtain the random value Ra. Thereafter, the encrypted data E2 is decrypted using the authentication key Kab. Rb is obtained by calculating exclusive OR between the resultant decrypted data and E1. Finally, the encrypted data E3 is decrypted using the authentication key Kab, and exclusive OR between the resultant decrypted data and E2 is calculated to obtain ID(b). Of Ra, Rb, and ID(b) obtained via the above process, Rb and ID(b) are compared with those transmitted from the device B to verify whether they are identical. If the verification is successfully passed, the device B determines that the device A is an authorized device.

Thereafter, the device B generates a session key (Kses) which will be used after the authentication (the session key Kses is generated using a random number). Rb, Ra, and Kses are encrypted, in this order, using the authentication key Kab in the CBC mode of the DES and transmitted to the device A.

Upon receiving the data, the device A decrypts the received data using the authentication key Kab. The received data can be decrypted in a similar manner to decryption performed by the device B, and thus it is not described in further detail herein. Thus, Rb, Ra and Kses are obtained, and Rb and Ra are compared with the original data transmitted from the device A. If the verification is successfully passed, the device A determines that the device B is an authorized device. In communication performed after the mutual authentication has been successfully passed, the session key Kses is used to secure the secrecy.

In the case where the received data is determined as being invalid in the above-described verification, the mutual authentication fails and the process is terminated.

In the authentication process described above, the authentication key Kab is used in common by both devices A and B. This common key Kab is transmitted to the devices by means of the above-described technique using an enabling key block (EKB).

More specifically, in the example shown in FIG. 12, one of devices A and B produces an enabling key block (EKB) such that it can be decrypted by the other device, and said one of devices further encrypts the authentication key Kab using the produced enabling key block (KEB) and transmits the resultant encrypted data to the other device. Alternatively, a third party may produce an enabling key block (EKB) that can be used by both devices A and B, and may transmit an authentication key Kab encrypted using the produced enabling key block (EKB) to the devices A and B.

Figure 13:
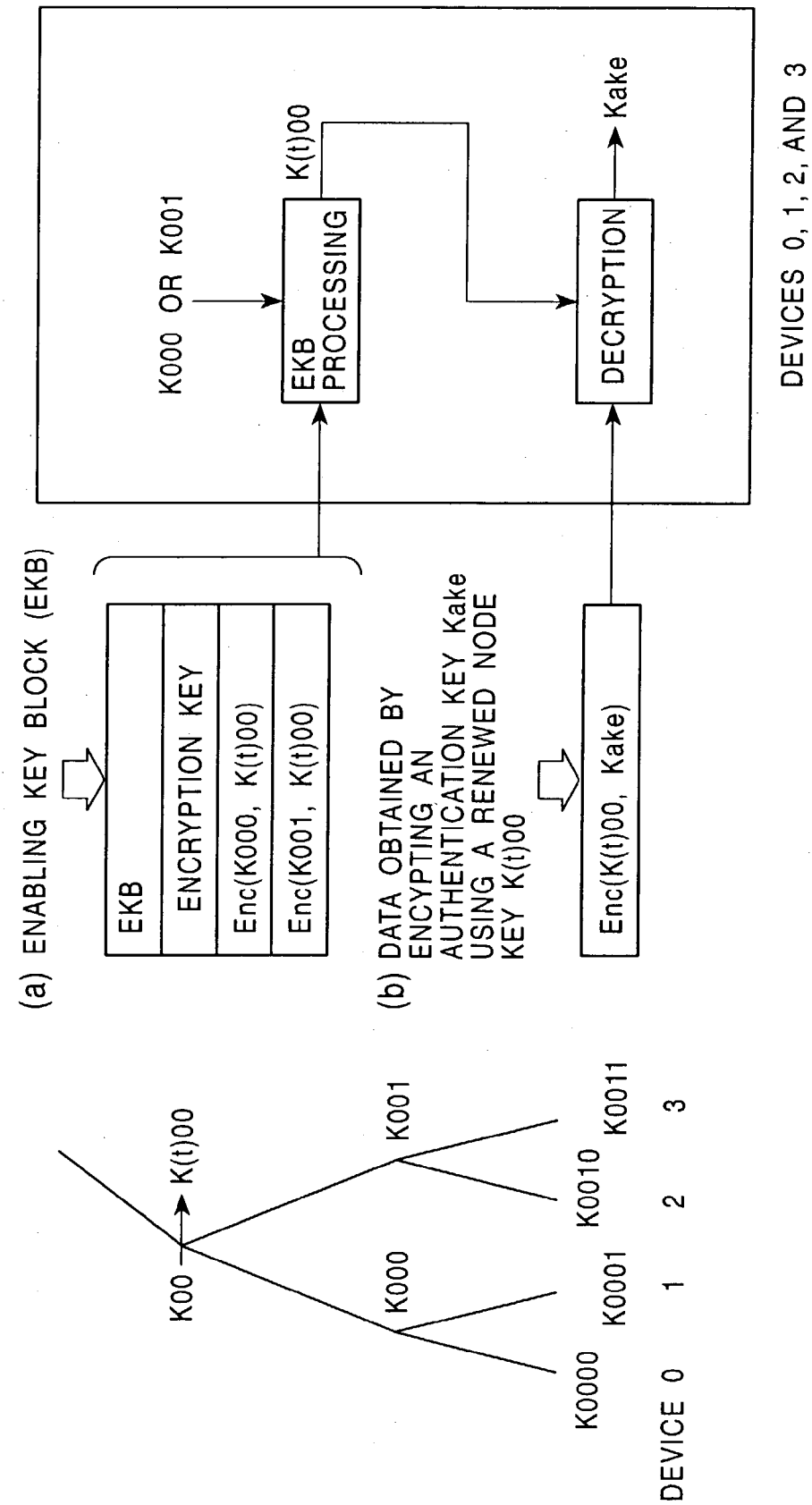
FIG. 13 is a diagram showing (a first example of) a data format used to distribute an enabling key block (EKB) together with an authentication key and an example of a process performed by a device, in the information processing system according to the present invention.
Figure 14:
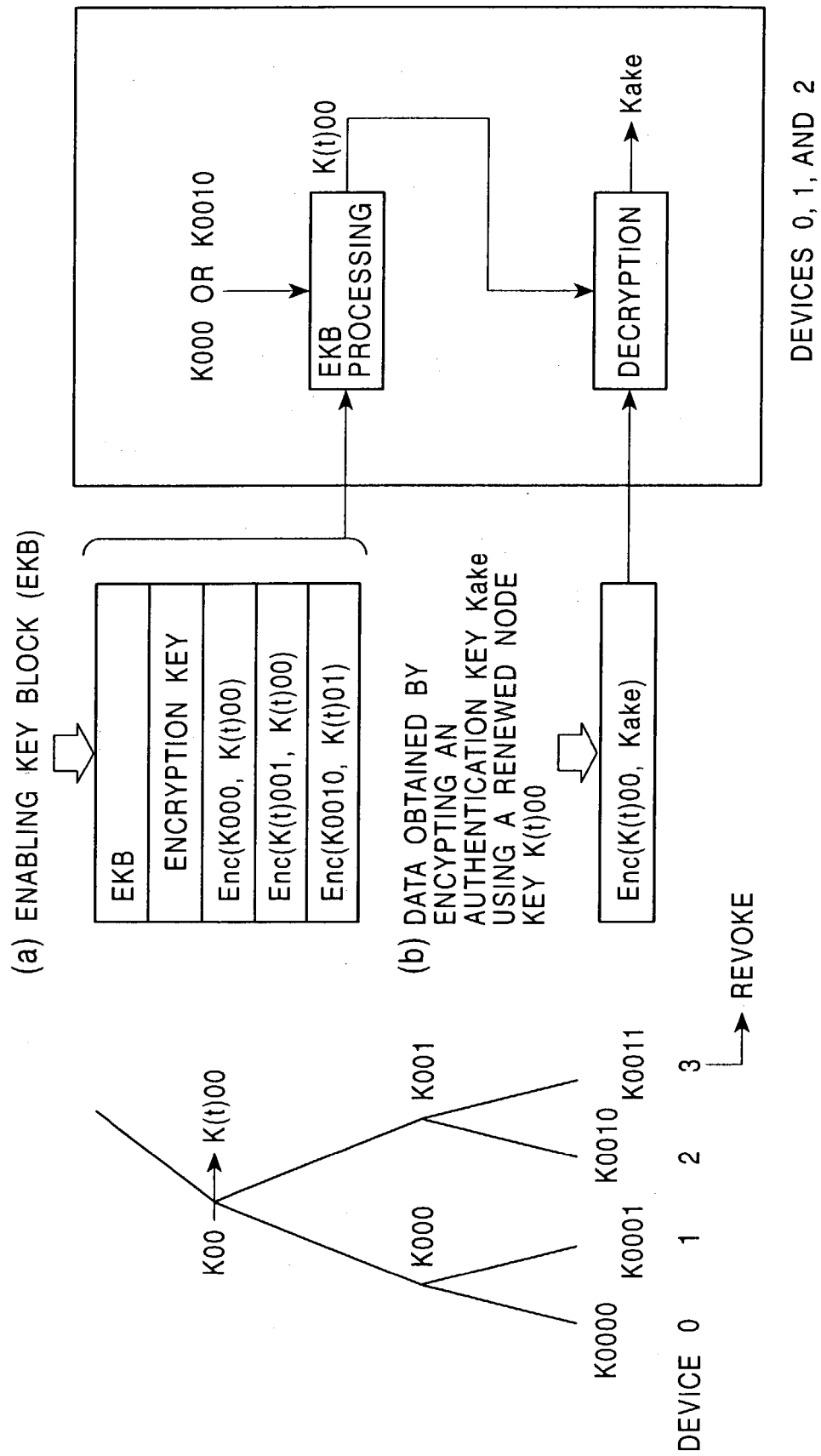
FIG. 14 is a diagram showing (a second example of) a data format used to distribute an enabling key block (EKB) together with an authentication key and an example of a process performed by a device, in the information processing system according to the present invention.

FIGS. 13 and 14 show examples of processes of transmitting a common authentication key Kake to a plurality of devices by means of the technique using an enabling key block (EKB). In the example shown in FIG. 13, an authentication key Kake that can be decrypted by devices 0, 1, 2, and 3 is transmitted to these devices. In the example shown in FIG. 14, of devices 0, 1, 2 and 3, the device 3 is revoked, and an authentication key that can be decrypted only by devices 0, 1 and 2 is transmitted.

In the example shown in FIG. 13, data (b) produced by encrypting an authentication key Kake using a renewed node key K(t)00 is transmitted together with an enabling key block (EKB) produced such that the renewed node key K(t)00 can be obtained by decrypting the EKB using node keys and leaf keys held by the respective devices 0, 1, 2, and 3. As shown on the right-hand side of FIG. 13, each device first acquires the renewed node key K(t)00 by processing (decrypting) the EKB and then acquires the authentication key Kake by decrypting the encrypted authentication key Enc(K(t)00, Kake) using the acquired node key K(t)00.

Even if one of the other devices 4, 5, 6, 7, and so on receives the same enabling key block (EKB), the device cannot process the EKB using a node key or a leaf key held by the device to acquire the renewed node key K(t)00. Thus, it is possible to securely transmit the authentication key only to authorized devices.

On the other hand, in the example shown in FIG. 14, in a situation in which the device 3 in the group enclosed by the dotted line in FIG. 3 has been revoked because of exposure of secrecy of a key, an enabling key block (EKB) is produced such that it can be decrypted only by the other members of the group, that is, the devices 0, 1, and 2, and the produced enabling key block (EKB) is transmitted. More specifically, the enabling key block (EKB) shown in FIG. 14(a) and the data, shown in FIG. 14(b), produced by encrypting the authentication key (Kake) using the node key (K(t)00) are transmitted together.

The decryption procedure is shown on the right-hand side of FIG. 14. Each device 0, 1, and 2 first acquires the renewed node key (K(t)00) from the received enabling key block by performing decryption using a leaf key or a node key held by the device. Thereafter, each device acquires the authentication key Kake by performing decryption using K(t)00.

Even if one of the devices 4, 5, 6, and so on of the other groups shown in FIG. 3 received similar data (EKB), it cannot acquire the renewed node key (K(t)00) using a leaf key or a node key held by it. The revoked device 3 can also not acquire the renewed node key (K(t)00) using a leaf key or a node key held by it. Thus, only the authorized devices can decrypt the authentication key and can use it.

Thus, the above-described method of transmitting an authentication key using an EKB makes it possible to securely transmit an encrypted authentication key using a small amount of data such that only authorized users can decrypt the encrypted authentication key.

Distribution of a Content Key Using a Public Key Certificate and an Enabling Key Block (EKB)

Figure 15:
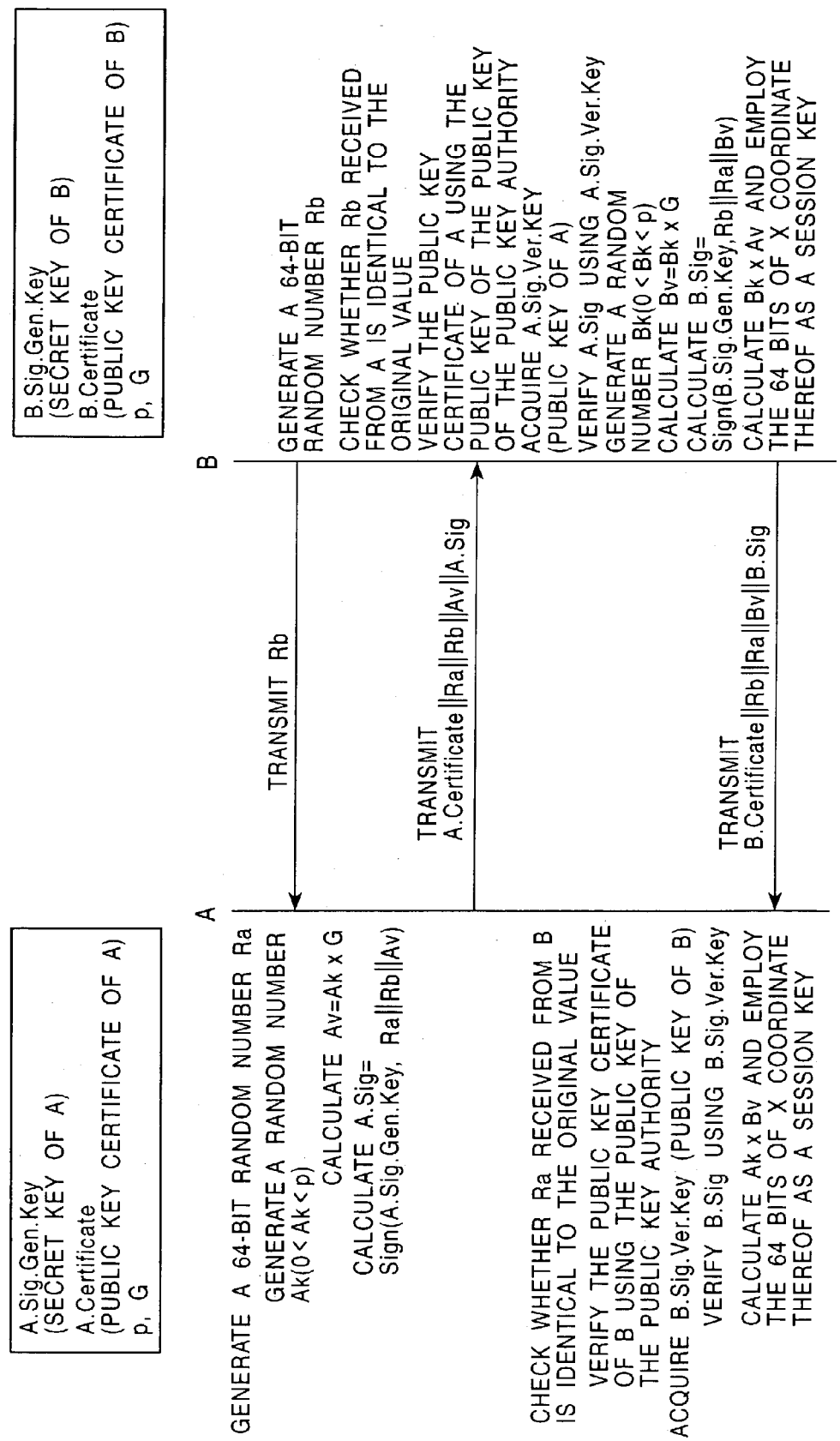
FIG. 15 is a diagram showing an authentication sequence using a public key cryptographic technique, performed in the information processing system according to the present invention.

Now, a method of distributing a content key using a public key certificate and an enabling key block (EKB) is described below. First, a method of mutual authentication using 160-bit elliptic-curve cryptography (ECC), which is one public key cryptography scheme, is described below with reference to FIG. 15. Although ECC is employed as the public key cryptography scheme in the process shown in FIG. 15, another similar symmetric key cryptography scheme may also be employed. Furthermore, the key size is not limited to 160 bits. In FIG. 15, first, a device B generates a 64-bit random number Rb and transmits it to a device A. Upon receiving Rb, the device A generates a 64-bit random number Ra and a ransom number Ak smaller than a prime number p. Point Av=Ak×G is calculated by multiplying a base point G by Ak. A digital signature A.Sig for Ra, Rb, and Av (X and Y coordinates) is then generated and transmitted together with a public key certificate of the device A to the device B. Herein, Ra and Rb have a length of 64 bits and the X and Y coordinates of Av have a length of 160 bits, and thus the digital signature is generated for a total length of 448 bits.

Upon receiving the public key certificate of the device A, Ra, Rb, Av, and the digital signature A.Sig, the digital device B verifies whether Rb received from the device A is equal to the original value generated by the device B. If the verification indicates that Rb is equal to the original value, the digital signature written in the public key certificate of the device A is then verified using the public key of the certificate authority, and the public key of the device A is extracted. Thereafter, the digital signature A.Sig is verified using the extracted public key of the device A.

Thereafter, the device B generates a random number Bk smaller than the prime number p. Thereafter, point Bv=Bk×G is calculated by multiplying the base point G by Bk. A digital signature B.Sig for Rb, Ra, Bv (X and Y coordinates) is then generated and transmitted together with a public key certificate of the device B to the device A.

Upon receiving the public key certificate of the device B, Rb, Ra, Av, and the digital signature B.Sig, the digital device A verifies whether Ra received from the device B is equal to the original value generated by the device A. If the verification indicates that Ra is equal to the original value, the digital signature written in the public key certificate of the device B is then verified using the public key of the certificate authority, and the public key of the device B is extracted. Thereafter, the digital signature B.Sig is verified using the extracted public key of the device B. If the verification of the digital signature is successfully passed, the device A regards the device B as being an authorized device.

If the mutual authentication is successfully passed, the device B calculates Bk×Av (by multiplying the point Av on the elliptic curve by Bk which is a random number), and the device A calculates Ak×Bv. Lower-order 64 bits of the X coordinates of the resultant points are used as a session key during communication performed thereafter (in the case where 64-bit keys are used as symmetric keys according to the symmetric key cryptography). The session key may be generated from Y coordinates. Instead of employing lower-order 64 bits, another set of bits may also be employed. In secret communication performed after the mutual authentication, a digital signature may be added to data encrypted using a session key.

In the case where the digital signature or the received data is determined as being invalid in the above-described verification, the mutual authentication fails and the process is terminated.

Figure 16:
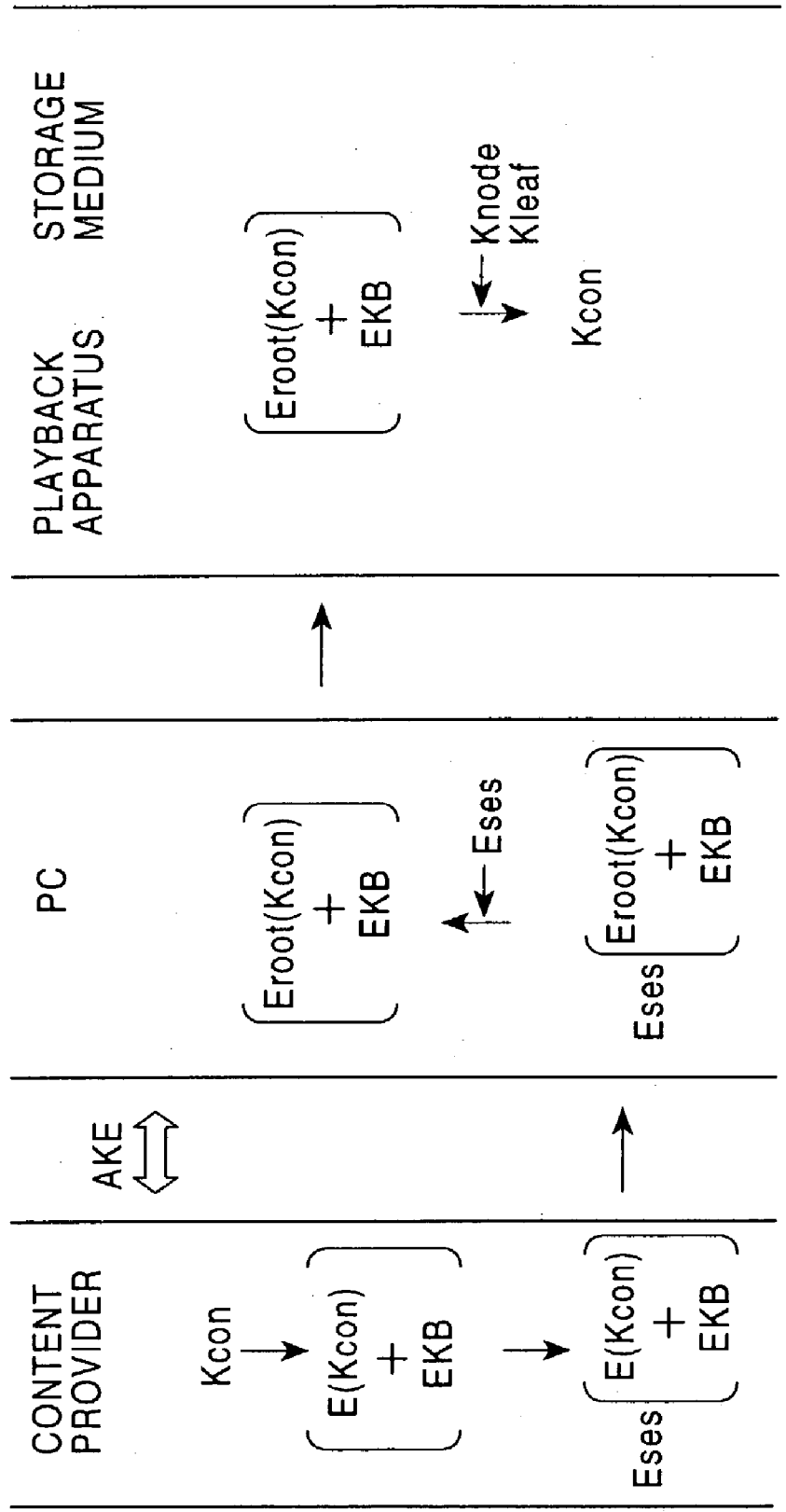
FIG. 16 is a diagram showing a process of transmitting an enabling key block (EKB) together with a content key using authentication using a public key cryptographic technique, in the processing system according to the present invention.

FIG. 16 shows an example of a process of distributing a content key using a public key certificate and an enabling key block (EKB). First, authentication is performed between a content provider and a PC by means of the public key cryptography technique described above with reference to FIG. 15. The content provider produces an EKB that can be decrypted using a node key or a leaf key held by a playback apparatus or a storage medium to which a content key is to be transmitted. Thereafter, the encrypted content key E(Kcon) produced by encrypting the content key using a renewed node key and the enabling key block (EKB) are encrypted using a session key Kses produced via the authentication between the content provider and the PC, and the resultant data is transmitted to the PC.

The PC decrypts, using the session key, the content key E(Kcon) encrypted using the renewed node key and the enabling key block (EKB), which were both encrypted using the session key, and transmits the resultant decrypted data to the playback apparatus and the storage medium.

The playback apparatus and the storage medium acquire the content key Kcon by decrypting, using a node key or a leaf key held by them, the content key E(Kcon) encrypted using the renewed node key and the enabling key block (EKB).

In this method, if and only if authentication between the content provider and the PC is successfully passed, the content key E(Kcon) encrypted using the renewed node key and the enabling key block (EKB) are transmitted, thereby ensuring that data can be securely transmitted only to an authorized device even in a situation in which secrecy of a node key has been exposed.

Distribution of a Program Code Using an Enabling Key Block (EKB)

In the examples described above, data such as a content key, an authentication key, or the like is encrypted using an enabling key block (EKB) and resultant encrypted data is transmitted. Various kinds of program codes may also be transmitted in a similar manner using an enabling key block (EKB). In this case, a program code is transmitted as message data encrypted using an EKB. The process is described in further detail below.

Figure 17:
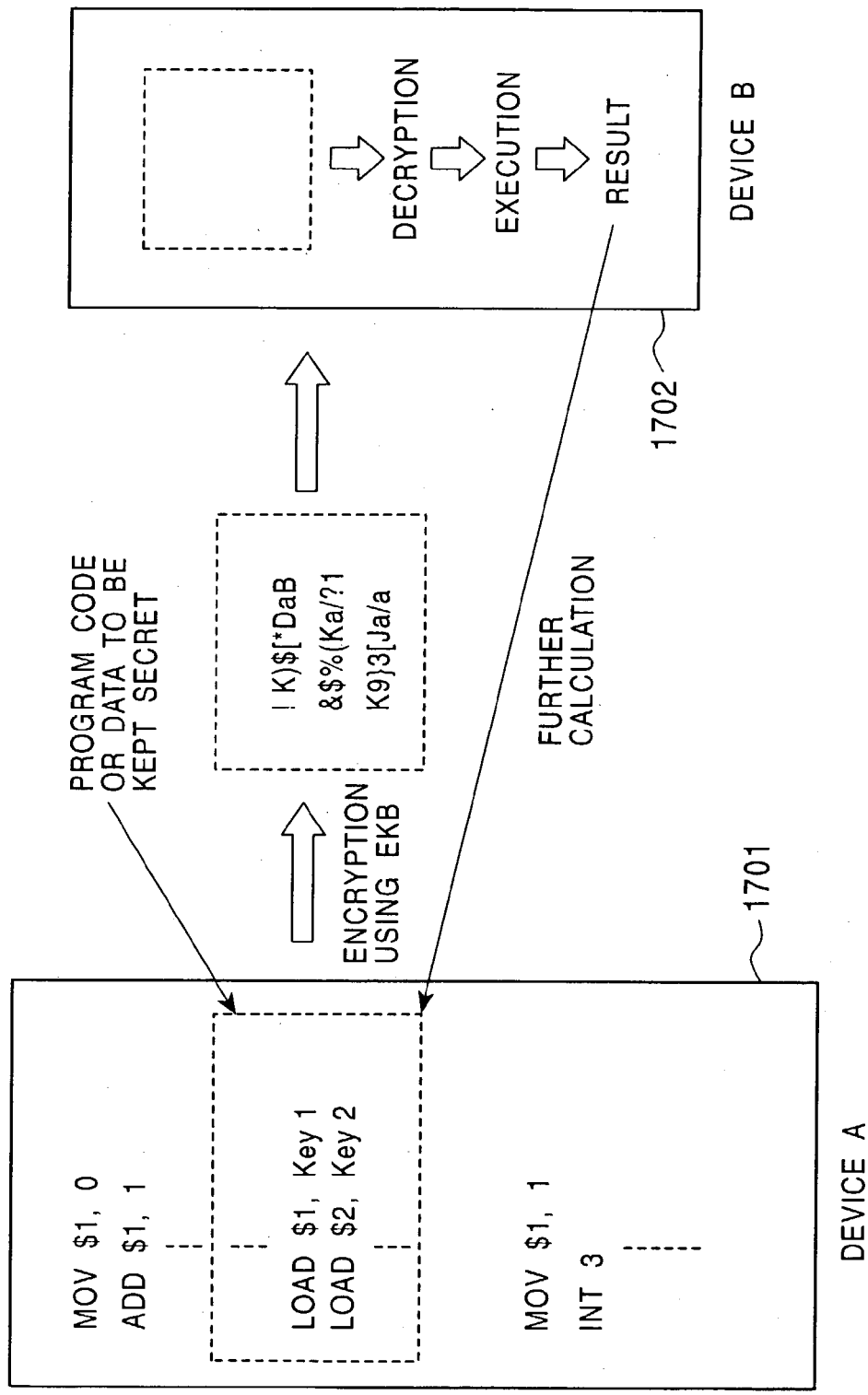
FIG. 17 is a diagram showing a process of transmitting an enabling key block (EKB) together with an encrypted program data, in the processing system according to the present invention.

FIG. 17 shows an example of a process of transmitting a program code between devices after encrypting it using, for example, a renewed node key included in an enabling key block (EKB). A device 1701 produces an enabling key block (EKB) that can be decrypted using a node key or a leaf key held by a device 1702 and also produces data by encrypting a program code using a renewed node key included in the enabling key block (EKB). The resultant enabling key block (EKB) and the encrypted data are transmitted to the device 1702. The device 1702 acquires the renewed node key by processing the received EKB, and then acquires the program code by decrypting the encrypted program code using the acquired renewed node key.

In the example shown in FIG. 17, the device 1702 further executes the acquired program code and returns the result to the device 1701. Depending on the result, the device 1701 performs a further process.

As described above, by transmitting an enabling key block (EKB) and a program code encrypted using a renewed node key included in the enabling key block (EKB), it becomes possible to transmit the program code, which can be decrypted only by a specific device, to that specific device or a specific group shown in FIG. 3.

Addition of an Integrity Check Value (ICV) to Content to be Transmitted

A method is now described for preventing content from being tampered with, by determining whether the content has been tampered with on the basis of an integrity check value (ICV) calculated for the content.

The integrity check value (ICV) of content is calculated, for example, by applying a hash function to the content such that ICV=hash(Kicv, C1, C2, . . . ) wherein Kicv is an ICV generation key, and C1 and C2 are information associated with the content represented in message authentication codes (MAC).

Figure 18:
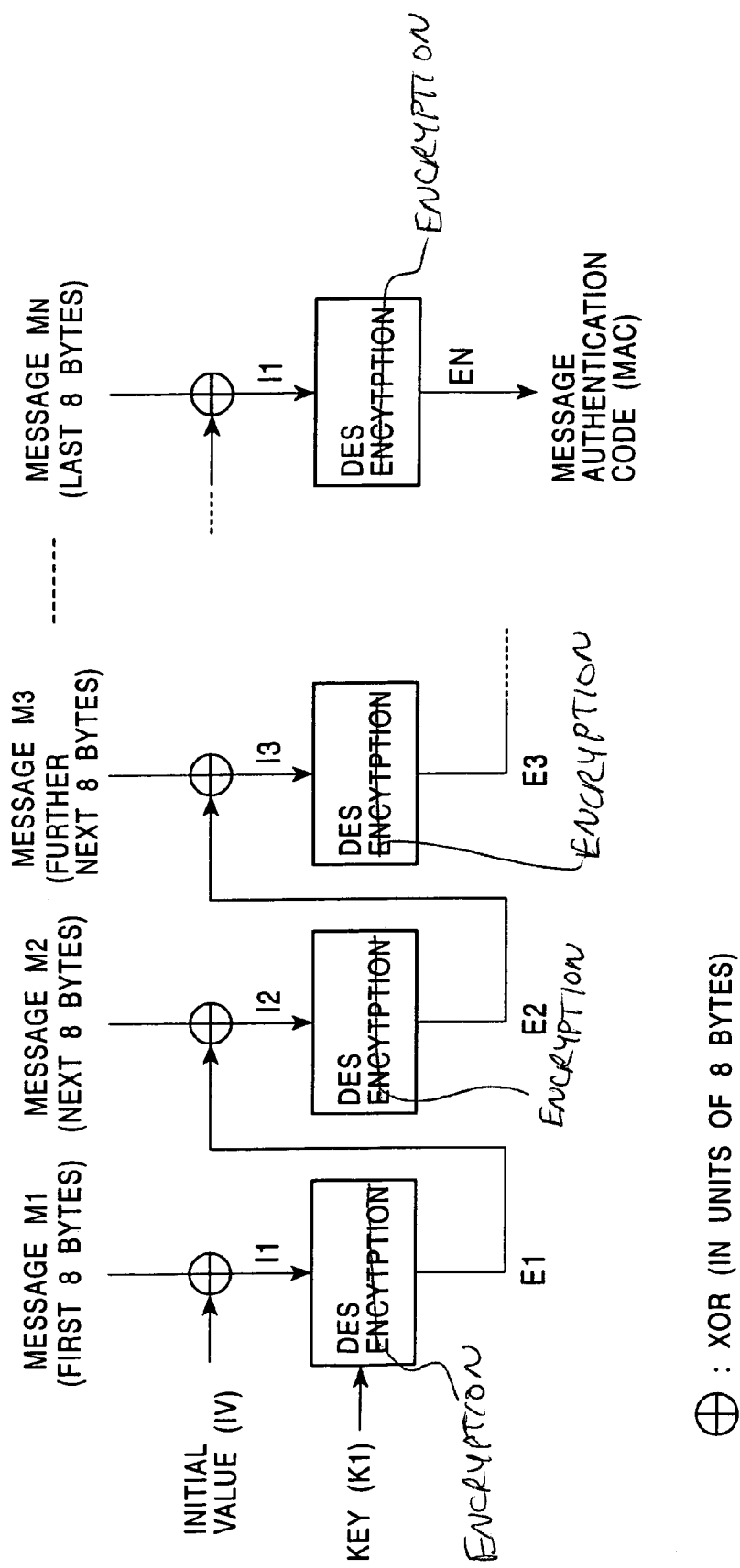
FIG. 18 is a diagram showing an example of a process of producing an MAC value used to produce a content integrity check value (ICV), in the information processing system according to the present invention.

FIG. 18 illustrates an example of a process of producing a MAC value by means of DES encryption. As shown in FIG. 18, a message to be transmitted is divided into parts each consisting of 8 bytes (hereinafter, divided parts of the message are denoted by M1, M2, . . . , MN). First, the exclusive OR between an initial value (IV) and M1 is calculated (wherein the result is represented by I1). Thereafter, I1 is applied to a DES encryption unit to encrypt I1 using a key (K1) (wherein the encrypted output is denoted by E1). The exclusive OR between E1 and M2 is then calculated, and the result I2 is applied to the DES encryption unit to encrypt it using a key K1 (wherein the resultant output is denoted by E2). Thereafter, the above process is repeated until all parts of the message are encrypted. The final output EN is employed as a message authentication code (MAC).

An integrity check value (ICV) of the content is produced by applying a hash function to the MAC value of the content and the ICV generation key. The ICV generated on the basis of the content is compared with an ICV that has been produced, for example, when the content is generated and that is guaranteed as valid. If both values are identical, the content is determined to be valid without being tampered with. If they are different, the content is determined to have been tampered with.

Distribution of a Generation Key Kicv of an Integrity Check Value (ICV) Using an EKB A process of transmitting a generation key Kicv of an integrity check value (ICV) using an enabling key block (EKB) is described below. That is, in this case, the generation key Kicv of the integrity check value (ICV) authentication key is transmitted as message data encrypted using the EKB.

Figure 19:
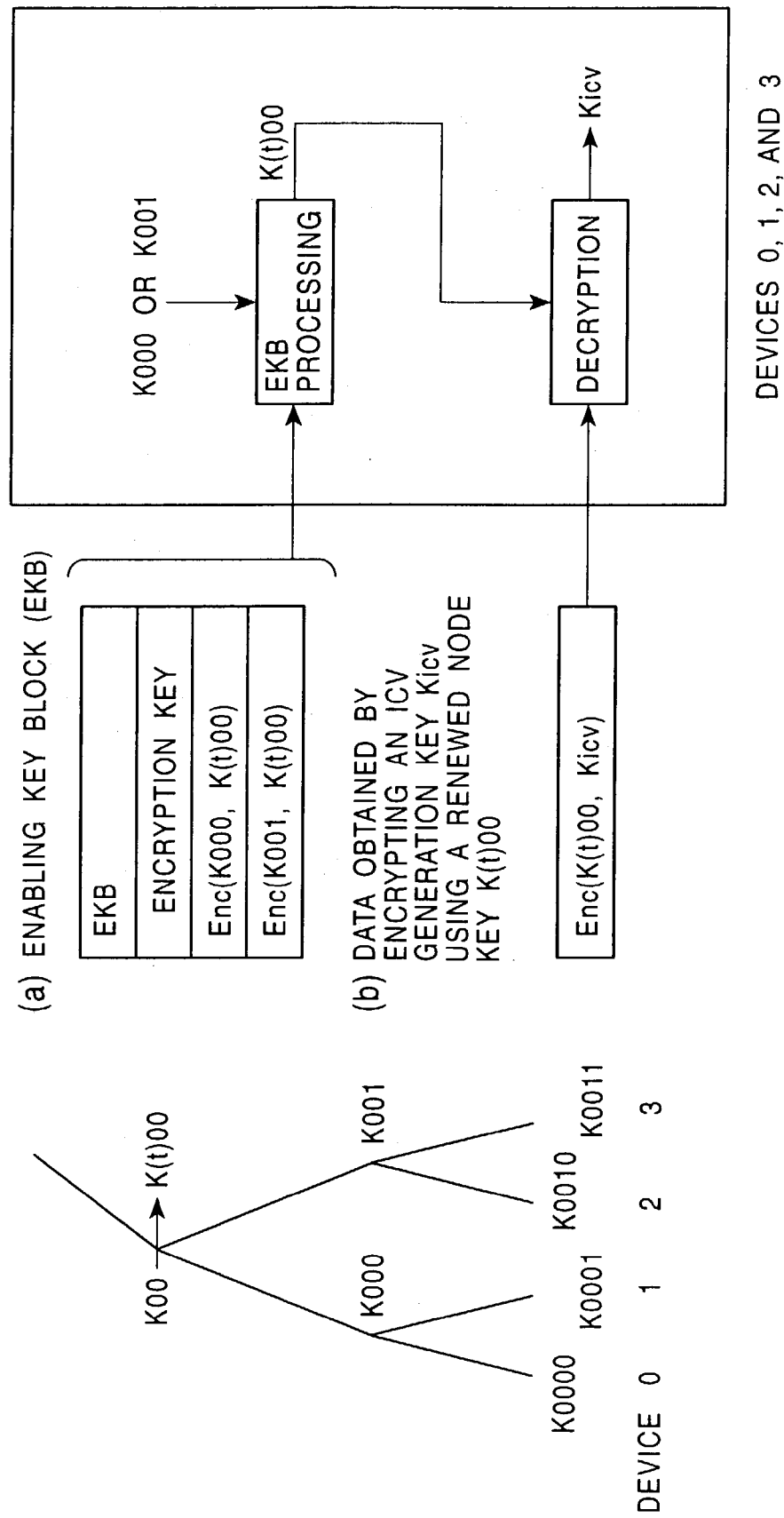
FIG. 19 is a diagram showing (a first example of) a data format used to transmit an enabling key block (EKB) together with an ICV generation key, in the information processing system according to the present invention.
Figure 20:
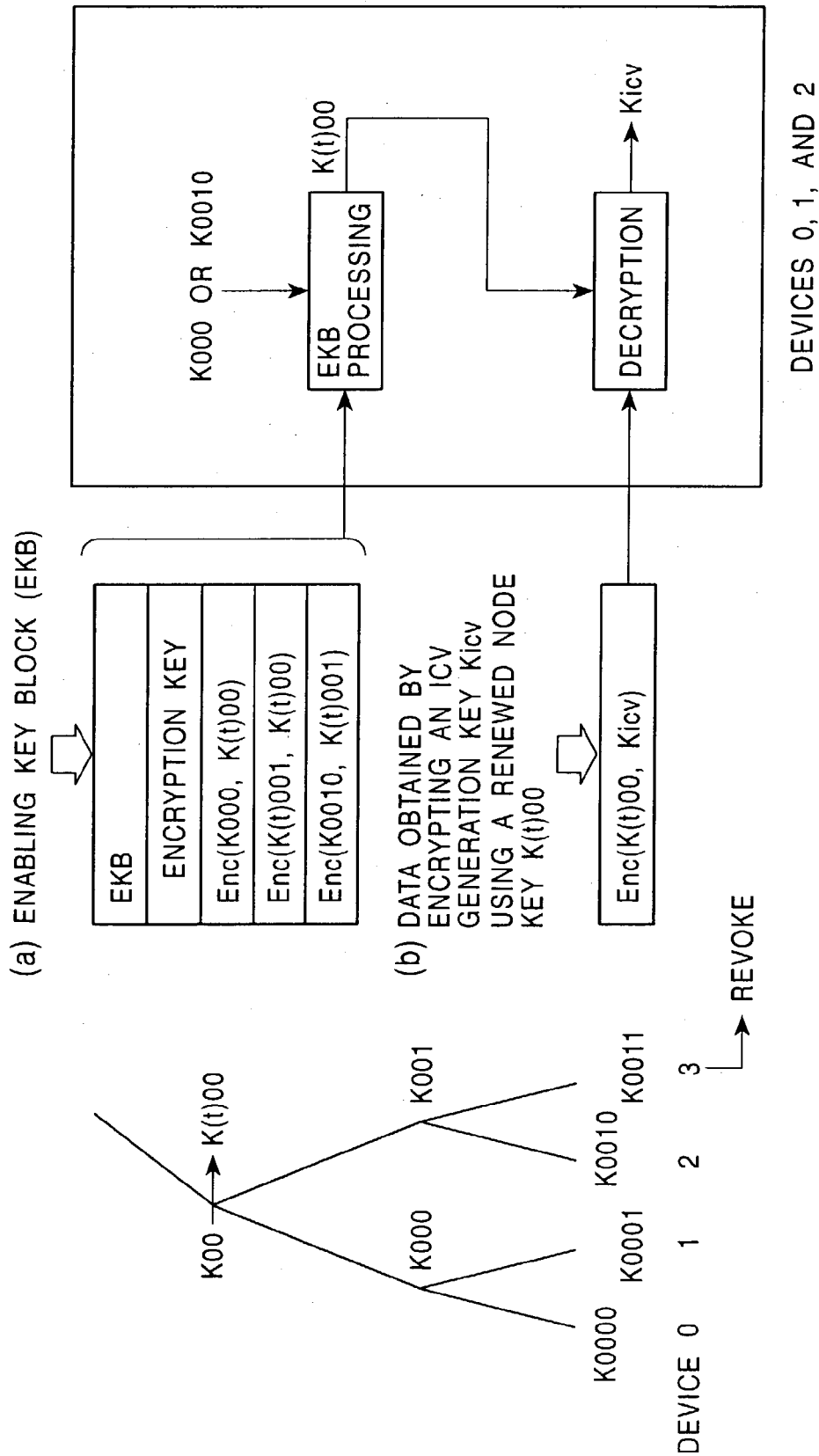
FIG. 20 is a diagram showing (a second example of) a data format used to transmit an enabling key block (EKB) together with an ICV generation key, in the information processing system according to the present invention.

FIGS. 19 and 20 show specific examples of manners of transmitting, using an enabling key block (EKB), an integrity check value generation key Kicv used to verify that the content has not been tampered with, in a situation in which the same content is transmitted to a plurality of devices. In the example shown in FIG. 19, an ICV generation key Kicv that can be decrypted by devices 0, 1, 2, and 3 is transmitted to these devices. In the example shown in FIG. 20, of devices 0, 1, 2 and 3, the device 3 is revoked, and an ICV generation key Kicv that can be decrypted only by devices 0, 1 and 2 is transmitted.

In the example shown in FIG. 19, data (b) produced by encrypting an ICV generation key Kicv using a renewed node key K(t)00 is transmitted together with an enabling key block (EKB) produced such that the renewed node key K(t)00 can be obtained by decrypting the EKB using node keys and leaf keys held by the respective devices 0, 1, 2 and 3. As shown on the right-hand side of FIG. 19, each device first acquires the renewed node key K(t)00 by processing (decrypting) the EKB and then acquires the ICV generation key Kicv by decrypting the encrypted ICV generation key Enc(K(t)00, Kicv) using the acquired node key K(t)00.

Even if one of the other devices 4, 5, 6, 7, and so on receives the same enabling key block (EKB), the device cannot process the EKB using a node key or a leaf key held by the device to acquire the renewed node key K(t)00. Thus, it is possible to securely transmit the ICV generation key only to authorized devices.

On the other hand, in the example shown in FIG. 20, in a situation in which the device 3 (in the group enclosed by the dotted line in FIG. 3) has been revoked because of exposure of secrecy of a key, an enabling key block (EKB) is produced such that it can be decrypted only by the other members of the group, that is, the devices 0, 1, and 2, and the produced enabling key block (EKB) is transmitted. More specifically, the enabling key block (EKB) shown in FIG. 20(*a*) and the data, shown in FIG. 20(*b*), produced by encrypting the ICV generation key (Kicv) using the node key (K(t)00) are transmitted together.

The decryption procedure is shown on the right-hand side of FIG. 20. Each device 0, 1, and 2 first acquires the renewed node key (K(t)00) from the received enabling key block by performing decryption using a leaf key or a node key held by the device. Thereafter, each device acquires the ICV generation key Kicv by performing decryption using K(t)00.

Even if one of the devices 4, 5, 6, and so on of the other groups shown in FIG. 3 received similar data (EKB), it cannot acquire the renewed node key (K(t)00) using a leaf key or a node key held by it. The revoked device 3 can also not acquire the renewed node key (K(t)00) using a leaf key or a node key held by it. Thus, only the authorized devices can decrypt the ICV generation key and can use it.

Thus, the above-described method of transmitting an ICV generation key using an EKB makes it possible to securely transmit the ICV generation key using a small amount of data such that only authorized users can decrypt the encrypted ICV generation key.

Figure 21:
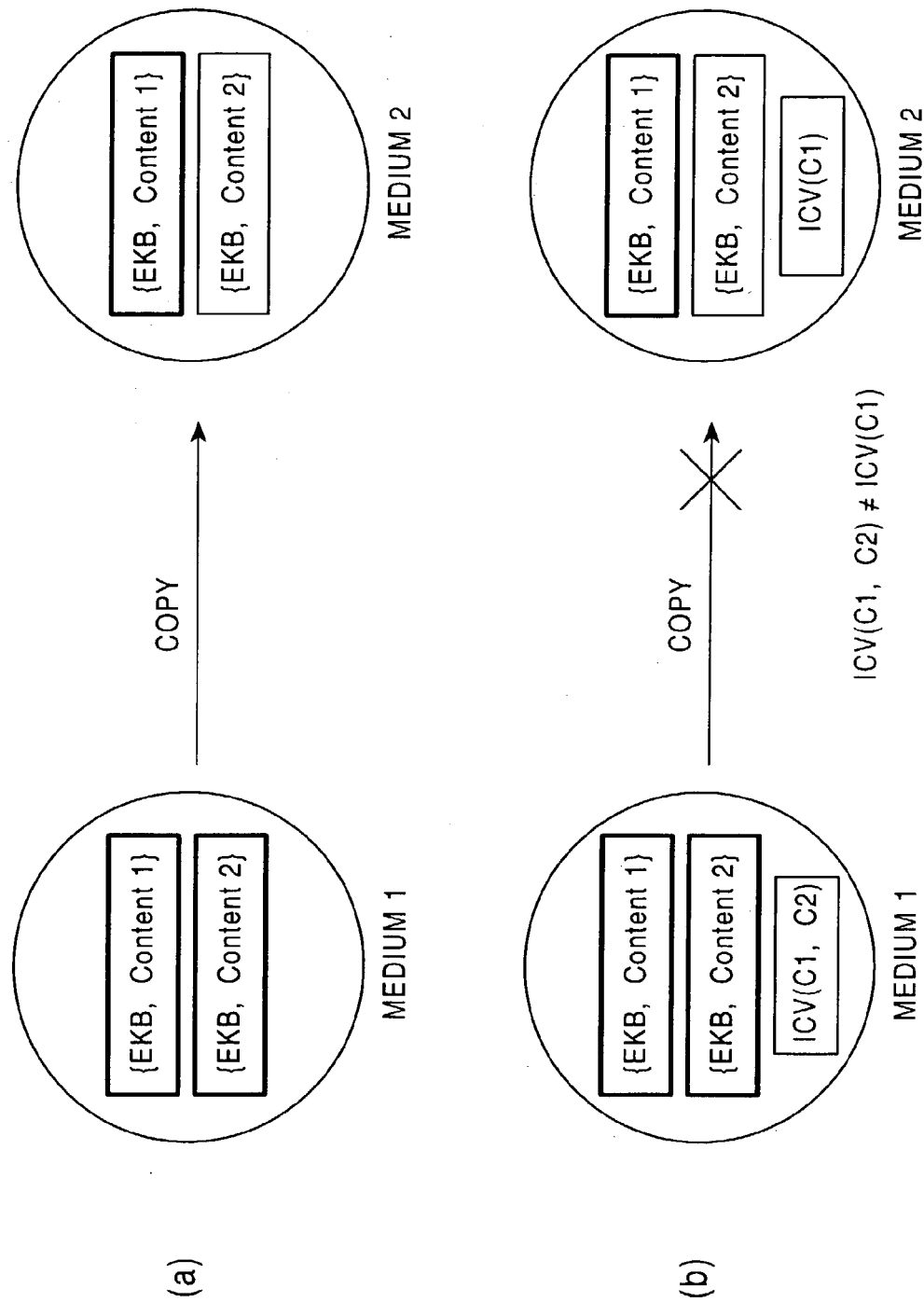
FIG. 21 is a diagram showing a method of preventing data from being copied, by storing an integrity check value (ICV) in a medium, in the information processing system according to the present invention.

As described above, by using the integrity check value (ICV) of the content, it is possible to prevent the EKB and the encrypted content from being copied in an unauthorized manner. For example, as shown in FIG. 21, content C1 and content C2 are stored on a medium 1 together with an enabling key block (EKB) from which content keys associated with the contents C1 and C2 can be acquired. If the data is directly copied onto a medium 2, the copied EKB and contents can be used by any device that can decrypt the EKB.

In contrast, in the example shown in FIG. 21(*b*), each authorized medium includes, stored thereon, an integrity check value (ICV(C1, C2)) associated with contents in addition to the contents. Herein, ICV(C1, C2) denotes an integrity check value obtained by applying a hash function to the content C1 and the content C2 such that ICV=hash (Kicv, C1, C2). In the example shown in FIG. 21(b), the content 1 and the content 2 are stored on a medium 1 in an authorized manner, and the integrity check value (ICV(C1, C2)) produced on the basis of the content C1 and the content C2 is also stored thereon. On the other hand, the content 1 is stored on a medium 2 in an authorized manner, and the integrity check value (ICV(C1)) produced on the basis of the content C1 is also stored thereon. In this situation, if data {EKB, content 2} is copied from the medium 1 to the medium 2, a new integrity check value ICV(C1, C2) is produced by the medium 2, and it turns out that the new integrity check value is different from the integrity check value Kicv(C1) stored on the medium 2. Thus, it turns out that the content has been tampered with or a new content has been copied in an unauthorized manner. When a device plays back a medium, if, before starting playback, the device checks the ICV to determine whether the generated ICV and the original ICV stored on the medium are identical to each other, and if playback is not performed when two values are not identical to each other, it is possible to prevent an unauthorized copy of content from being played back.

To further enhance the security, the integrity check value (ICV) of content may be rewritten into a value produced on the basis of data including a counter value such that ICV=hash(Kicv, counter+1, C1, C2, . . . ), where the counter value (counter+1) is incremented by 1 each time the ICV is rewritten. It is required that the counter value be stored in a secure memory.

In a case where an integrity check value (ICV) of content cannot be stored on the same medium as that on which the content is stored, the integrity check value (ICV) of the content may be stored on a medium differently from the content.

For example, when content is stored on a read-only medium or a usual MO that does not have a copy protection capability, if an integrity check value (ICV) is stored on the same medium, the ICV can be rewritten by an unauthorized user, the security of the ICV cannot be achieved. In such a case, the ICV is stored on a secure medium on a host machine, and content copy control (such as check-in/check-out, move) is performed using the ICV, thereby ensuring that the ICV is securely managed and making it possible to check whether the content has been tampered with.

Figure 22:
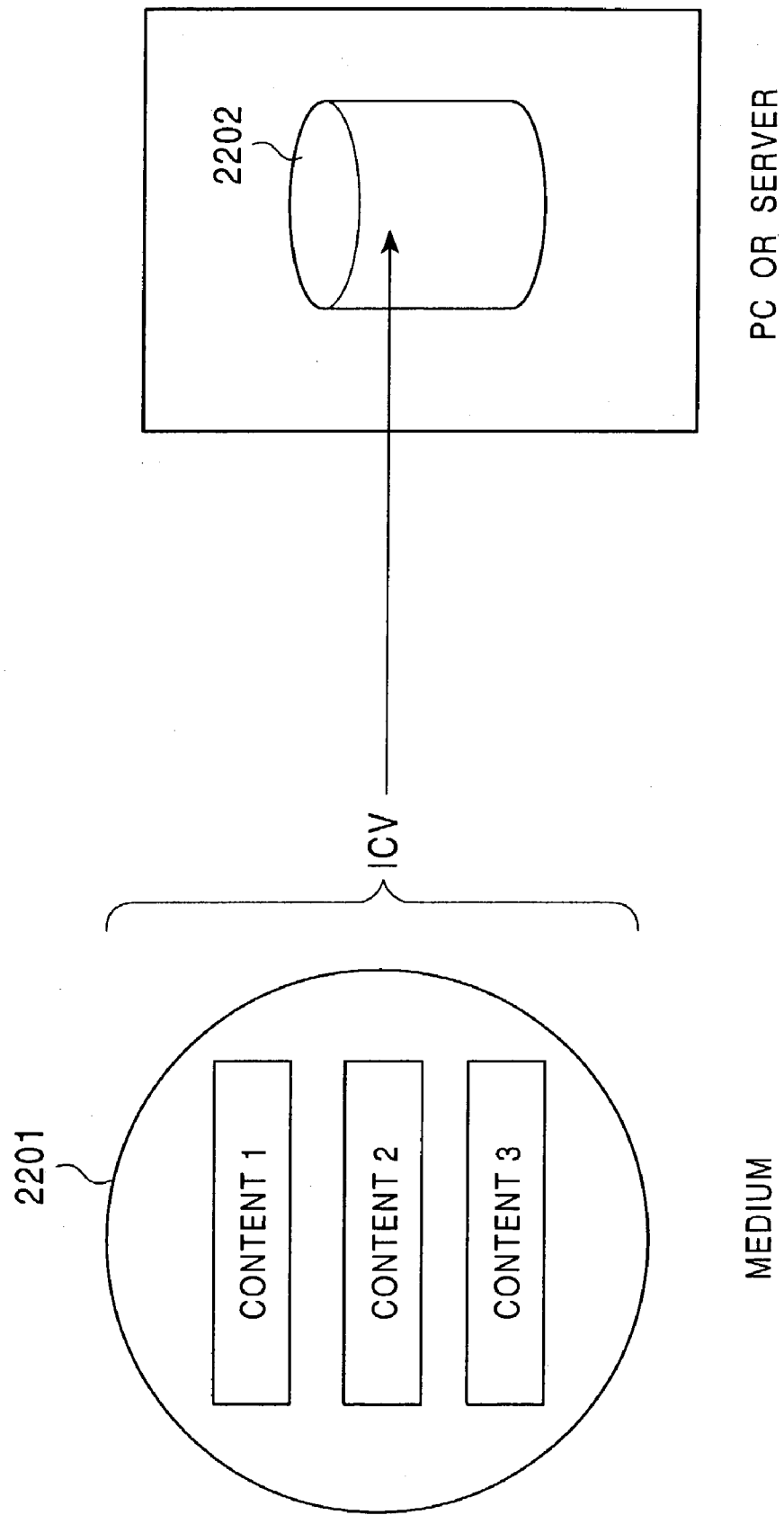
FIG. 22 is a diagram showing a method of managing a content integrity check value (ICV) separately from a content storage medium, in the information processing system according to the present invention.

FIG. 22 shows a specific example of the process for the above purpose. In this example shown in FIG. 22, contents are stored on a medium 2201, such as a read-only medium or a usual MO, which does not have a copy protection capability, and an integrity check value (ICV) associated with these contents is stored on a secure medium 2202 on a host machine which is not allowed to be accessed by a user, thereby preventing the integrity check value (ICV) from being rewritten in an unauthorized manner. If, before a device starts playback of the medium 2201 mounted thereon, a PC or a server serving as the host machine checks the ICV to determine whether playback should be allowed, it is possible to prevent an unauthorized copy of content or tampered content from being played back.

Categorization of a Hierarchical Tree Structure

In the above examples, encryption keys are produced into the form of a hierarchical tree structure, such as that shown in FIG. 3, including a root key, node keys, and leaf keys, and data such as a content key, an authentication key, an ICV generation key, or a program code is encrypted and transmitted together with an enabling key block (EKB). The hierarchical tree structure that defines the node keys or the like may be categorized according to the types of devices, and renewal of keys, transmission of encryption keys, and transmission of data may be performed in a more efficient manner as described below.

Figure 23:
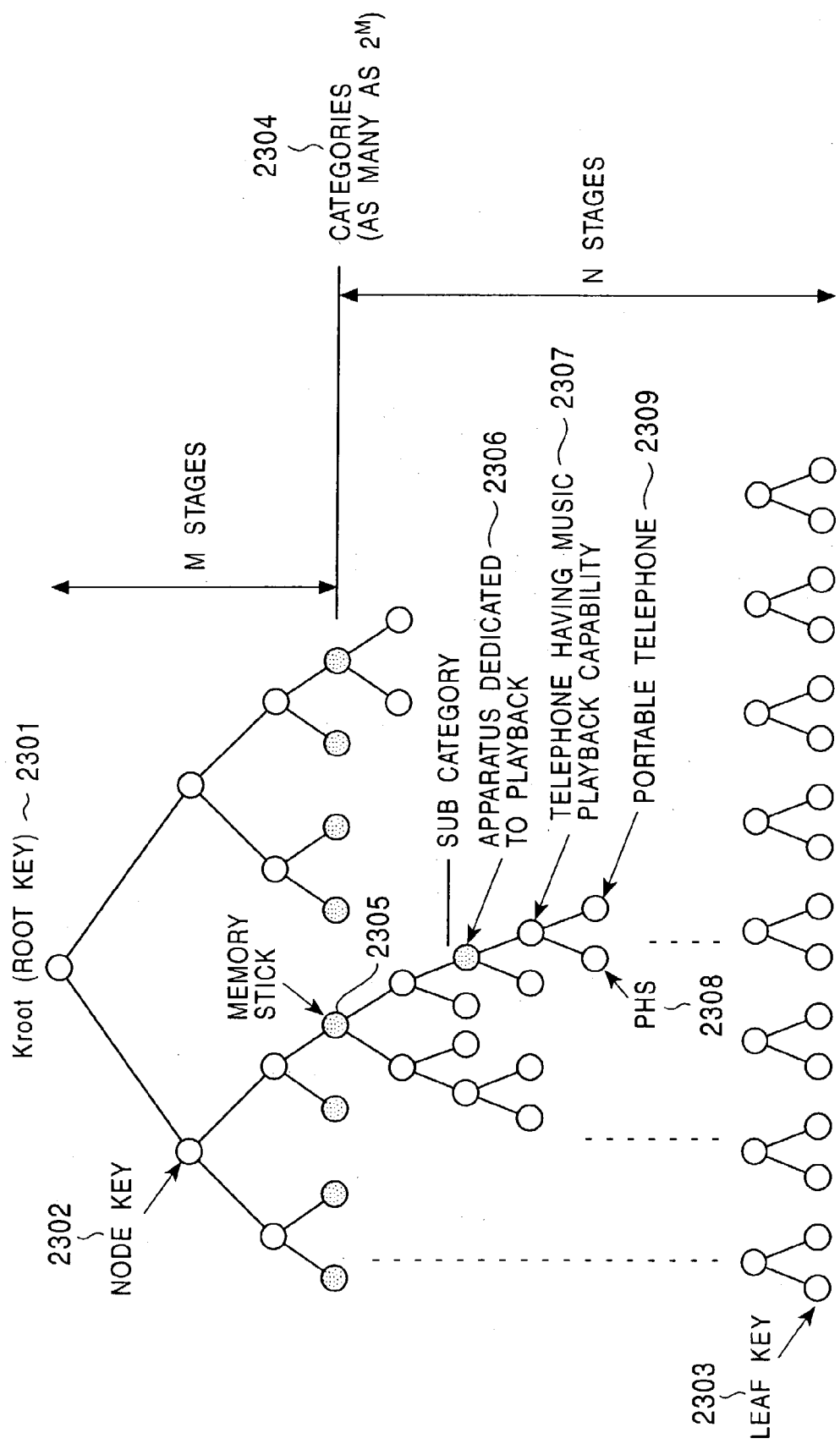
FIG. 23 is a diagram showing an example of categorization using category subtrees in a hierarchical tree structure, in the information processing system according to the present invention.

FIG. 23 shows an example of categorization of the hierarchical tree structure. In this example shown in FIG. 23, a root key Kroot 2301 is disposed at the top of the hierarchical tree structure, node keys 2302 are disposed in middle levels, and leaf keys 2303 are disposed at the bottom. Each device has a set of keys including a leaf key 2303 of the device itself, the root key 2301, and node keys 2302 existing in the path from the leaf key 2303 to the root key 2301.

By way of example, it is assumed herein that nodes in an Mth level as counted from the top are defined as category nodes 2304. That is, the nodes in the Mth level are employed to define specific categories of devices. One node at the Mth level is employed as a top node, and nodes and leaves that exist at the (M+1)th level and lower levels in paths originating from that top node are defined to be included in the category assigned to the top node.

For example, one node 2305 in the Mth level in FIG. 23 is employed to define a category of memory media sold under the trademark MEMORY STICK, and nodes and leaves existing in paths originating from this node are defined to correspond to various devices using a memory stick belonging to the category of "memory sticks". That is, a set of nodes including the node 2305 and associated lower-level nodes and leaves is defined to belong to the category of memory sticks.

Furthermore, a level that is lower than the Mth level by a proper number of levels may be employed as sub-category nodes 2306. For example, as shown in FIG. 23, a node that exists in a path originating from the category node 2305 of "memory sticks" and that is located two levels lower than the category node 2305 is employed as a sub-category node of "playback devices" included in the category of devices using memory sticks. Similarly, a node 2307 below the sub-category node 2306 of playback devices is employed as a sub-category node of "telephones having a music playback capability" included in the category of playback devices. At a further lower level, a sub-category node 2308 of "PHS" and a sub-category node 2309 of "portable telephone" are defined such that both sub-categories belong to the category of telephones having music playback capability.

The categories and subcategories can be defined according to not only the types of devices but also manufactures, content providers, or clearance institutions, and those node may be respectively managed by them. That is, the categories and subcategories may be defined so as to have arbitrary scopes in accordance with, for example, processing, management organizations, or services provided (hereinafter, units in the categories or sub-categories are generically referred to as entities). For example, if one category node is set as a top node for dedicated use of a game machine XYZ provided by a game machine manufacturer, it becomes possible to sell game machines XYZ in which node keys and leaf keys below the top node are stored. After selling the game machines XYZ, encrypted contents or keys may be supplied or keys may be renewed by supplying an enabling key block (EKB) including the top node key and node keys and leaf keys below the top node so that only devices below the top node can use the supplied data.

As described above, when one node is given as a top node, lower-level nodes arising from the top node are defined as belonging to a category or a sub-category assigned to that top node, thereby making it possible for a manufacturer or a content provider that manages one top node of one category or sub-category to produce an enabling key block (EKB) including that top node without having to taking into account the other categories or sub-categories and distribute the resultant enabling key block (EKB) to devices corresponding to the top node or the lower-level nodes arising from the top nodes, and thus making it possible to renew a key without exerting any influence on devices belonging to the other categories that do not belong to that top node.

Distribution of a Key Using a Simplified EKB (1)

In the tree structure described earlier with reference to FIG. 3, when a key such as a content key is sent to a specific device (leaf), an enabling key block (EKB) is produced such that it can be decrypted by a leaf key 2303 or a node key 2302 held by the device to which the key is to be sent, and the resultant enabling key block (EKB) is provided to the device. For example, in the tree structure shown in FIG. 24(a), when a key such as a content key is transmitted to devices a, g, and j at corresponding leaves, an enabling key block (EKB) that can be decrypted by those nodes a, g, and j are produced and transmitted thereto.

More specifically, when a content key K(t)con is encrypted using a renewed root key K(t)root and transmitted together with an EKB, the devices a, g, and j can acquire K(t)root by processing the EKB using the leaf key 2303 and the node keys 2302 shown in FIG. 24(b), and further can acquire the content key K(t)con by performing decryption using the acquired renewed root key K(t)root.

Figure 25:
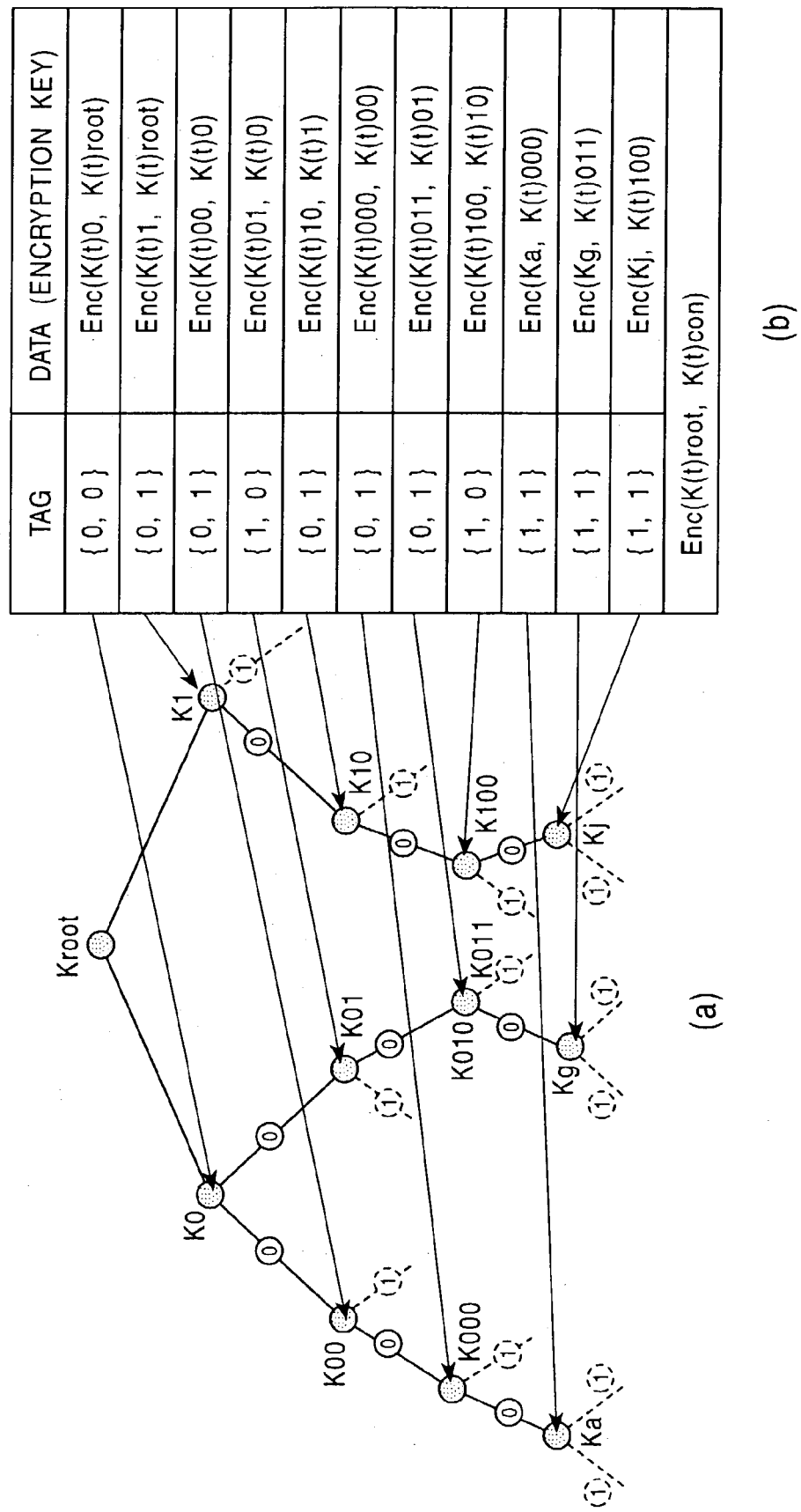
FIG. 25 is a diagram showing a process of producing an enabling key block (EKB), in the information processing system according to the present invention.

FIG. 25 shows the enabling key block (EKB) that is transmitted in this specific case. The enabling key block (EKB) shown in FIG. 25 is produced in accordance with the EKB format described earlier in accordance with FIG. 6, and thus the EKB includes data (encrypted keys) and tags corresponding to the data. As described earlier with reference to FIG. 7, left (L) and right (R) components of each tag have a value of 0 or 1 depending on whether data exits in L or R directions.

If a device receives the enabling key block (EKB), the device sequentially decrypts the encrypted keys included in the enabling key block (EKB) on the basis of the tags thereby sequentially acquiring renewed keys from a level to a higher level. As shown in FIG. 25, the data size of the enabling key block (EKB) increases with the number of levels between the root and the leaves (the number of levels is referred to as the depth). The depth (number of levels) increases with the number of devices (leaves), and thus the data size of the EKB becomes great when keys are transmitted to a great number of devices.

Figure 26:
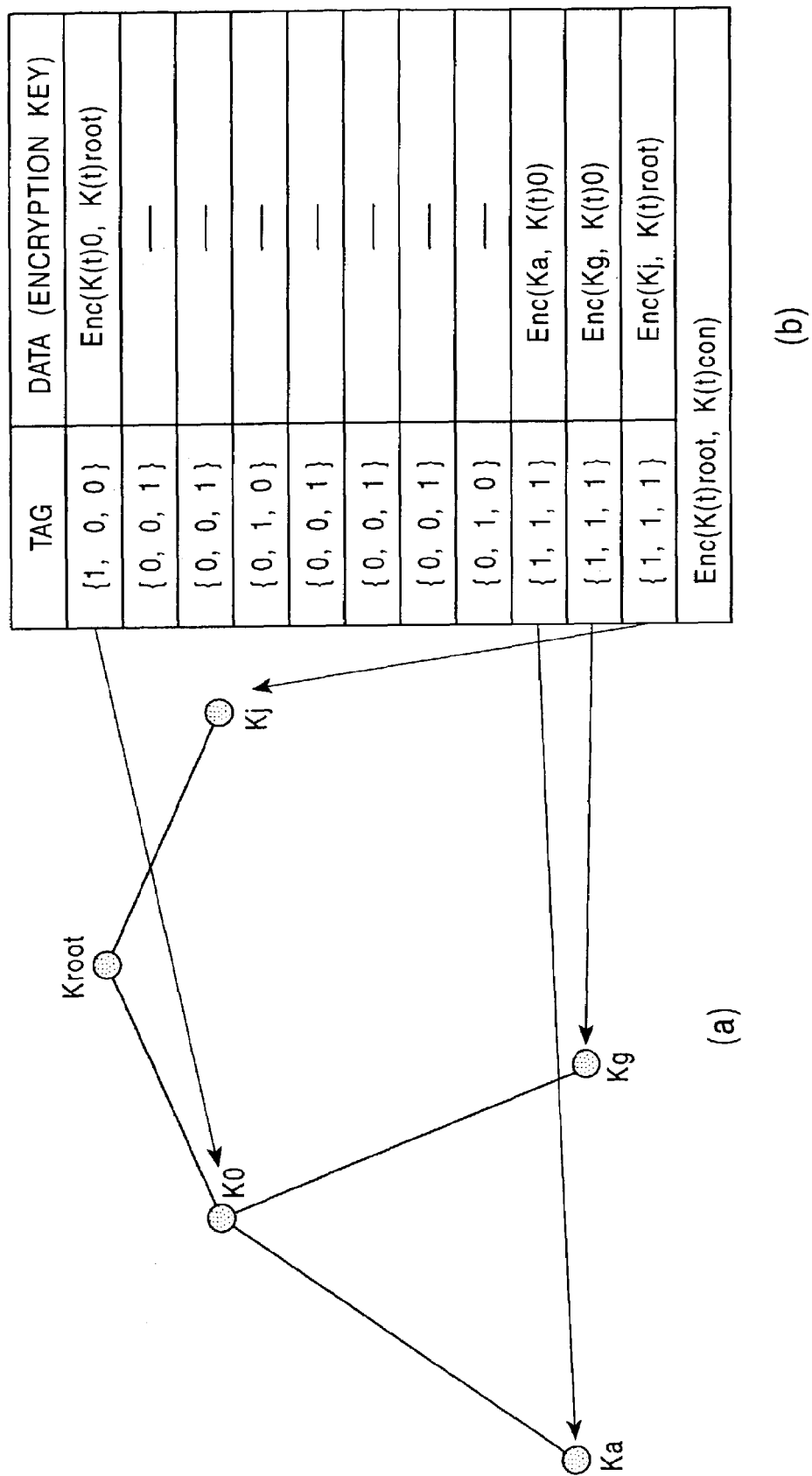
FIG. 26 is a diagram showing a (first example of) simplified enabling key block (EKB), used in the information processing system according to the present invention.

A technique of reducing the data size of the enabling key block (EKB) is described below. FIG. 26 shows an example of an enabling key block (EKB) simplified depending on the devices to which keys are transmitted.

As in the example shown in FIG. 25, it is also assumed that a key such as a content key is transmitted to devices a, g, and j at corresponding leaves. As shown in FIG. 26(a), a tree structure is produced such that it includes only those devices to which the key is to be transmitted. In this case, the tree structure shown in FIG. 26(b) is produced on the basis of the tree structure shown in FIG. 24(b). In a path from Kroot to Kj, there is no path branching from the path from Kroot to Kj, and thus this path can be represented by only one branch. On the other hand, to reach Ka or Kg from Kroot, it is needed to branch at K0 to Ka or Kg. Thus, the tree can be formed so as to have two branches as shown in FIG. 26(a).

As shown in FIG. 26(a), the resultant tree has a simplified form including only one node K0. The enabling key block (EKB) used to distribute renewed keys is produced on the basis of this simplified tree. The tree shown in FIG. 26(a) can be produced by reconstructing the original tree such that a binary tree is first produced such that it includes only paths to endpoint nodes or leaves that are allowed to decrypt the enabling key block (EKB) and then unnecessary nodes are removed from the tree. The enabling key block (EKB) used to distribute renewed keys is produced on the basis of only keys corresponding to the nodes or leaves included in this reconstructed hierarchical tree.

The enabling key block (EKB) described above with reference to FIG. 25 includes all encrypted keys existing in paths from respective leaves a, g, and j to Kroot. In contrast, the simplified EKB includes only encrypted keys at nodes included in the simplified tree. As shown in FIG. 26(b), each tag is represented by 3 bits. The second and third bits are used in the same manner as in the example shown in FIG. 25. That is, the second bit has a value of 0 or 1 depending on whether there is data in the L (left) direction, and the third bit has a value of 0 or 1 depending on whether there is data in the R (right) direction. The first bit is used to indicate whether the EKB includes an encrypted key at the node corresponding to the tag. When an encrypted key is included, the first bit is set to 1, while it is set to 0 if no encrypted key is included.

The data size of the enabling key block (EKB), which is provided to devices (leaves) via a data communication network or provided by supplying a storage medium on which the EKB is stored, can be greatly reduced by employing the structure shown in FIG. 26(b) compared with the structure shown in FIG. 25. When each device receives the enabling key block (EKB) shown in FIG. 26, the device sequentially decrypts only the data at locations where the first bit of the corresponding tags is 1, thereby obtaining all necessary decrypted keys. More specifically, the device a decrypts encrypted data Enc(Ka, K(t)0) using a leaf key Ka thereby acquiring a node key K(t)0, and decrypts encrypted data Enc(K(t)0, K(t)root) using the node key K(t)0 thereby acquiring K(t)root. On the other hand, the device j decrypts encrypted data Enc(Kj, K(t)root) using a leaf key Kj thereby acquiring K(t)root.

As descried above, if a new simplified tree structure including only devices to which data is to be transmitted is produced, and if an enabling key block (EKB) is produced using only leaf keys and node keys included in the simplified tree, the resultant enabling key block (EKB) becomes small in data size, and thus it becomes possible to transmit the enabling key block (EKB) in an efficient manner.

Distribution of a Key Using a Simplified EKB (2)

A technique of further simplifying the enabling key block (EKB) produced on the basis of the simplified tree shown in FIG. 26, thereby further reducing the data size and thus making it possible to perform processing in an efficient manner.

In the example described above with reference to FIG. 26, the tree is produced by reconstructing the original tree such that a binary tree is first produced such that it includes only paths to endpoint nodes or leaves that are allowed to decrypt the enabling key block (EKB) and then unnecessary nodes are removed from the tree. The enabling key block (EKB) used to distribute renewed keys is produced on the basis of only keys corresponding to the nodes or leaves included in this reconstructed hierarchical tree.

On the basis of the reconstructed hierarchical tree shown in FIG. 26(a), an enabling key block (EKB) is produced as shown in FIG. 26(b) so that leaves a, g, and j can acquire renewed root key K(t)root, and the resultant enabling key block (EKB) is transmitted. Via the processing of the enabling key block (EKB) shown in FIG. 26(b), the leaf j can acquire the root key K(t)root by performing only one decryption process in which Enc(Kj, K(t)root) is decrypted. However, the leaves a and g have to first decrypt Enc(Ka, K(t)0) or Enc(Kg, K(t)0) to acquire K(t)0 and then decrypt Enc(K(t)0, K(t)root) to the root key K(t)root. That is, leaves a and g have to perform a two-step process for decryption.

In a case where the node K0 functions as a subroot node that manages lower-level leaves a and g, the hierarchical tree reconstructed into the simplified form as shown in FIG. 26 may be useful to confirm that leaves a and b have acquired renewed keys. However, if the node K0 does not mange the lower-level leaves, or if, although the node K0 manages the lower-level leaves, providing of a renewed key from a higher-level node is allowed, then the reconstructed hierarchical tree shown in FIG. 26(a) may be further simplified by removing the node K0, and an enabling key block (EKB) may be produced on the basis of this further simplified tree.

Figure 27:
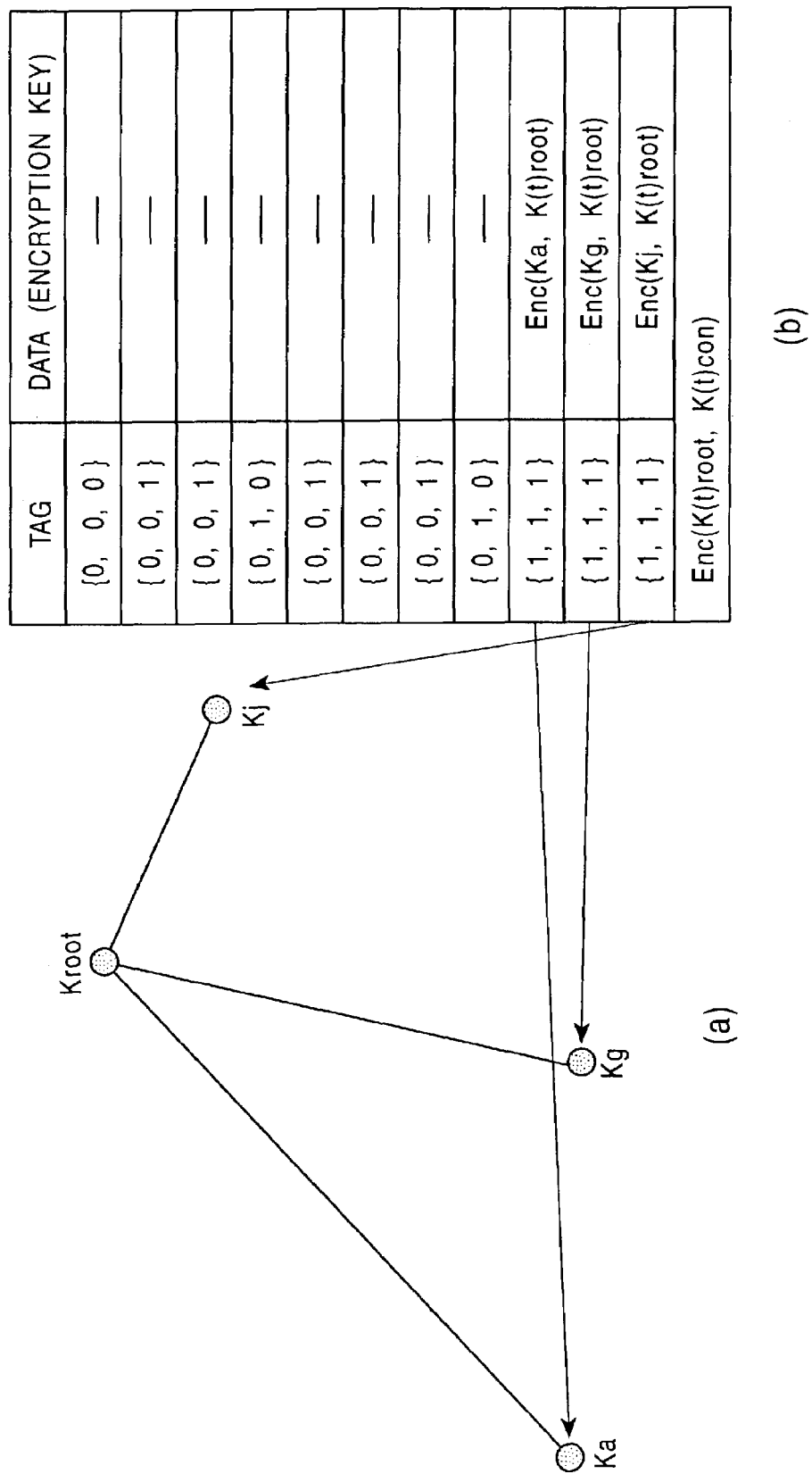
FIG. 27 is a diagram showing a (second example of) simplified enabling key block (EKB), used in the information processing system according to the present invention.

An example of such an enabling key block (EKB) is shown in FIG. 27. As in the example shown in FIG. 26, it is also assumed that a key such as a content key is transmitted to devices a, g, and j at corresponding leaves. As shown in FIG. 27(a), a tree is produced such that the root Kroot is directly connected to the respective leaves a, g, and j.

Thus, as shown in FIG. 27(a), the resultant tree has a structure that can be obtained by removing the node K0 from the reconstructed hierarchical tree shown in FIG. 26(a). The enabling key block (EKB) used to distribute renewed keys is produced on the basis of this simplified tree. The tree shown in FIG. 27(a) is a hierarchical tree reconstructed so as to include only paths that directly connect the root and leaves that are allowed to decrypt the enabling key block (EKB). The enabling key block (EKB) used to distribute renewed keys is produced on the basis of only keys corresponding to the leaves included in this reconstructed hierarchical tree.

In the specific example shown in FIG. 27(a), the endpoint nodes are used as leaves. Also in a case where the highest-level node distribute keys to middle-level and lower-level nodes, the tree may be simplified by directly connecting the highest-node to a middle-level or lower-level node, an enabling key block (EKB) may be produced on the basis of the simplified tree, and keys may be transmitted using the resultant enabling key block (EKB). As described above, the reconstructed hierarchical tree has a tree structure in which the top node thereof is directly connected to endpoint nodes or leaves. In this simplified tree, the number of paths branching from the top node is not limited to two, but the top node may have three or more branching paths depending on the number of distribution nodes or leaves.

The enabling key block (EKB) described above with reference to FIG. 25 includes encrypted data corresponding to all keys in paths from the respective leaves a, g, and j to Kroot. In the example shown in FIG. 26, the enabling key block (EKB) includes the leaf keys assigned to the leaves a, g, and j, the node K0 shared by a and g, and the root key. In contrast, in the enabling key block (EKB) on the basis of the simplified hierarchical tree shown in FIG. 27(a), the key at the node K0 is removed, and thus, as shown in FIG. 27(b), it has a further reduced data size.

The enabling key block (EKB) shown in FIG. 27(b), as in the enabling key block (EKB) shown in FIG. 26(b), includes 3-bit tags. The second and third bits are used in the same manner as in the example shown in FIG. 26. That is, the second bit has a value of 0 or 1 depending on whether there is data in the L (left) direction, and the third bit has a value of 0 or 1 depending on whether there is data in the R (right) direction. The first bit is used to indicate whether the EKB includes an encrypted key at the node corresponding to the tag. When an encrypted key is included, the first bit is set to 1, while it is set to 0 if no encrypted key is included.

Using the enabling key block (EKB) shown in FIG. 27(b), the respective leaves a, g, and j can acquire the root key K(t)root by performing only one process of decrypting Enc(Ka, K(t)root), Enc(Kg, K(t)root) or Enc(Kj, K(t)root).

An enabling key block (EKB) on the basis of a tree reconstructed into a simplified form including a top node and endpoint nodes or leaves directly connected to the top node is produced on the basis of only those keys corresponding to the top node and the endpoint nodes or leaves of the reconstructed tree, as shown in FIG. 27(b).

By building a new simplified tree structure including only devices to which an enabling key block (EKB) is to be supplied and by producing the enabling key block (EKB) using only keys included in the resultant simplified tree or keys shared by leaves, as is the case with the enabling key blocks (EKB) described above with reference to FIG. 26 or 27, the resultant enabling key block (EKB) becomes small in data size, and thus it becomes possible to transmit the enabling key block (EKB) in an efficient manner.

The simplified hierarchical tree structure is useful in particular when EKB's are managed on the basis of category tress, wherein the category tree is one type of subtree as will be described below. The category tree is a set of nodes or leaves selected from nodes or leaves of an original key distribution tree. A category tree may be formed in various aspects. For example, a category tree may be a set of nodes or leaves that are combined together in accordance with the device type, the device supplier, the content provider, or the clearance institution, or in accordance with a common feature in terms of process, management, or services provided. Devices classified into one category are assigned to one category tree. For example, if constructing a simplified tree including top nodes (subroots) of a plurality of category trees in a similar manner as described above, and if an EKB is produced on the basis of the constructed tree, then the resultant simplified enabling key block (EKB) can be decrypted only by devices belonging to any one of the selected category trees. The management on the basis of the category trees will be described in detail later.

The enabling key block (EKB) may be stored on an information storage medium such as an optical disk or a DVD. For example, an enabling key block (EKB) including a data part including encrypted key data and a tag part including location identification data identifying the locations of the encrypted key data in a hierarchical tree structure may be stored together with message data such as content data encrypted using a renewed node key on an information storage medium, and the resultant information storage medium may be provided to devices. Each device can sequentially extract encrypted key data included in the enabling key block (EKB) in accordance with the identification data in the tag field, and can decrypt the extracted encrypted key data thereby acquiring a key needed to decrypt content and thus using the content. Of course, the enabling key block (EKB) may be transmitted via a network such as the Internet.

Management of EKB on a Category Tree Basis

A manner of managing nodes or leaves in a tree structure for use in key distribution in accordance with a block or a set of nodes or leaves is described below. Herein, a block, which is a set of nodes or leaves, is referred to as a category tree. A category tree may be formed in various aspects. For example, a category tree may be a set of nodes or leaves that are combined together in accordance with the device type, the device supplier, the content provider, or the clearance institution, or in accordance with a common feature in terms of process, management, or services provided.

Figure 28:
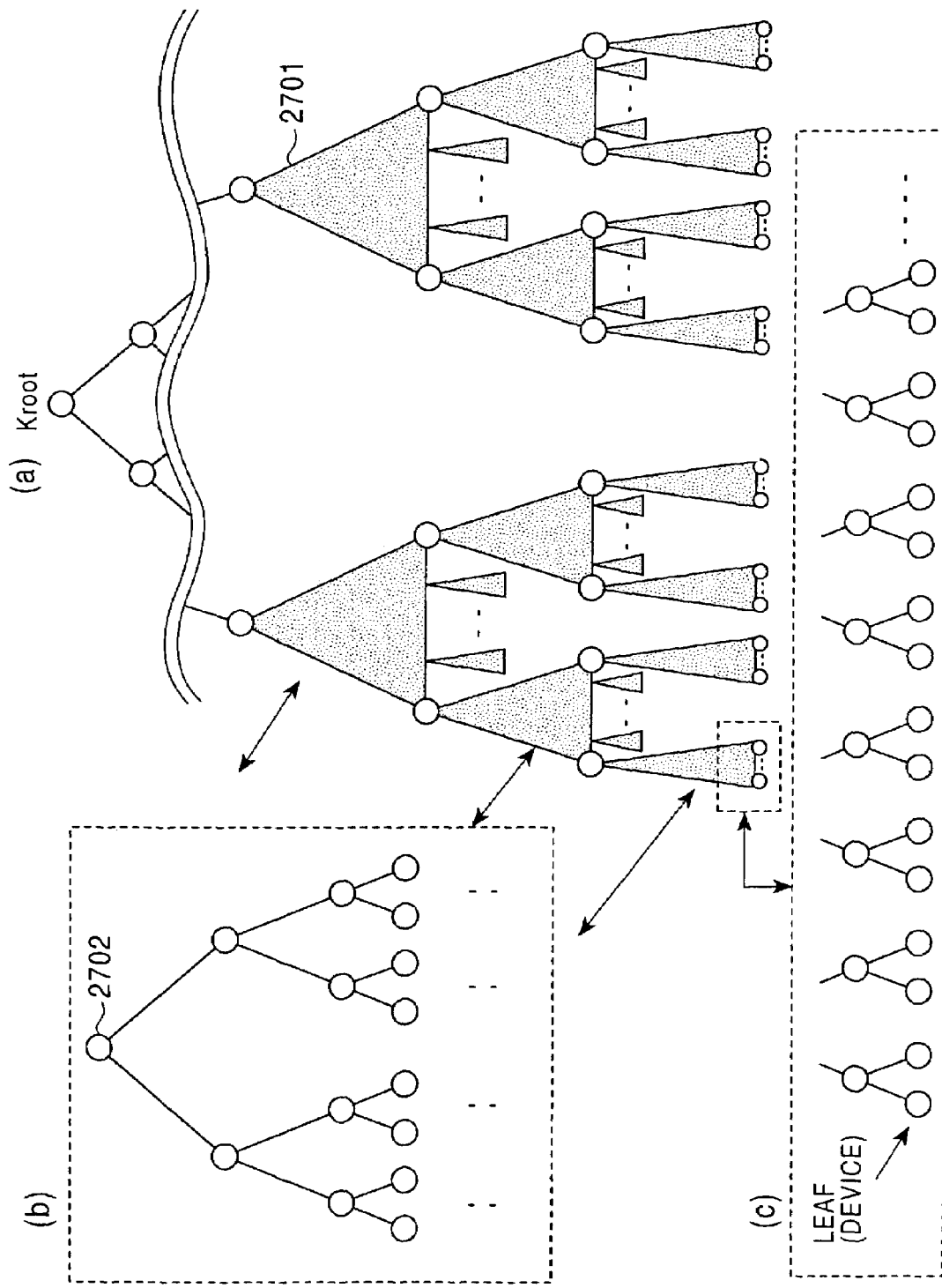
FIG. 28 is a diagram showing a manner of managing category trees in a hierarchical tree structure, in the information processing system according to the present invention.

The category tree may be described in further detail with reference to FIG. 28. FIG. 28(a) shows a manner of managing a tree structure in units of category trees. In FIG. 28(a), each category tree is represented by one triangle. Each category tree, for example, that denoted by reference numeral 2701, includes a plurality of nodes. FIG. 28(b) shows a node structure in one category tree. Each category tree is constructed in the form of a binary tree including one top node and a plurality of nodes at lower levels. Herein, a top node, such as that denoted by reference numeral 2702, of each category tree is referred to as a sub-root.

As shown in FIG. 28(c), there are leaves, that is, devices, at lower ends of the tree. Any device belongs to one of category trees each including one top node 2702 serving as a sub-root and a plurality of leaves corresponding to devices.

Figure 29:
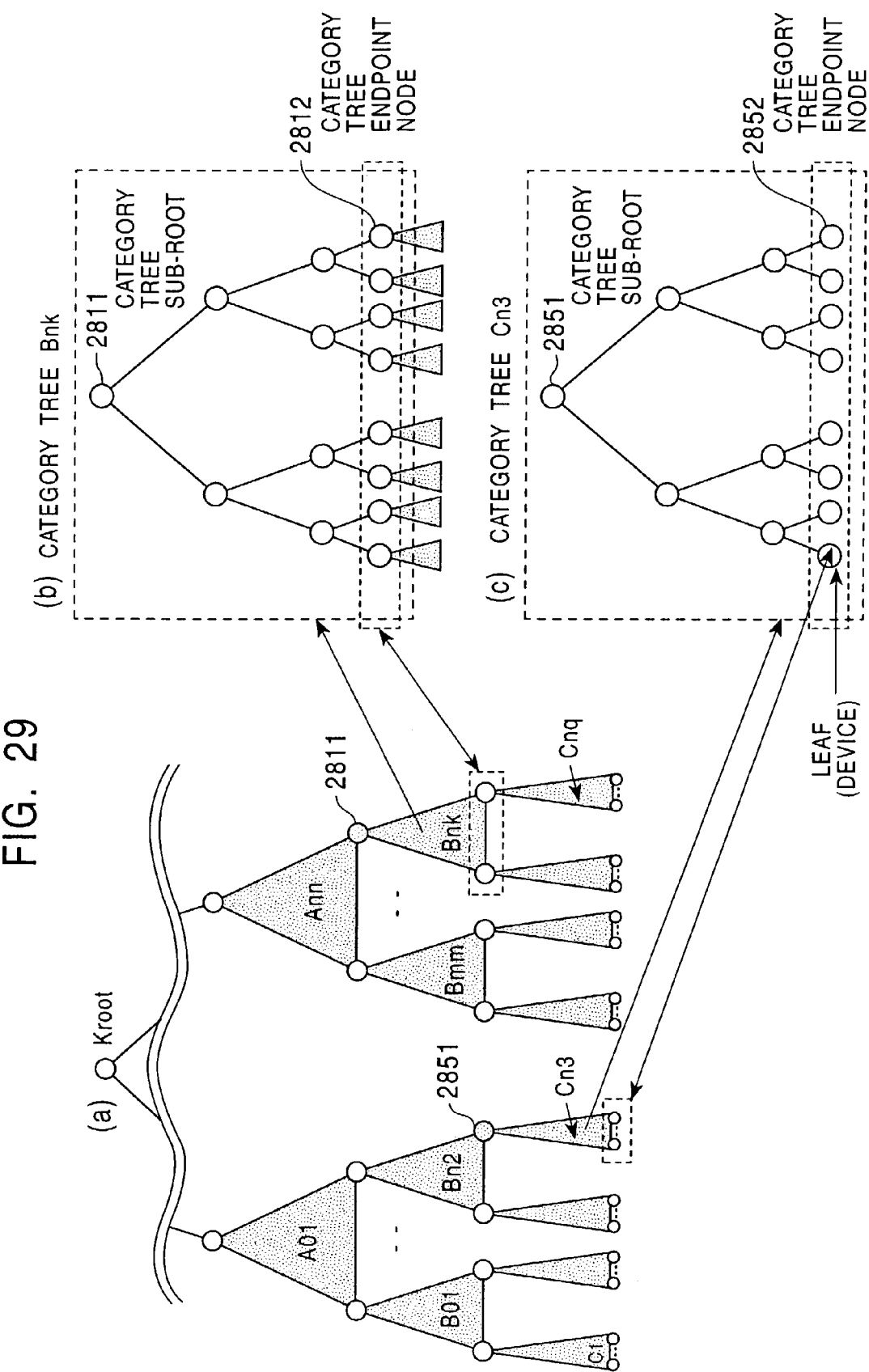
FIG. 29 is a diagram showing the detailed manner of managing category trees in a hierarchical tree structure, in the information processing system according to the present invention.

As can be seen from FIG. 28(a), category trees have a hierarchical structure, as described below with reference to FIG. 29.

FIG. 29(a) illustrates an example of the heretical structure in a simplified fashion. In this specific example, the hierarchical category tree structure includes category trees A01 to Ann at a certain level below Kroot. At a level just below the category trees A01 to Ann, category trees B01 to Bnk are disposed. At a next lower level, category trees C1 to Cnq are disposed. As shown in FIGS. 29(b) and (c), each category tree has a tree structure in which nodes and leaves are disposed at a plurality of levels.

For example, the category tree Bnk has a tree structure including, as shown in FIG. 28(b), a top node 2811 serving as a sub-root, endpoint nodes 2812, and other nodes located between the top node 2811 and the endpoint nodes 2812. The category tree is assigned an identifier Bnk and manages the nodes within the category tree Bnk independently for the category tree Bnk, thereby managing lower-level category trees each of which includes, as its top node, one of endpoint nodes 2812. On the other hand, the category tree Bnk is managed by a higher-level (parent) category tree Ann one of endpoint nodes 2811 of which is included, as the sub-root 2811, in the category tree Bnk.

As shown in FIG. 28(c), a category tree Cn3 has a tree structure including a top node 2851 serving as a sub-root, endpoint nodes 2852 corresponding to respective devices that are leaves in this case, and other nodes between the top node 2851 and the endpoint nodes 2852. This category tree is assigned an identifier Cn3 and manages the nodes and leaves within the category tree Cn3 independently for the category tree Cn3, thereby managing leaves (devices) at the endpoint nodes 2852. On the other hand, the category tree Cn3 is managed by a higher-level (parent) category tree Bn2, one of endpoint nodes of which is included, as the sub-root 2851, in the category tree Cn3. Herein, the key management of each category tree refers to, for example, renewal of a key, revoking, or the like, as will be described in detail later.

In each device corresponding to a leaf in a category tree at the bottom, a leaf key of the category tree, to which that device belongs, and node keys at respective nodes existing in a path from the leaf to the top node serving as the sub-root node of that category tree are stored. For example, for a device at an endpoint node 2852, keys corresponding to nodes in a path from the endpoint node (leaf) 2852 to the sub-root node 2851 are stored.

The structure of the category tree is further described with reference to FIG. 30. Each category tree can have a tree structure including a various levels. The depth (number of levels) may be set depending on the number of lower-level (child) category trees each corresponding to endpoint nodes of that category tree or depending on the number of devices to leaves.

A category tree structure shown in FIG. 30(a) may be embodied as shown in FIG. 30(b). Herein, a root tree is a tree located at the top and the root tree has a root key. A plurality of lower-level category trees A, B, and C are disposed at respective endpoint nodes of the root tree. A further-lower level category tree D is disposed below the category tree C. In the category tree C (2901), one or more endpoint nodes are reserved as reserved nodes 2950 so that another lower-level category tree can be added in the future by using the reserved node 2950. For example, a category tree C' (2902) having a multilevel tree structure may be added by assigning the reserved node 2950 as the top node of the new category tree.

Figure 31:
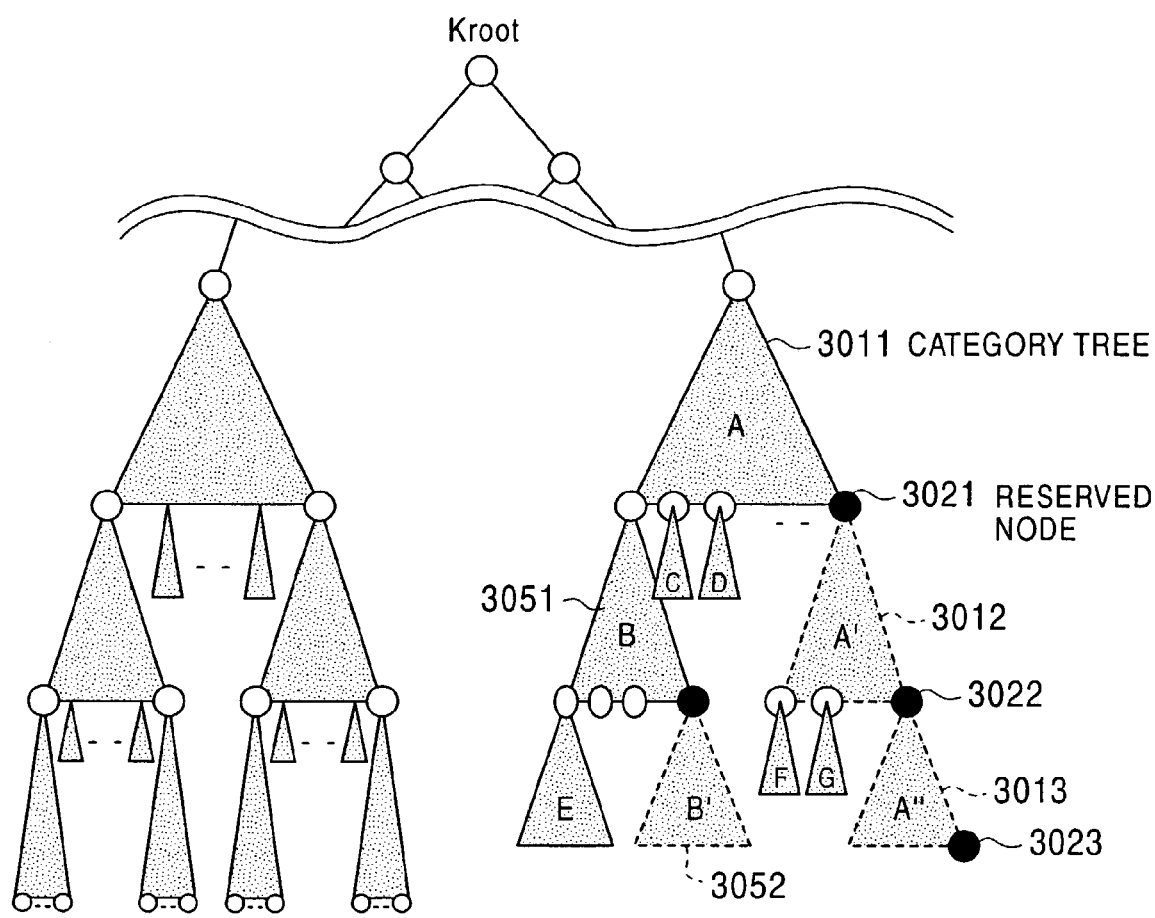
FIG. 31 is a diagram showing a reserved node used in management category trees in a hierarchical tree structure, in the information processing system according to the present invention.

The reserved nodes are described in further detail below with reference to FIG. 31. A category tree A (3011) has lower-level category trees B, C, D, and so on managed by the category tree A (3011), and also has one reserved node 3021. For example, the number of lower-level category trees may be increased in such a manner that the reserved node 3021 is assigned to a lower-level category A' (3012), and further lower-level category trees F and G may be connected to endpoint nodes of the lower-level category tree A' (3012). The lower-level category tree A' (3012) may reserve at least one endpoint node 3022 so that another lower-level category tree A" (3013) may be added. The lower-level category tree A" (3013) may reserve one or more endpoint nodes 3023. By reserving endpoint nodes in the above-described manner, it becomes possible to increase the number of lower-level category trees managed by a certain category tree without limitation. The number of reserved category trees is not limited to one, but a plurality of endpoints may be reserved.

Each category tree may produce an enabling key block (EKB) independently of the other category trees, and key renewal and revocation may be performed independently of the other category trees. As shown in FIG. 31, enabling key blocks (EKB's) are assigned to respective category trees A, A', and A". These enabling key blocks (EKB's) may be managed by, for example, a device manufacturer that manages the category trees A, A', and A".

Registration of a New Category Tree

Figure 32:
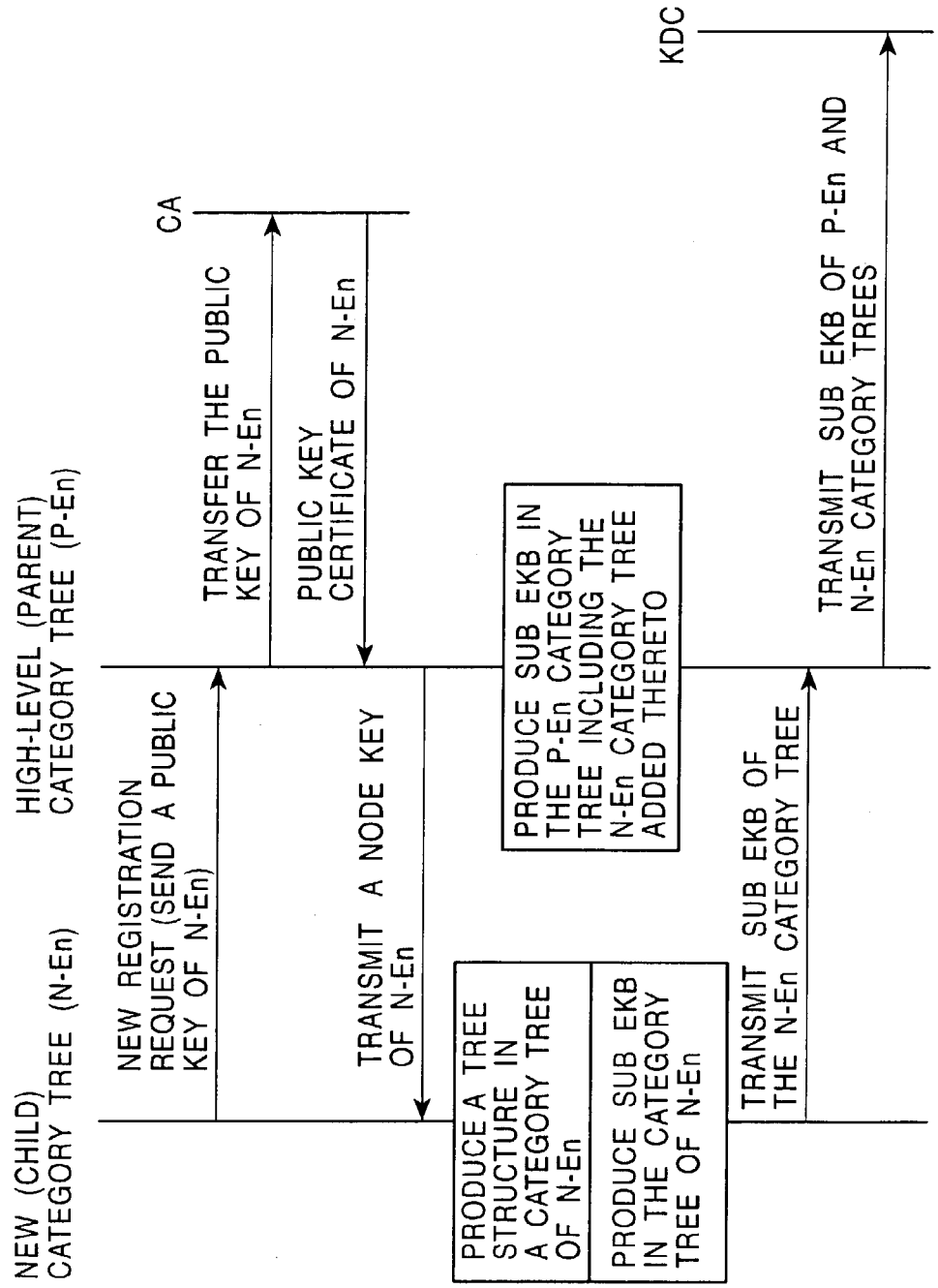
FIG. 32 is a diagram showing a new category tree registration sequence in management of category trees in a hierarchical tree structure, in the information processing system according to the present invention.

Registration of a new category tree is described below. FIG. 32 shows a registration processing sequence. In the sequence shown in FIG. 32, a new (child) category tree (N-En) to be added to the tree structure issues a new registration request to an upper-level (parent) category tree (P-En). Each category tree has its own public key according to the public key cryptography scheme. When the new category tree issues the registration request, it transmits its public key to the upper-level category tree (P-En).

Upon receiving the registration request, the upper-level category tree (P-En) transfers the received public key of the new (child) category tree (N-En) to a certificate authority (CA) to receive a public key of the new (child) category tree having a signature of the CA. The above procedure is performed in mutual authentication between the upper-level category tree (P-En) and the new (child) category tree (N-En).

If the authentication of the category tree requesting new registration is completed via the above process, the upper-level category tree (P-En) gives permission of the registration of the new (child) category tree (N-En) and transmits a node key assigned to the new (child) category tree to the new (child) category tree (N-En). This node key corresponds to one of the endpoint nodes of the upper-level category tree (P-En), and also corresponds to the top node or a sub-root key of the new (child) category tree (N-En).

After the completion of the transmission of the node key, the new (child) category tree (N-En) builds a tree structure of the new (child) category tree (N-En) and sets the received sub-root key at the top node of the tree structure. Furthermore, keys are set at the respective nodes and leaves, and an enabling key block (EKB) associated with the category tree is produced. An enabling key block (EKB) associated with a category tree is referred to as a sub-EKB.

On the other hand, the upper-level category tree (P-En) produces a sub-EKB associated with the upper-level category tree (P-En) such that an endpoint node, which was made active when the new (child) category tree was connected thereto, is reflected in the sub-EKB.

After the new (child) category tree (N-En) produces the sub-EKB including the node keys and leaf keys within the new (child) category tree (N-En), the new (child) category tree (N-En) transmits the resultant sub-EKB to the upper-level category tree (P-En).

Upon receiving the sub-EKB from the new (child) category tree (N-En), the upper-level category tree (P-En) transmits the received sub-EKB together with the renewed sub-EKB of the upper-level category tree (P-En) to a key distribution center (KDC).

On the basis of sub-EKB's of all category trees, the key distribution center (KDC) can produce an EKB in various manners. For example, the EKB can be produced such that only a specified category tree or a specified device can decrypt the EKB. If the EKB produced so as to be allowed to be decrypted by a specified category tree or device is provided to, for example, a content provider, and if the content provider encrypts a content key on the basis of the received EKB and supplies the encrypted content key via a network or supplies a storage medium on which the encrypted key is stored, it becomes possible to provide content such that the content can be used only by the specified device.

The manner of registration of a sub-EKB of a new category tree at a key distribution center (KDC) is not limited to sequentially transferring the sub-EKB via an upper-level category tree, but registration may also be possible by directly transmitting the sub-EKB from the new category tree to the key distribution center (KDC) without passing it via the upper-level category tree.

The correspondence between an upper-level category tree and a lower-level category tree that is newly added to the upper-level category tree is described below with reference to FIG. 33. By providing, as a top node of the new category tree to be added, one endpoint node 3201 of the upper-level category tree to the lower-level category tree, the lower-level category tree can be added as one of the category trees that are managed by the upper-level category tree. As will be described in detail later, category trees managed by the upper-level category tree refer to those category trees that can be revoked by the upper-level category tree.

Figure 33:
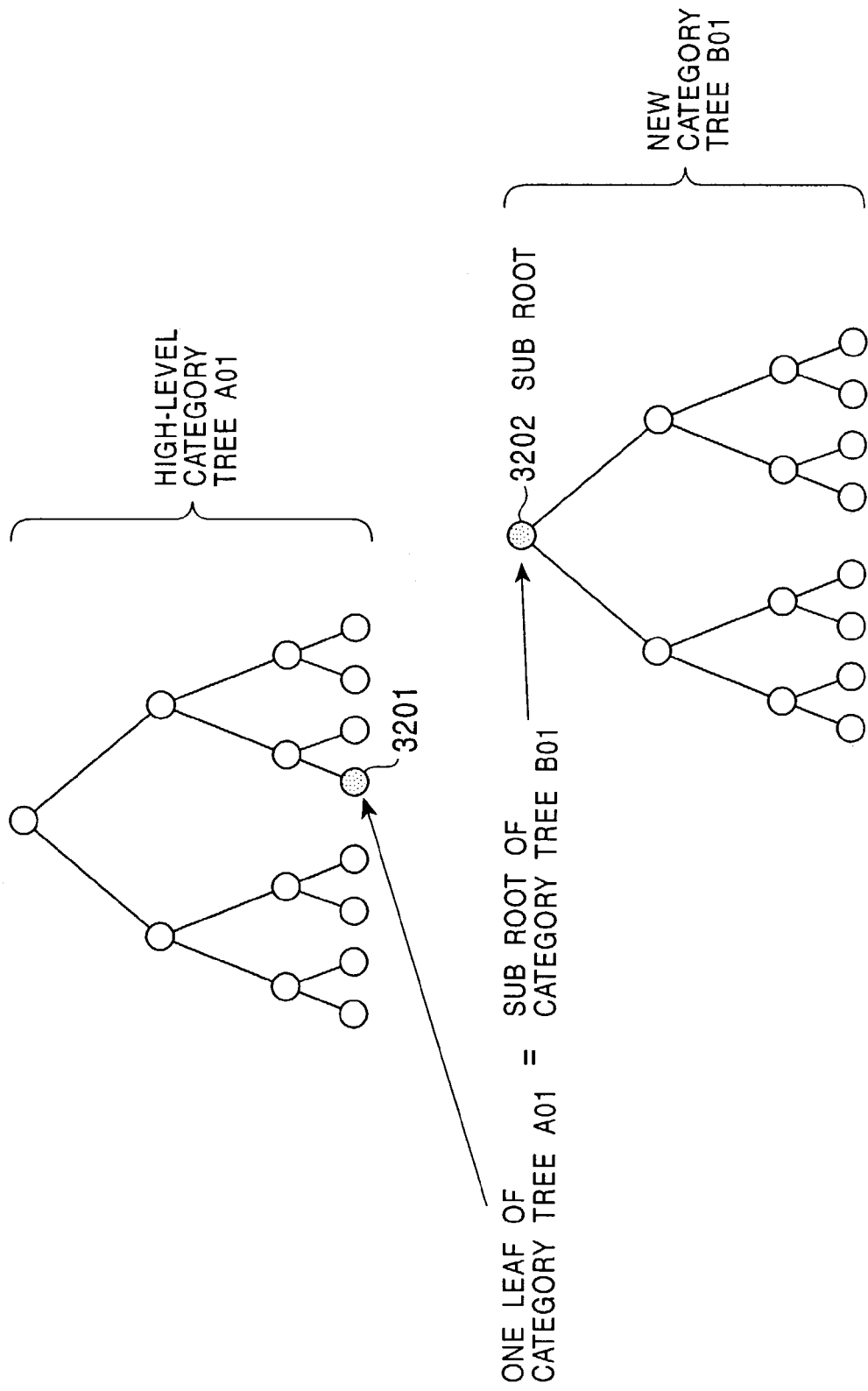
FIG. 33 is a diagram showing the relationship between a new category tree and a higher-level category tree in management of category trees in a hierarchical tree structure, in the information processing system according to the present invention.

As shown in FIG. 33, if a new category tree B01 is added to an upper-level category tree A01, the same node acts as one endpoint node or leaf 3201 of the upper-level category tree and also as the top node 3202 of the newly added category tree. That is, one endpoint node serving as one leaf of the upper-level node 3201 is set to be the sub-root 3202 of the newly added category tree B01. By performing the setting in the above-described manner, the newly added category tree B01 becomes one of active category trees constituting the total tree structure.

Figure 34:
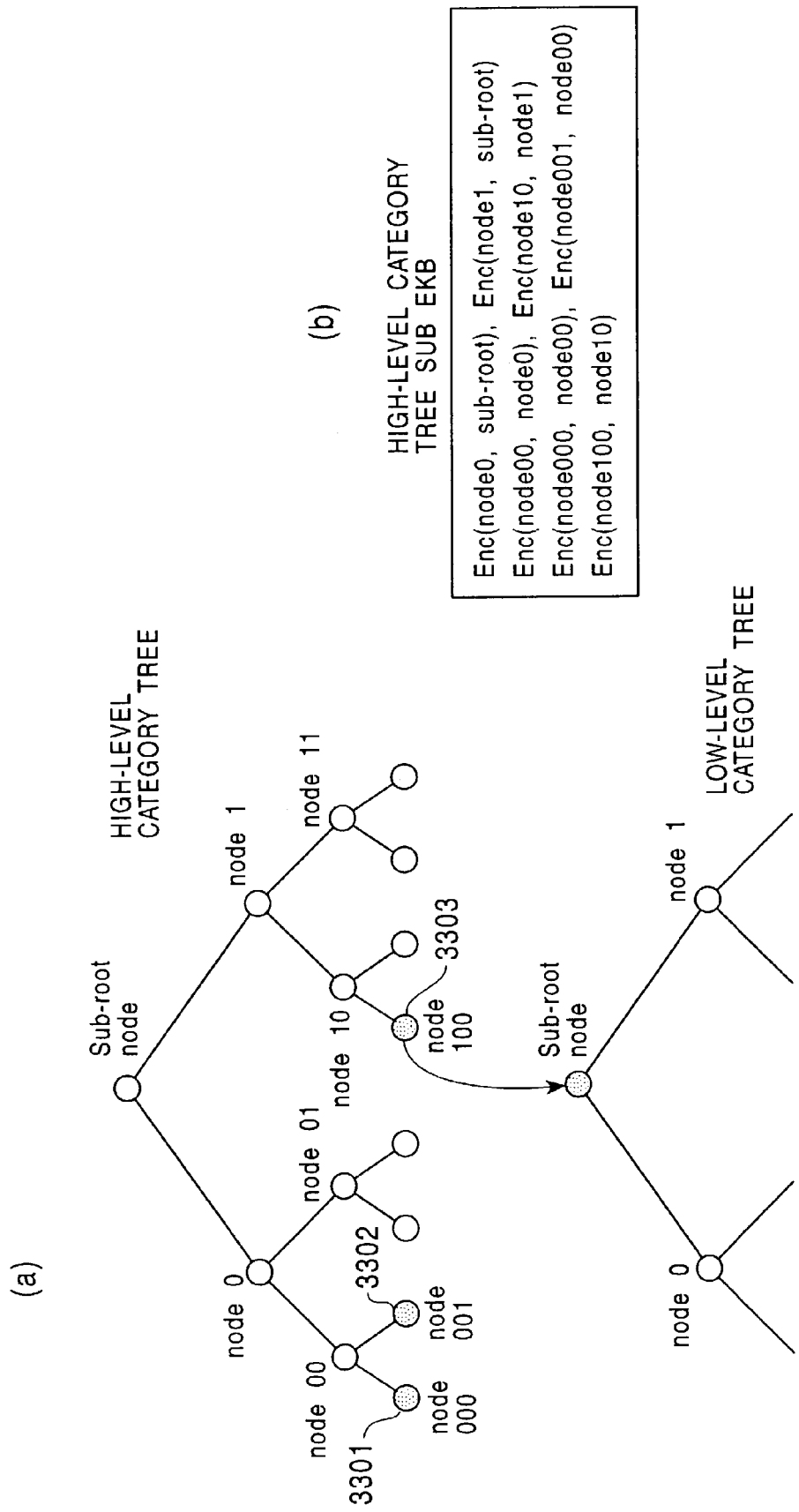
FIG. 34 is a diagram showing a sub-EKB used in management of category trees having a hierarchical tree structure, in the information processing system according to the present invention.

FIG. 34 shows an example of a renewed EKB that is produced by an upper-level category tree when a new category tree is added. That is, FIG. 34 shows an example of a sub-EKB that is produced by the upper-level category tree when, in a situation in which the upper-level category tree has a tree structure including, as shown in FIG. 34(*a*), an active endpoint node (node 000) 3301 and an active endpoint node (node 001) 3302, an endpoint node (node 100) 3303 thereof is provided to the new category tree.

The sub-EKB has a format shown in FIG. 34(*b*). That is, the sub-EKB is a list of a high-level node key encrypted using an active endpoint node key, a higher-level node key encrypted using the upper-level node key, . . . , and finally a sub-root key. The sub-EKB is produced according to this format. Each category tree has its own EKB in the form of encrypted data including, as with the sub-EKB shown in FIG. 34(*b*), a high-level node key encrypted using an active endpoint node key or leaf key, a higher-level node key encrypted using the high-level node key, . . . , and finally a sub-root key. The EKB of each category tree is managed by that category tree itself.

Revocation Under the Management of a Category Tree

Revocation of a device or a category tree performed in a situation in which the key distribution tree is managed on a category tree by category tree basis is described below. In the examples shown in FIGS. 3 and 4, an enabling key block (EKB) is produced such that the resultant enabling key block (EKB) can be decrypted only specified devices in the tree structure but a revoked device cannot decrypt the resultant enabling key block (EKB). In the examples shown in FIGS. 3 and 4, revocation is performed for a device assigned to a specific leaf in the tree structure. In a case where management is performed on a category tree basis, revocation can be performed on a specific category tree.

Figure 35:
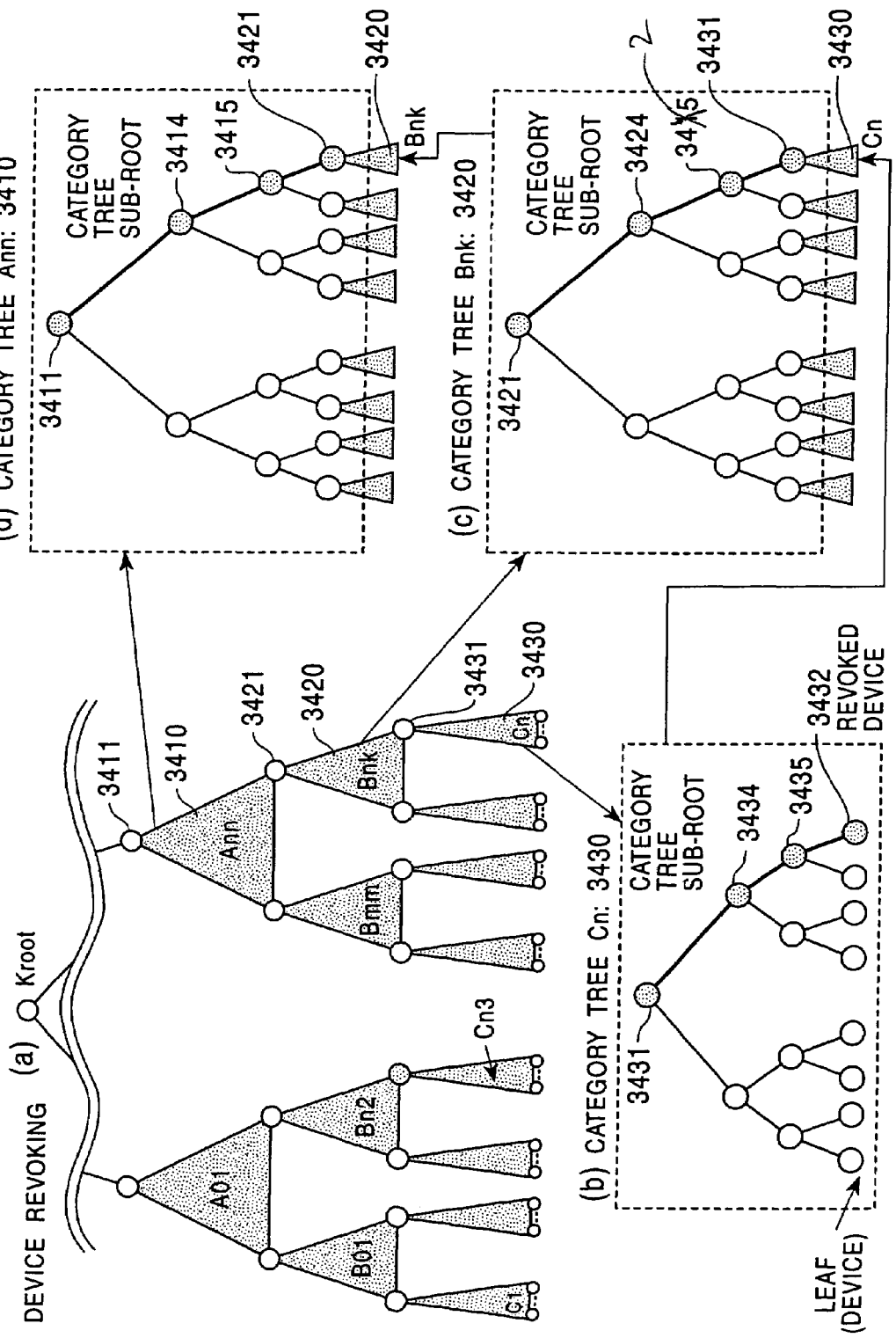
FIG. 35 is a diagram showing a device revocation process performed in management of category trees having a hierarchical tree structure, in the information processing system according to the present invention.

Referring to FIG. 35 and following figures, a revocation process performed in a situation in which management is performed on a category tree basis is described below. FIG. 35 shows a process of revoking a category tree at the lowest level in the tree structure including a plurality of category trees. In this case, devices belonging to the revoked category tree are all revoked.

FIG. 35(*a*) shows a key distribution tree structure managed on the basis of category trees. In this specific example, a root node is disposed at the top of the tree, and category trees A01 to Ann are disposed at a certain level below the root node. Category trees B01 to Bnk are disposed at a lower level, and category trees C1 to Cn are disposed at a further lower level. Category trees at the lowest level have endpoint nodes (leaves) assigned to respective devices such as a recording/playing-back apparatus and a playback apparatus.

Revocation is performed individually by the respective category trees. For example, the category trees C1 to Cn at the lowest level can revoke a device at a leaf. FIG. 35(*b*) shows a tree structure of a category tree Cn (3430) that is one of the category trees at the lowest level. The category tree Cn (3430) has a top node 3431, and a plurality of devices are assigned to respective leaves at the endpoint nodes.

When, for example, a device 3432 assigned to a leaf at a certain endpoint node should be revoked, the category tree Cn (3430) renews the category tree Cn itself and produces an enabling key block (sub-EKB) consisting of node keys and leaf keys included in the renewed category tree Cn. This enabling key block cannot be encrypted by the revoked device 3432 but can be encrypted only by devices assigned to the other leaves. A manager of the category tree Cn produces such an enabling key block as a renewed sub-EKB. More specifically, node keys at nodes 3431, 3434, and 3435 in a path from the sub-root to the device 3432 to be revoked are renewed. A renewed sub-EKB is produced into the form of encrypted key data such that the renewed node keys are reflected in the renewed sub-EKB, thereby ensuring that the renewed sub-EKB can be decrypted only by leaf devices other than the revoked device 3432. This revocation process is equivalent to the revocation process described above with reference to FIGS. 3 and 4, if the root key is replaced with the sub-root key that is a top node key of the category tree.

The enabling key block (sub-EKB) renewed via the revocation process performed by the category tree Cn (3430) is transmitted to a higher-level category tree. In this specific example, the high-level category tree is a category tree Bnk (3420), which includes, as one of endpoint nodes, the top node 3431 of the category tree Cn (3430).

If the category tree Bnk (3420) receives the enabling key block (sub-EKB) from the lower-level category tree Cn (3430), the category tree Bnk (3420) replaces the key assigned to the endpoint node 3431 of the category tree Bnk (3420) corresponding to the top node 3431 of the category tree Cnk (3430) with the renewed key included in the enabling key block received from the lower-level category tree Cn (3430), and the category tree Bnk (3420) renews its own sub-EKB. FIG. 35(*c*) shows the tree structure of the category tree Bnk (3420). In the category tree Bnk (3420) shown in FIG. 35(*c*), it is needed to renew node keys in a path from the sub-root 3421 to the endpoint node 3431 connected to the category tree including the device to be revoked. More specifically, it is needed to renew node keys assigned to nodes 3421, 3424, and 3425 in the path connected to the node 3431 of the category tree that has transmitted the renewed sub-EKB. After renewing the node keys corresponding to these nodes, the category tree Bnk (3420) produces its renewed sub-EKB so as to reflect the renewed node keys.

The renewed enabling key block (sub-EKB) produced by the category tree Bnk (3420) is transmitted to a further higher-level category tree. In this specific example, the further higher-level category tree is a category tree Ann (3410), which includes, as one of endpoint nodes, the top node 3421 of the category tree Bnk (3420).

If the category tree Ann (3410) receives the enabling key block (sub-EKB) from the lower-level category tree Bnk (3420), the category tree Ann (3410) replaces the key assigned to the endpoint node 3421 of the category tree Ann (3410) corresponding to the top node 3421 of the category tree Bnk (3420) with the renewed key included in the enabling key block received from the lower-level category tree Bnk (3420), and the category tree Ann (3410) renews its own sub-EKB. FIG. 35(*d*) shows the tree structure of the category tree Ann (3410). In the category tree Ann (3410) shown in FIG. 35(*d*), it is needed to renew node keys assigned to nodes 3411, 3414, and 3415 in a path from the sub-root 3411 to the endpoint node 3421 connected to the category tree that has transmitted the renewed sub-EKB. After renewing the node keys corresponding to these nodes, the category tree Ann (3410) produces its renewed sub-EKB so as to reflect the renewed node keys.

Figure 30:
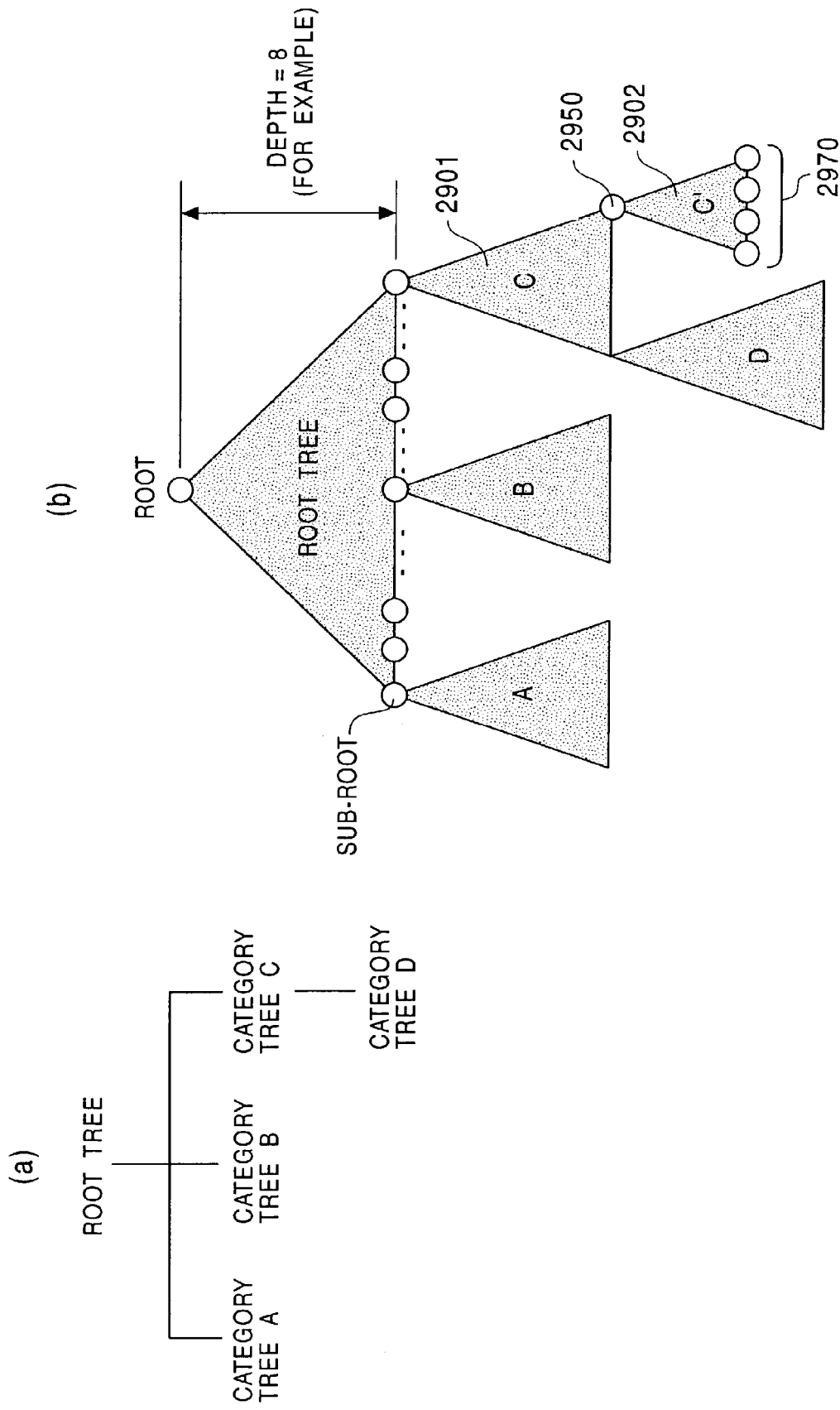
FIG. 30 is a diagram showing a manner of managing category trees in a hierarchical tree structure, in the information processing system according to the present invention.

The above-described process is performed for further higher-level category trees until the root category tree shown in FIG. 30(*b*) has been renewed. Via the sequence of processes described above, revocation of the device is completed. The renewed sub-EKB's produced by the respective category trees are finally transmitted to the key distribution center (KDC) and stored therein. The key distribution center (KDC) produces various EKB's on the basis of all renewed sub-EKB's. Each renewed EKB has a form of an encrypted key block that cannot be decrypted by the revoked device.

Figure 36:
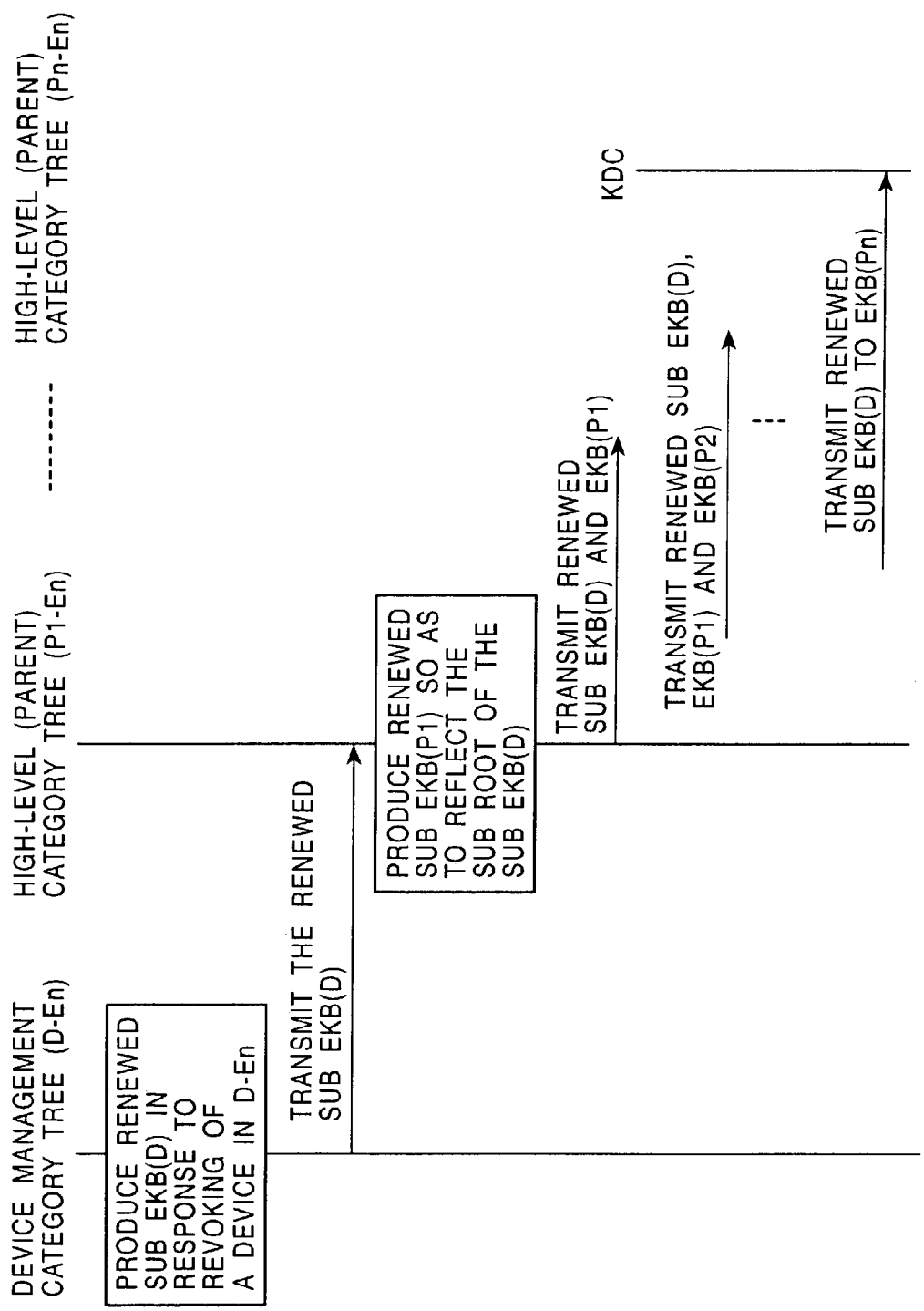
FIG. 36 is a diagram showing a device revocation sequence performed in management of category trees having a hierarchical tree structure, in the information processing system according to the present invention.

The sequence of device revocation processes is shown in FIG. 36. In the sequence shown in FIG. 36, a device management category tree (D-En) at the bottom of the tree structure performs key renewal needed to revoke a leaf from the device management category tree (D-En) and produces a renewed sub-EKB(D) of the device management category tree (D-En). The renewed sub-EKB(D) is transmitted to a higher-level category tree. Upon receiving the renewed sub-EKB(D), the higher-level (parent) category tree (P1-En) renews the node key assigned to the endpoint node corresponding to the top node of the renewed sub-EKB(D) and also node keys assigned to nodes in the path from that endpoint node to the sub-root, and then produces a renewed sub-EKB(P1) so as to reflect the renewed node keys. The above-described process is performed for further higher-level category trees, and all renewed sub-EKB's that are finally obtained are stored in the key distribution center (KDC) and managed thereby.

Figure 37:
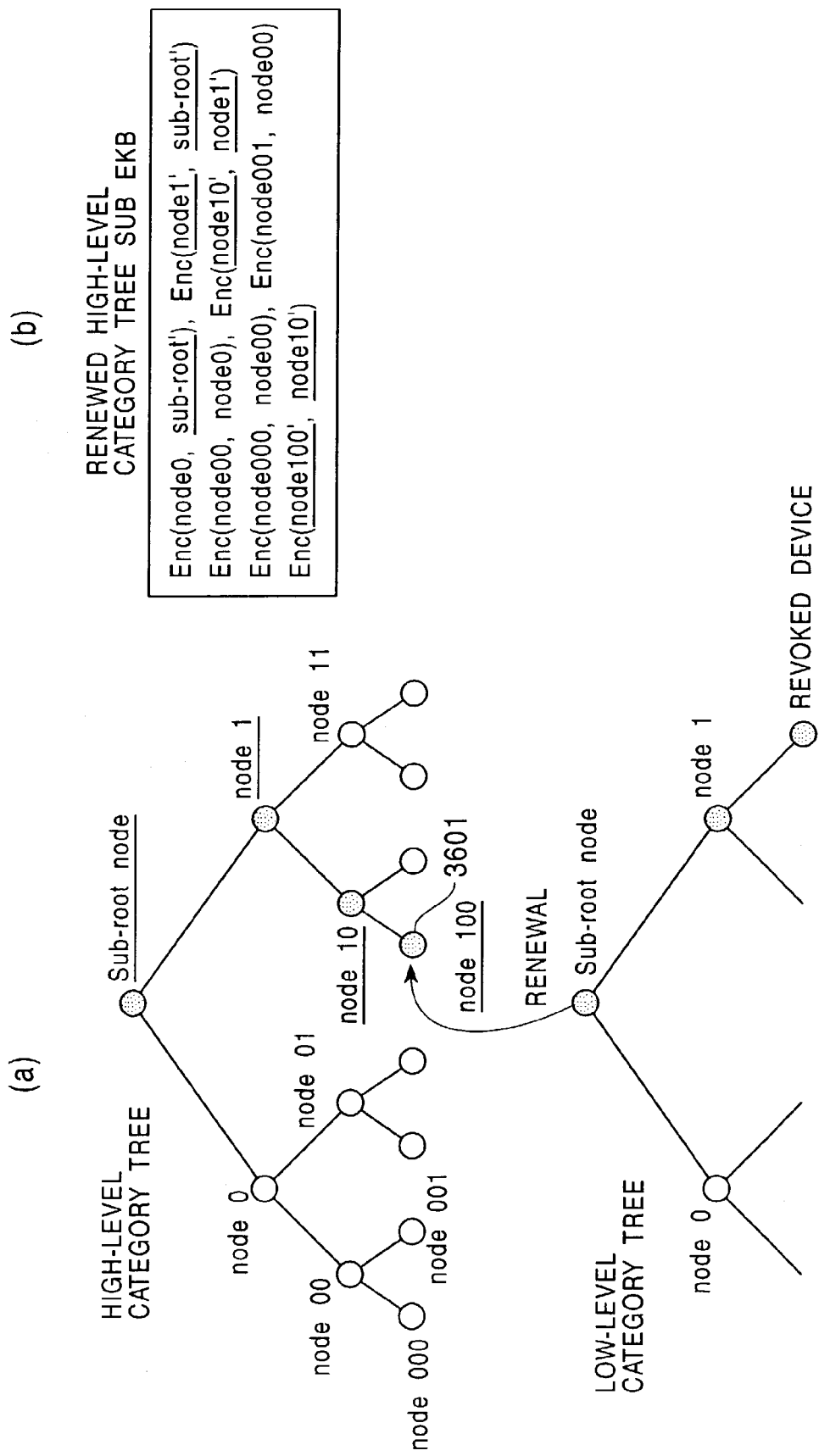
FIG. 37 is a diagram showing a sub-EKB renewed in response to device revocation in management of category trees having a hierarchical tree structure, in the information processing system according to the present invention.

FIG. 37 shows an example of a renewed enabling key block (EKB) produced by a higher-level category tree in a device revocation process.

In the specific example shown in FIG. 37, in response to receiving a renewed sub-EKB from a lower-level category tree shown in FIG. 37(*a*) including a device to be revoked, a higher-level category tree produces a renewed EKB. The top node of the lower-level category tree including the device to be revoked corresponds to an endpoint node (node 100) 3601 of the higher-level category tree.

The higher-level category tree renews node keys at nodes in the path from the sub-root of the higher-level category tree to the endpoint node (node 100) 3601 and produces a renewed sub-EKB so as to reflect the renewed node keys. The resultant renewed sub-EKB is shown in FIG. 37(*b*). In FIG. 37(*b*), the renewed keys are underlined and primed. As described above, the node keys in the path from the renewed endpoint node to the subroot are renewed, and the renewed sub-EKB of the category tree is produced so as to reflect the renewal of the node keys.

In the case where it is desired to perform revocation for an entire category tree, the revocation of the category tree can be performed as described below.

Figure 38:
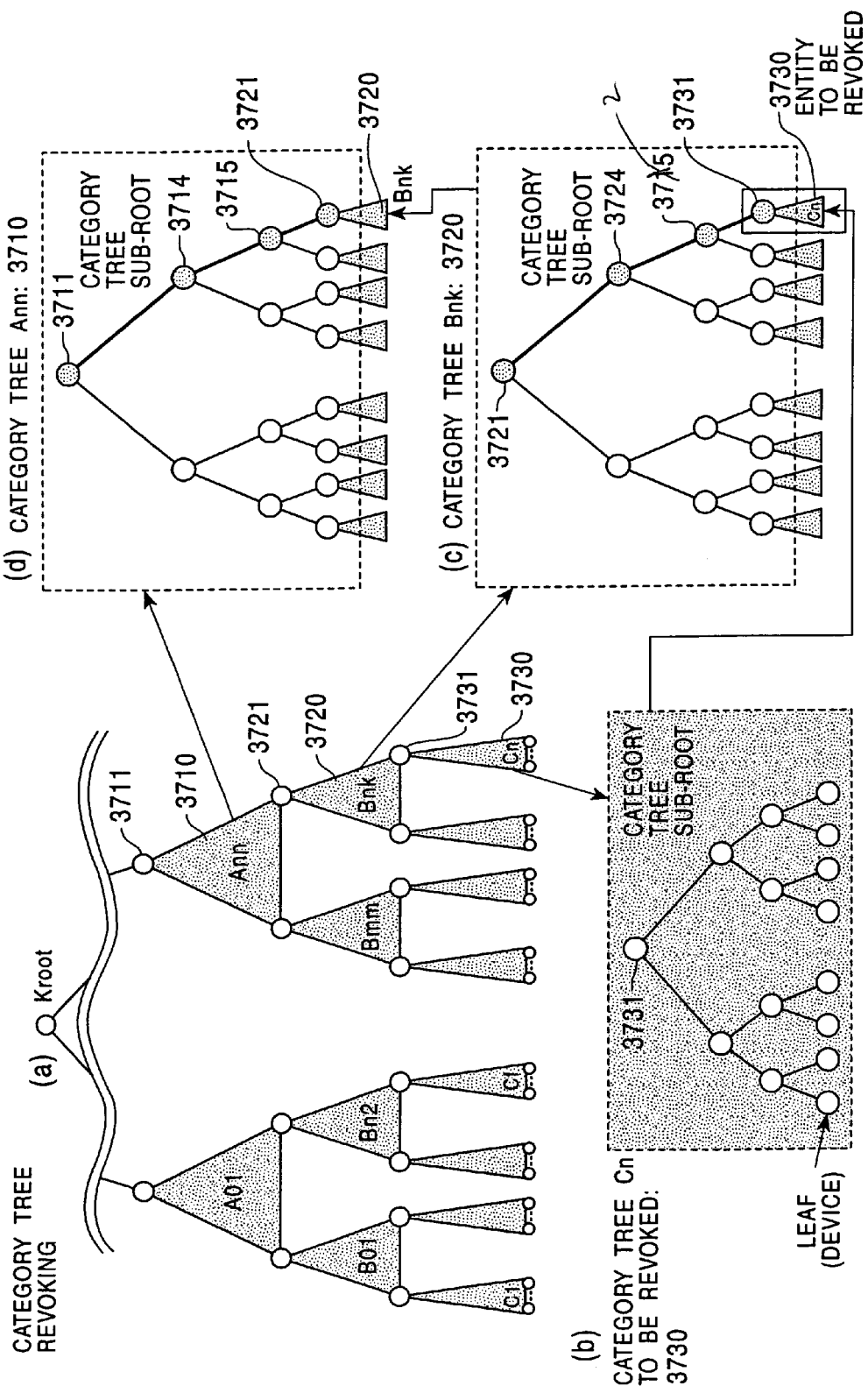
FIG. 38 is a diagram showing a category tree revocation process performed in management of category trees in the form of a hierarchical tree structure, in the information processing system according to the present invention.

FIG. 38(*a*) shows an example of a key distribution tree structure managed on the basis of units of category trees. In this specific example, a root node is disposed at the top of the tree, and category trees A01 to Ann are disposed at a certain level below the root node. Category trees B01 to Bnk are disposed at a lower level, and category trees C1 to Cn are disposed at a further lower level. Category trees at the lowest level have endpoint nodes (leaves) assigned to respective devices such as a recording/playing-back apparatus and a playback apparatus.

Herein, it is assumed that a category tree Cn (3730) should be revoked. The category tree Cn (3730) at the bottom includes a top node 3731 as shown in FIG. 38(*b*), and a plurality of devices are assigned to respective leaves at the endpoint nodes.

By revoking the category tree Cn (3730), it is possible to remove all devices belonging to the category tree Cn (3730) from the tree structure at the same time. Revocation of the category tree Cn (3730) is performed by a category tree Bnk (3720) located next to, at a higher level, the category tree Cn (3730). The category tree Bnk (3720) includes, as one of the endpoint nodes, the top node 3731 of the category tree Cn (3730).

In order to revoke the lower-level category tree Cn (3730), the category tree Bnk (3720) renews an endpoint node 3731 of the category tree Bnk (3720) corresponding to the top node 3731 of the category tree Cnk (3730) and further renews node keys in the path from the category tree 3730 to be revoked to the subroot of the category tree Bnk (3720). The category tree Bnk (3720) then produces an enabling key block serving as a renewed sub-EKB. Herein, the node keys to be renewed are node keys in the path from the subroot 3721 shown in FIG. 38(c) to an endpoint node 3731 that is also the top node of the category tree to be revoked. More specifically, node keys assigned to nodes 3721, 3724, 3725, and 3731 are renewed. After renewing the node keys corresponding to these nodes, the category tree Bnk (3720) produces its renewed sub-EKB so as to reflect the renewed node keys.

Alternatively, when the category tree Bnk (3720) revokes the lower-level category tree Cn (3730), the category tree Bnk (3720) may not renew its endpoint node 3731 corresponding to the top node 3731 of the category tree Cnk 3730, but the category tree Bnk (3720) may renew only the other node keys in the path from the category tree 3730 to be revoked to the subroot of the category tree Bnk 3720 and may produce an enabling key block serving as a renewed sub-EKB.

The renewed enabling key block (sub-EKB) produced by the category tree Bnk (3720) is transmitted to a higher-level category tree. In this specific example, the further higher-level category tree is a category tree Ann (3710), which includes, as one of endpoint nodes, the top node 3721 of the category tree Bnk (3720).

If the category tree Ann (3710) receives the enabling key block (sub-EKB) from the lower-level category tree Bnk (3720), the category tree Ann (3710) replaces the key assigned to the endpoint node 3721 of the category tree Ann (3710) corresponding to the top node 3721 of the category tree Bnk (3720) with the renewed key included in the enabling key block received from the lower-level category tree Bnk (3720), and the category tree Ann (3710) renews its own sub-EKB. FIG. 38(d) shows the tree structure of the category tree Ann (3710). In the category tree Ann (3710) shown in FIG. 38(d), it is needed to renew node keys assigned to nodes 3711, 3714, and 3715 in a path from the sub-root 3711 to the endpoint node 3721 connected to the category tree that has transmitted the renewed sub-EKB. After renewing the node keys corresponding to these nodes, the category tree Ann (3710) produces its renewed sub-EKB so as to reflect the renewed node keys.

The above-described process is performed for further higher-level category trees until the root category tree shown in FIG. 30(b) has been renewed. Via the sequence of processes described above, revocation of the category tree is completed. The renewed sub-EKB's produced by the respective category trees are finally transmitted to the key distribution center (KDC) and stored therein. The key distribution center (KDC) produces various EKB's on the basis of all renewed sub-EKB's. Each renewed EKB has a form of an encrypted key block that cannot be decrypted by any device belonging to the revoked category tree.

Figure 39:
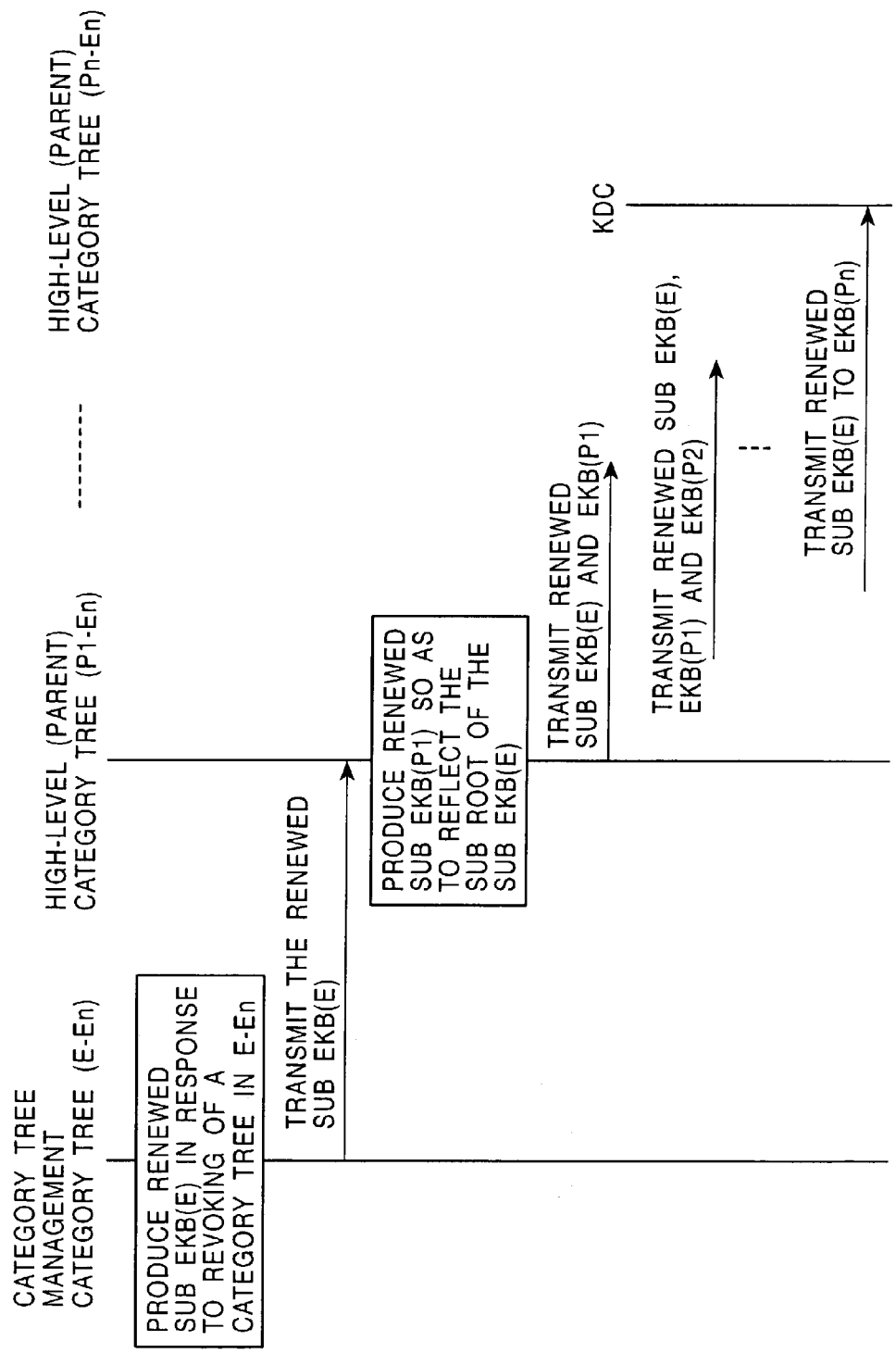
FIG. 39 is a diagram showing a category tree revocation sequence performed in management of category trees in the form of a hierarchical tree structure, in the information processing system according to the present invention.

The sequence of category tree revocation processes is shown in FIG. 39. In the sequence shown in FIG. 39, a category tree management category tree (E-En), which wants to revoke some category tree, performs key renewal needed to isolate an endpoint node to be revoked from the category tree management category tree (E-En) and produces a renewed sub-EKB(E) of the category tree management category tree (E-En) The renewed sub-EKB(E) is transmitted to a higher-level category tree. Upon receiving the renewed sub-EKB(E), the higher-level (parent) category tree (P1-En) renews the node key assigned to the endpoint node corresponding to the renewed top node of the renewed sub-EKB(E) and also node keys assigned to nodes in the path from that endpoint node to the sub-root, and then produces a renewed sub-EKB(P1) so as to reflect the renewed node keys. The above-described process is performed for further higher-level category trees, and all renewed sub-EKB's that are finally obtained are stored in the key distribution center (KDC) and managed thereby. The key distribution center (KDC) produces various EKB's on the basis of all renewed sub-EKB's. Each renewed EKB has a form of an encrypted key block that cannot be decrypted by any device belonging to the revoked category tree.

Figure 40:
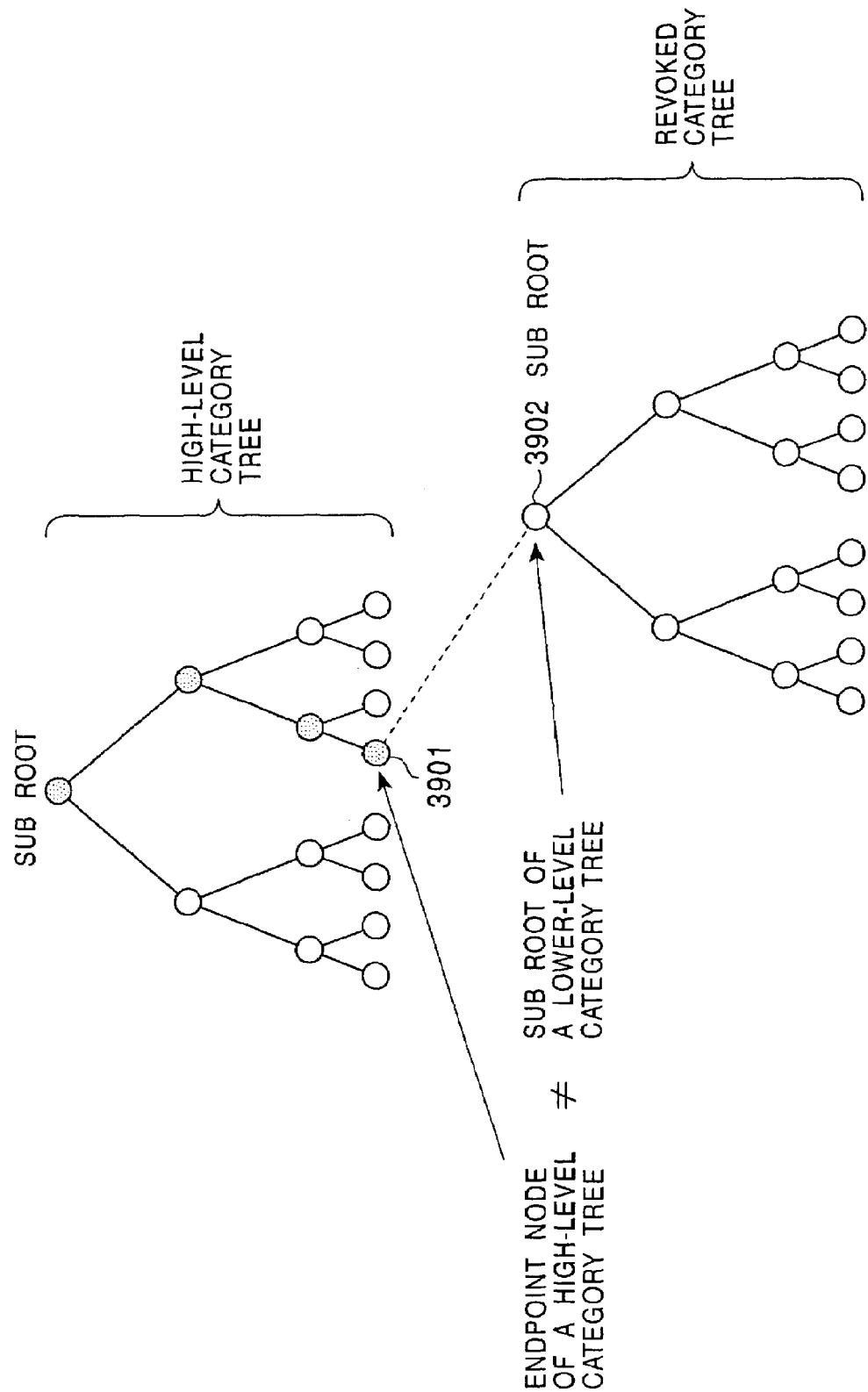
FIG. 40 is a diagram showing the relationship between a revoked category tree and a higher-level category tree in management of category trees in the form of a hierarchical tree structure, in the information processing system according to the present invention.

FIG. 40 illustrates the correspondence between a revoked lower-level category tree and a higher-level category tree that revoked the lower-level category tree. An endpoint node 3901 of the higher-level category tree is renewed in response to revoking the category tree, and then the node keys in the path from the endpoint node 3901 to the subroot of the higher-level category tree are renewed. Furthermore, a new sub-EKB is produced such that the renewal of the node keys is reflected. As a result, the node key of the top node 3902 of the revoked lower-level category tree and the node key of the endpoint node 3901 of the higher-level category tree become different from each other. Because any EKB produced by the key distribution center (KDC) after the revocation of the category tree is based on the key of the endpoint node 3901 renewed by the higher-level category tree, any device corresponding to a leaf of the lower-level category tree cannot have the renewed key and thus cannot decrypt the EKB produced by the key distribution center (KDC).

Although in the example described above, a category tree at the bottom level that manages devices is revoked, a category tree that is located at a middle level and that manages a lower-level category tree may also be revoked by a category tree located next to, at a higher level, the category tree to be revoked in a similar manner as described above. By revoking an entity management category tree at a middle level, it is possible to simultaneously revoke all lower-level category trees and devices belonging directly or indirectly to the revoked category tree.

As described above, revocation of a category tree makes it possible to perform revocation more easily than in the case where revocation is performed in units of devices.

Management of Capability of Category Tree

When keys are distributed on the basis of category trees, the capability of each entity may be managed and content may be distributed depending in the capability as described below. Herein, the term capability is used to represent or define what kinds of contents or program a device can deal with. Examples of capabilities are a capability of decompressing audio data compressed according to a specific compression scheme, a capability of audio reproduction according to a specific scheme, and a capability of dealing with a particular image processing program.

Figure 41:
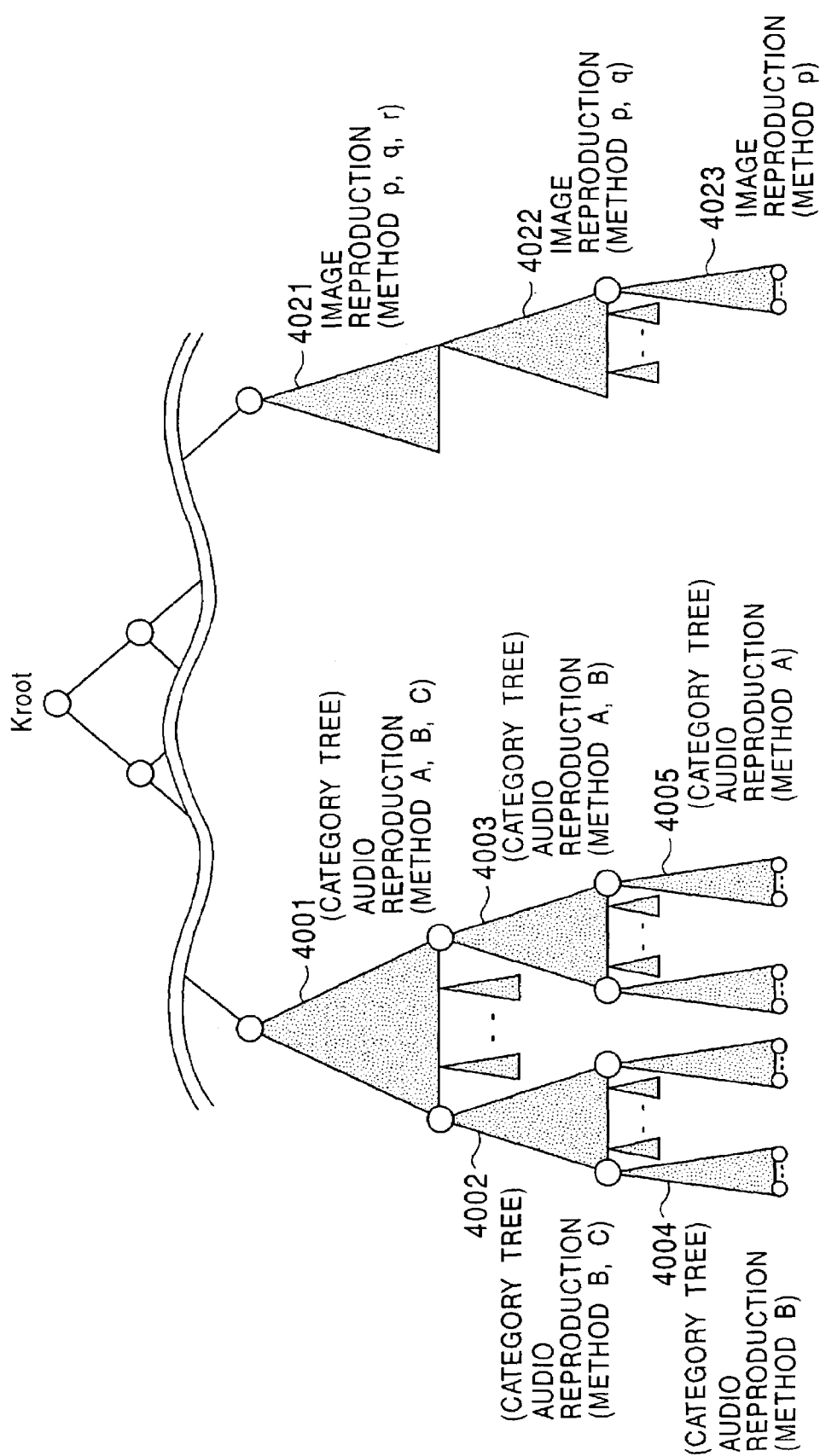
FIG. 41 is a diagram showing setting of capabilities in management of category trees in the form of a hierarchical tree structure, in the information processing system according to the present invention.

FIG. 41 shows an example of a category tree structure including capability definition information. A root node is disposed at the top of the key distribution tree structure, and a plurality of category trees in the form of a binary tree are disposed at lower levels. For example, a category tree 4001 is defined as having an audio playback capability according to any one of audio playback schemes A, B, and C. More specifically, for example, when music data compressed by an audio compression program A, B, or C is distributed, any device belonging as lower-level category trees to the category tree 4001 can decompress the compressed data.

Similarly, a category tree 4002 is defined as having audio playback capability according to one of audio playback schemes B and C, a category tree 4003 is defined as having audio playback capability according to one of audio playback schemes A and B, a category tree 4004 is defined as having audio playback capability according to the audio playback scheme B, and a category tree 4005 is defined as having audio playback capability according to the audio playback scheme A.

On the other hand, a category tree 4021 is defined as having a video playback capability according to any one of schemes p, q, and r, a category tree 4022 is defined as having a video playback capability according to any one of schemes p and q, and a category tree 4023 is defined as having a video playback capability according to the scheme p.

The capability information of respective category trees is managed by the key distribution center (KDC). For example, when a certain content provider wants to distribute music data compressed by a specific compression program to various devices, the key distribution center (KDC) produces an enabling key block (EKB) that can be decrypted only by devices capable of playing back music data compressed by that specific compression program, on the basis of the capability information of the respective category trees. The content provider encrypts a content key using the enabling key block (EKB) produced in accordance with the capability information and distributes the resultant encrypted content key. The content provider also provides compressed music data encrypted using the content key to devices. This makes it possible to securely provide a specific processing program only to devices capable of processing the data.

Figure 42:
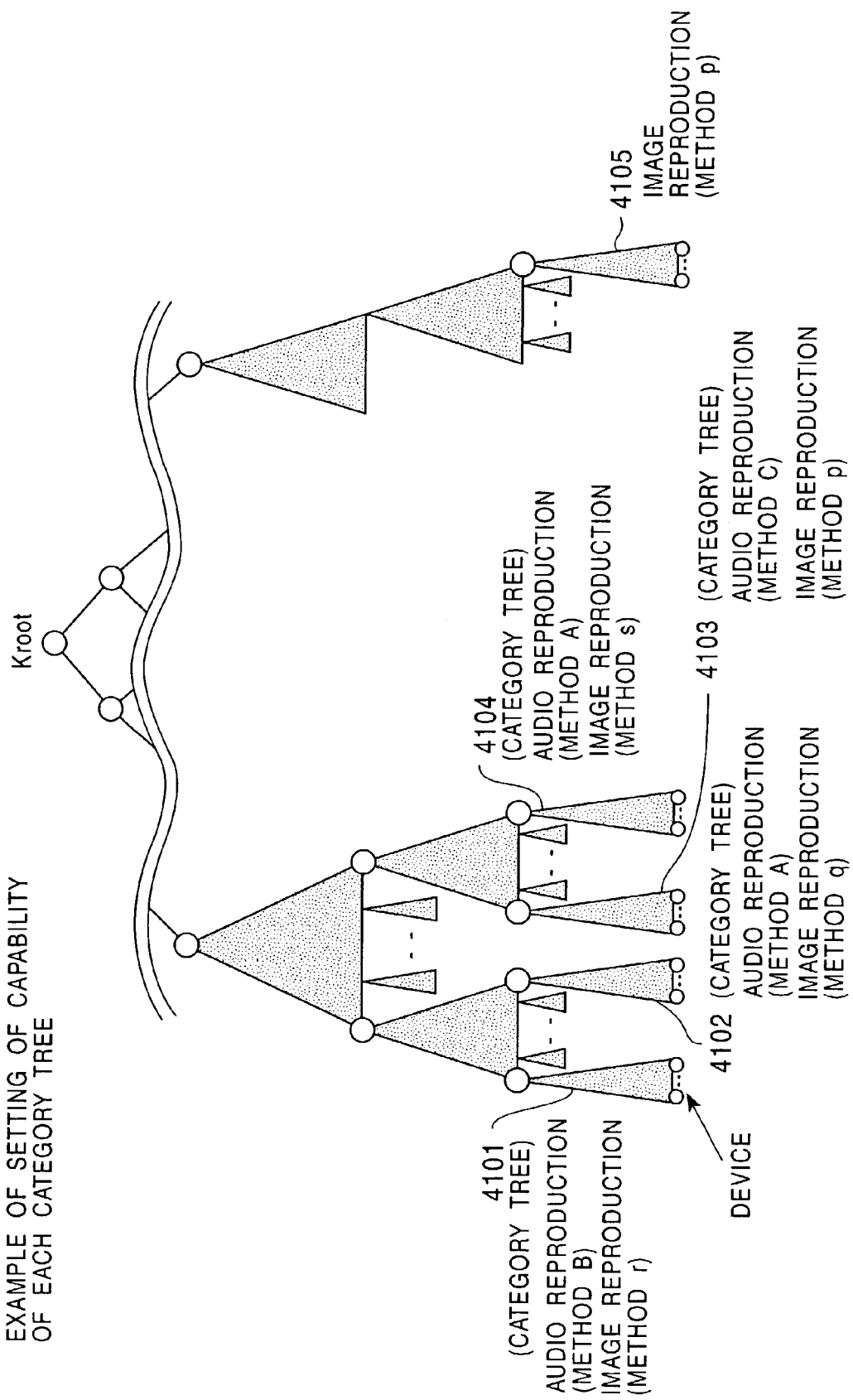
FIG. 42 is a diagram showing setting of capabilities in management of category trees in the form of a hierarchical tree structure, in the information processing system according to the present invention.

In the example shown in FIG. 41, capability information is defined for all category trees. However, it is not necessary to define capability information for all category trees. For example, as shown in FIG. 42, capability information is defined only for lowest-level category trees directly related to devices, and capability information of devices belonging to the lowest-level category trees is managed by the key distribution center (KDC). In this case, in response to a request from a content provider, the key distribution center (KDC) produces an enabling key block (EKB) that can be decrypted only by devices having a capability specified by the content provider, on the basis of the capability information defined for the lowest-level category trees. In the example shown in FIG. 42, capabilities are defined for category trees 4101 to 4105 whose endpoint nodes are related to devices, and the capabilities of respective category trees are managed by the key distribution center (KDC). For example, devices having an audio playback capability according to the scheme B and having a video playback capability according to the scheme r are related to the category tree 4101, devices having an audio playback capability according to the scheme A and having a video playback capability according to the scheme q are related to the category tree 4102.

Figure 43:
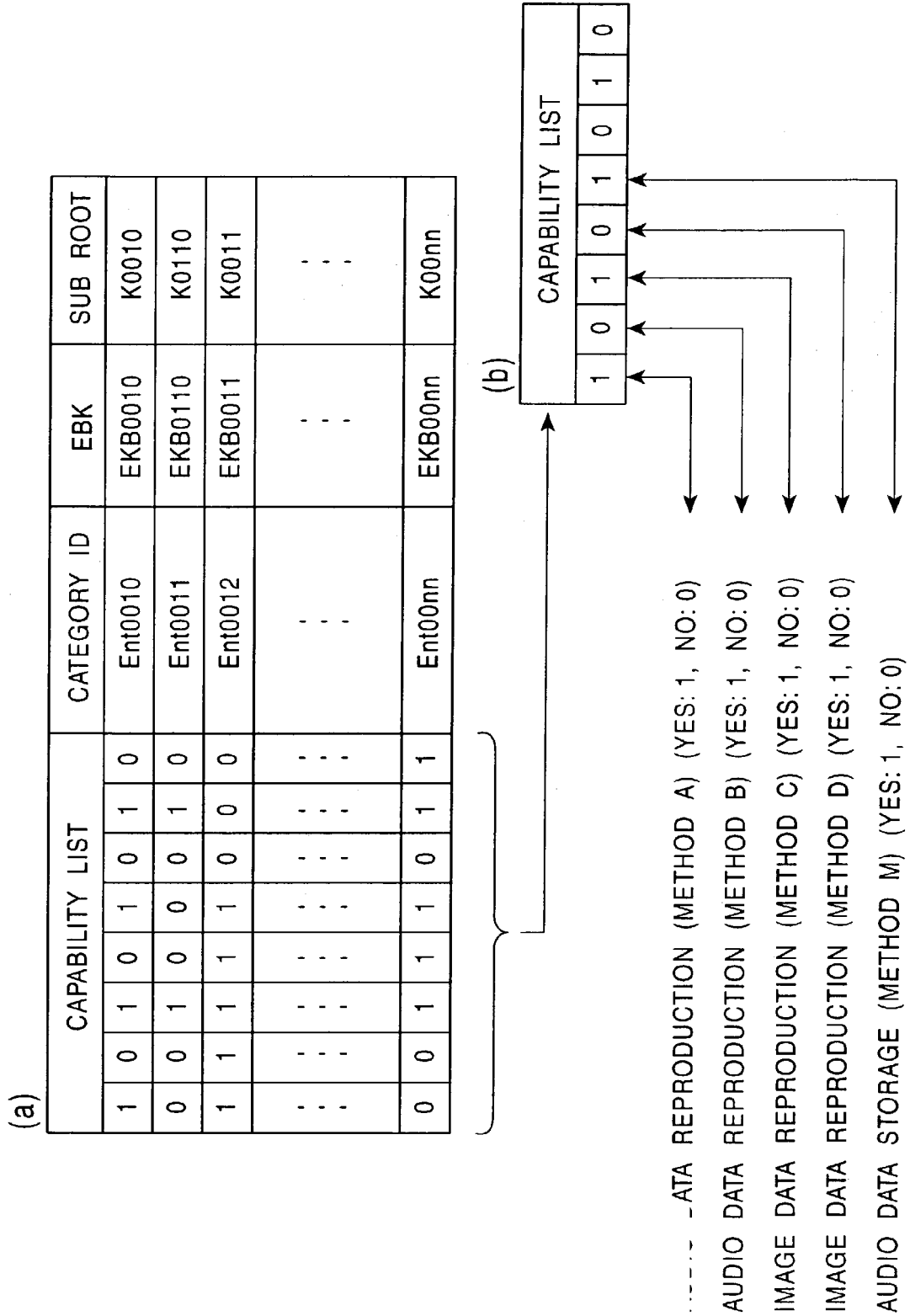
FIG. 43 is a diagram showing a capability management table managed by a key distribution center (KDC) in the information processing system according to the present invention.

FIG. 43 shows an example of a capability management table managed by the key distribution center (KDC). FIG. 43(*a*) shows the data format of the capability management table. A category tree ID is an identifier that identifies a category tree. A capability list indicates capabilities defined for a category tree indicated by a category tree ID. As shown in FIG. 43(*b*), the capability list consists of a plurality of bits each indicating whether various capabilities are available or not. For example, if the audio data playback capability according to scheme (A) is available, the corresponding bit is set to "1", but the bit is set to "0" if the capability is not available. Similarly, for the audio data playback capability according to scheme (B), the corresponding bit is set to "1" if the capability is available, but the bit is set to "0" if the capability is not available. Note that the method of setting the capability information is not limited to that described above, but another method may also be employed as long as the method can indicate the capabilities of the devices managed by the category trees.

The capability management table further includes data representing the sub-EKB of each category tree. In a case where sub-EKB's are stored separately in another database, identification information of sub-EKB is described instead of the sub-EKB itself. Furthermore, the capability management table also includes data indicating the subroot node of each category tree.

Figure 44:
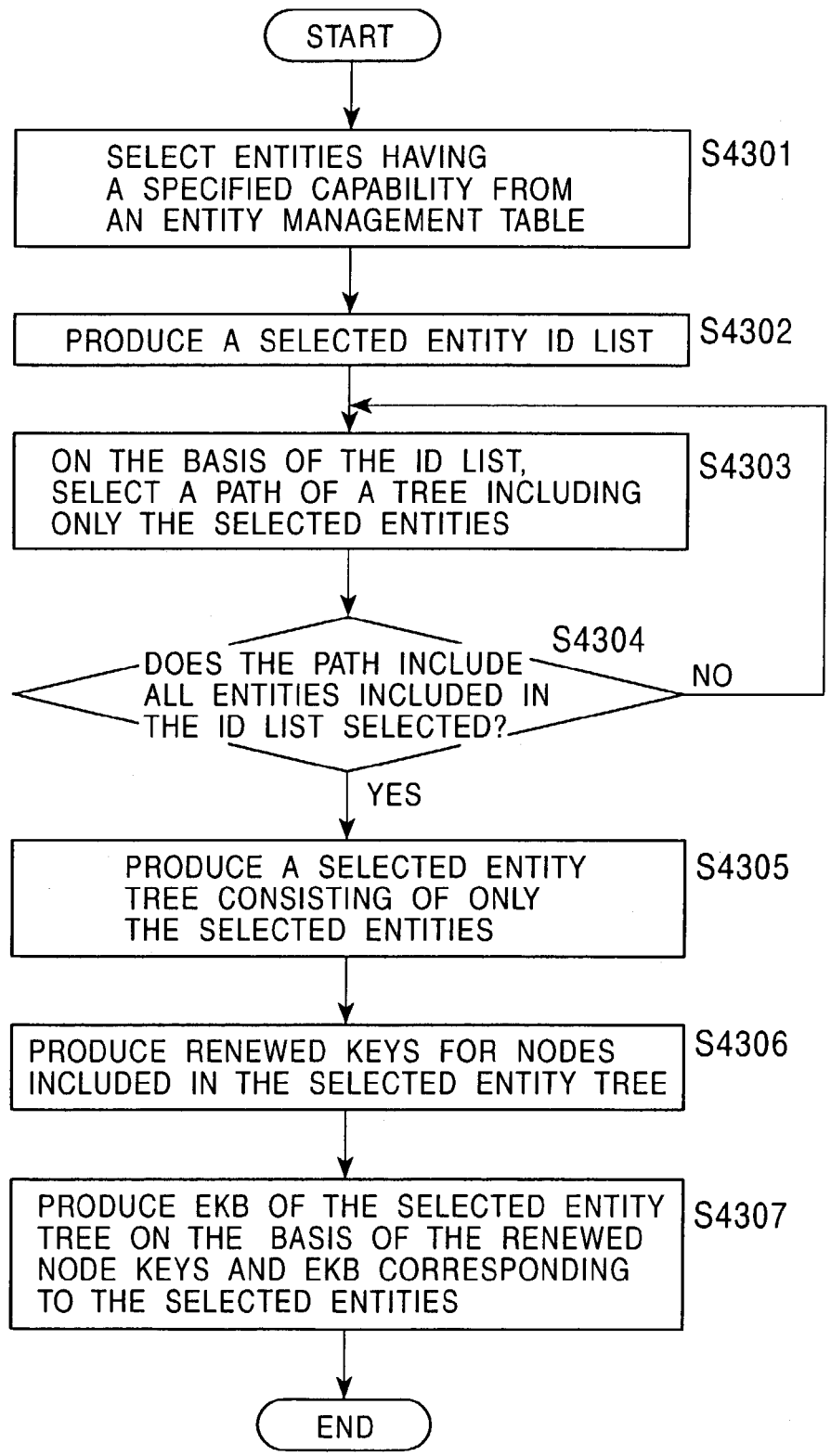
FIG. 44 is a flow chart of a process of producing an EKB on the basis of a capability management table managed by a key distribution center (KDC) in the information processing system according to the present invention.

On the basis of the capability management table, the key distribution center (KDC) produces an enabling key block (EKB) that can be decrypted only by devices having a capability of playing back a specific content. Referring to FIG. 44, the process of producing the enabling key block on the basis of the capability information is described below.

First, in step S4301, the key distribution center (KDC) selects a category tree having a specified capability from the capability management table. More specifically, for example, when a content provider wants to distribute audio data according to the audio data playback scheme A, the key distribution center (KDC) searches the capability list shown in FIG. 43(*a*) and selects category trees having a value of "1" in the bit indicating the audio data playback capability according to the scheme A.

Then in step S4302, the key distribution center (KDC) produces a list of ID's of selected category trees. Thereafter, in step S4303, the key distribution center (KDC) selects a path that should be included in a tree formed by selected category trees indicated by the ID's (that is, a path to be included in a key distribution tree). In step S4304, it is determined whether all paths included in the selection category tree ID's have been selected. If all paths have not been selected, selection of paths in step 4303 is performed until all paths have been selected. That is, in the case where a plurality of category trees are selected, paths corresponding to the respective category trees are sequentially selected.

If all paths included in the selected category tree ID's have been selected, the process proceeds to step S4305. In step S4305, a key distribution tree structure including only the selected category trees is produced.

Then in step S4306, node keys included in the tree structure produced in step S4305 are renewed, thereby producing renewed node keys. Furthermore, sub-EKB's of the selected category trees included in the key distribute tree structure are extracted from the capability management table. On the basis of the extracted sub-EKB's and the renewed node keys produced in step S4306, an enabling key block (EKB) is produced such that it can be decrypted only by the devices included in the selected category trees. The enabling key block (EKB) produced in the above-described manner can be used only by the devices having the specified capability, that is, the enabling key block (EKB) can be decrypted only by such devices. If, for example, a content key is encrypted using this enabling key block (EKB) and content compressed by a specific program is encrypted using that content key, and if the resultant encrypted content key and content are provided to devices, then only the devices having the specific capability selected by the key distribution center (KDC) can use the content.

As described above, the key distribution center (KDC) produces an enabling key block (EKB) that can be decrypted only by devices having capability of playing back a specific content, on the basis of the capability management table. Thus, when a new category tree is registered, it is needed to acquire capability information of the new category tree to be registered. The method of notification of the capability in the new category tree registration process is described below with reference to FIG. 45.

Figure 45:
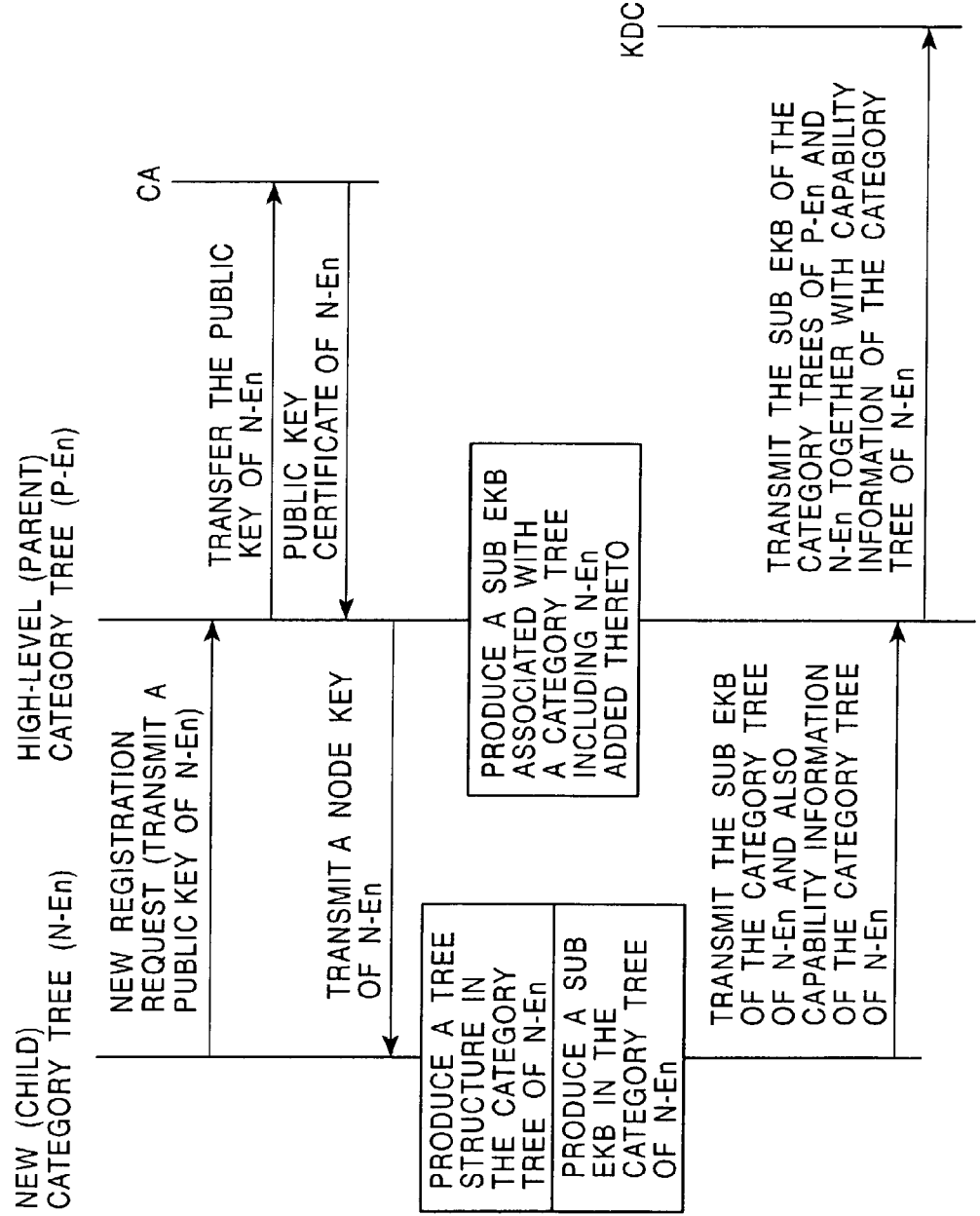
FIG. 45 is a diagram showing a capability notification process performed when a new category tree is registered, in the information processing system according to the present invention.

FIG. 45 shows a capability notification sequence performed when a new category tree is added to the key distribution tree structure.

A new (child) category tree (N-En) to be added to the tree structure issues a new registration request to an upper-level (parent) category tree (P-En). Each category tree has its own public key according to the public key cryptography scheme. When the new category tree issues the registration request, it transmits its public key to the upper-level category tree (P-En).

Upon receiving the registration request, the upper-level category tree (P-En) transfers the received public key of the new (child) category tree (N-En) to a certificate authority (CA) to receive a public key of the new (child) category tree having a signature of the CA. The above procedure is performed in mutual authentication between the upper-level category tree (P-En) and the new (child) category tree (N-En).

If the authentication of the category tree requesting for new registration is completed via the above process, the upper-level category tree (P-En) gives permission of the registration of the new (child) category tree (N-En) and transmits a node key assigned to the new (child) category tree to the new (child) category tree (N-En). This node key corresponds to one of endpoint nodes of the upper-level category tree (P-En), and also corresponds to the top node or a sub-root key of the new (child) category tree (N-En).

After the completion of the transmission of the node key, the new (child) category tree (N-En) builds a tree structure of the new (child) category tree (N-En) and sets the received sub-root key at the top node of the tree structure. Furthermore, keys are set at the respective nodes and leaves, and an enabling key block (sub-EKB) associated with the category tree is produced. On the other hand, the upper-level category tree (P-En) produces a sub-EKB associated with the upper-level category tree (P-En) such that an endpoint node, which was made active when the new (child) category tree was connected thereto, is reflected in the sub-EKB.

If the production of the sub-EKB including the node keys and leaf keys of new (child) category tree (N-En) is completed, the new (child) category tree (N-En) transmits the produced sub-EKB to the upper-level category tree (P-En). Furthermore, the new (child) category tree (N-En) transmits the capability information of devices managed by the category tree to the upper-level category tree.

Upon receiving the sub-EKB and the capability information from the new (child) category tree (N-En), the upper-level category tree (P-En) transfers the received sub-EKB and capability information together with a renewed sub-EKB of the upper-level category tree (P-En) to the key distribution center (KDC).

The key distribution center (KDC) registers the received sub-EKB and capability information of the category tree into the capability management table described above with reference to FIG. 43, thereby obtaining an updated capability management table. On the basis of the renewed capability management table, the key distribution center (KDC) can produce an EKB in various manners. For example, the EKB can be produced such that only a specified category tree or a specified device can decrypt the EKB.

Management of EKB Using EKB Type Definition List

When an EKB is produced such that it can be decrypted by one or more selected category trees and the resultant EKB is provided such that it can be used in common by devices belonging to the respective selected category trees, a method of using an EKB type definition list indicating which category tree can use or decrypt the EKB is described below.

In the present embodiment, if the key distribution center (KDC) receives an EKB issue request from an EKB requester, such as a content provider, who wants the key distribution center (KDC) to issue an EKB to be used by the EKB requester, an EKB type identification number indicating the EKB type described in an EKB type definition list included in the received EKB issue request, such that the resultant EKB can be processed (decrypted) by one or more category trees.

In the process of producing the EKB, in accordance with top node identifiers of the respective category trees set in correspondence with the EKB type identification number described in the EKB type definition list, the key distribution center (KDC) requests the top-level category entities (TLCE), which are category tree mangers, to produce their sub-EKB. If the sub-EKB's produced by the respective TLCE's are received, the key distribution center (KDC) combines the received sub-EKB's into an EKB that can be processed by the category trees.

In the present embodiment, the EKB requester such as the content provider (CP) can select specific category trees on the basis of the EKB type definition list. After the EKB requester such as the content provider (CP) selects specific category trees on the basis of the EKB type definition list, the EKB requester requests the key distribution center (KDC) to issue an EKB that can be processed by the selected specific category tree. In response to the EKB request, the key distribution center (KDC) requests the management entity of the selected category tree to issue a sub-EKB. The management entity of each selected category tree produces an EKB that can be processed only by devices of that management entity, other than revoked devices, and transmits the resultant EKB to the key distribution center (KDC). The key distribution center (KDC) combines the one or more sub-EKB's, thereby producing an EKB that can be processed only by the category trees selected by the EKB requester and provides the resultant EKB to the EKB requester. Upon receiving the EKB from the key distribution center (KDC), the EKB requester produces an encrypted key or encrypted content that can be decrypted only by using a key acquired by processing the EKB and distributes the resultant encrypted key or content.

First, various entities in the system are described briefly.

Key Distribution Center (KDC)

A key distribution center (KDC) issues enabling key blocks (EKB) and manages an EKB type definition list associated with the issued EKB's.

Top Level Category Entity (TLCE)

A top level category entity (TLCE) is an entity which manages a category tree, such as a format holder of a recording device, which manages a category tree. The TLCE manages the category tree, produces a sub-EKB that can be processed (decrypted) by devices within the category tree managed by the TLCE, and provides the resultant sub-EKB to the key distribution center (KDC).

EKB Requester

An EKB requester is, for example, an entity such as a content provider that provides, as electronic content distribution (ECD) service, various contents such as video data, audio data, or programs. Another example of an EKB requester is a format holder of a storage medium. The content provider provides encrypted content, an encrypted key, or an encrypted medium that can be decrypted using a key which can be acquired by processing an EKB which is issued by the key distribution center (KDC) in response to a request issued by the content provider.

For example, the content provider (CP) encrypts content using a root key described in the EKB produced by the key distribution center (KDC) and distributes the resultant encrypted content. The format holder of storage media distributes media after writing the EKB onto the storage media during the production thereof so that a content encrypted using a root key of the EKB can be stored thereon.

TLCE and Category-Based Tree Management

The category-based tree management has been already described above. Herein, the relationship between the top-level category entity (TLCE) and the category tree is described with reference to FIG. 46.

Figure 46:
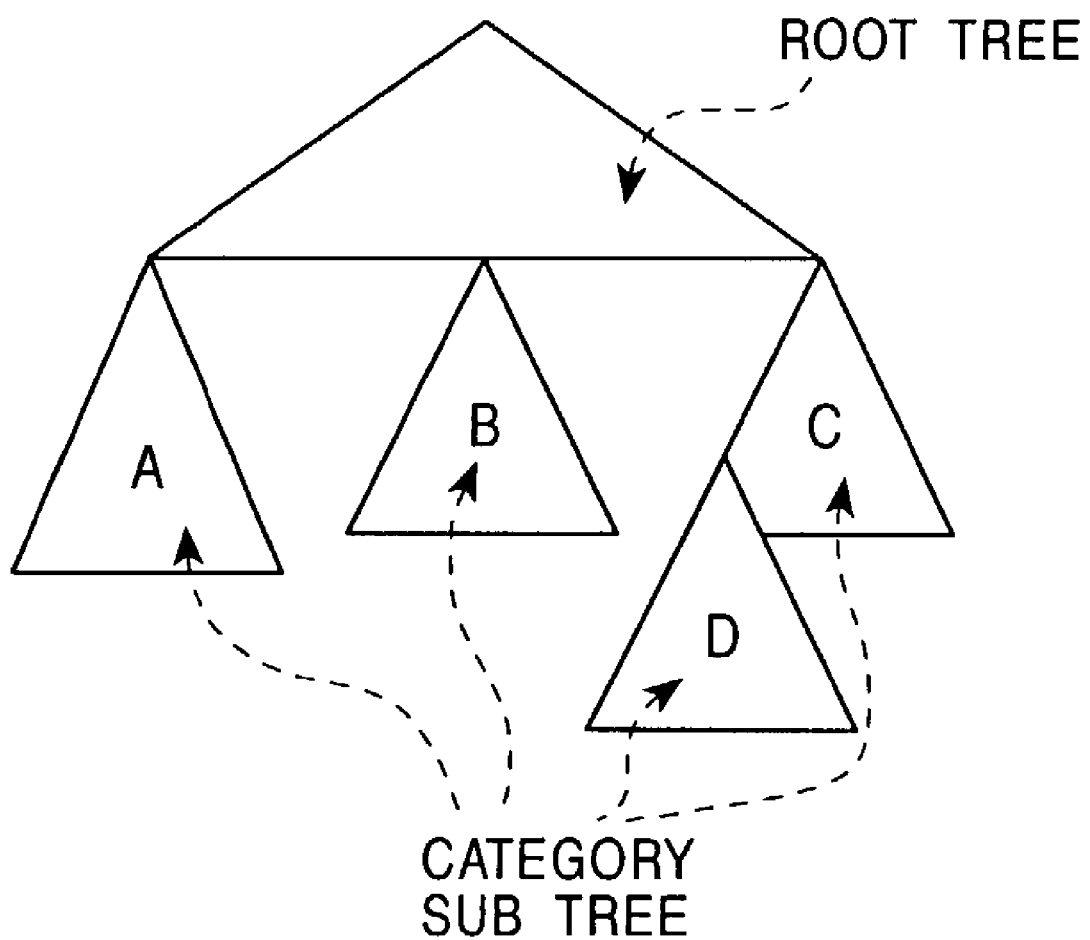
FIG. 46 is a diagram showing a category trees used in the information processing system according to the present invention.

As described above, each category is a set of devices having similar features. More specifically, an example of a category is a set of devices produced by the same manufacturer. Another example is a set of devices that can deal with a specific encoding format. In FIG. 46, A, B, C, and D denote category trees.

In FIG. 46, a root tree at the top has a tree structure having, for example, eight levels (eight node levels). Top nodes of respective category trees are disposed at the bottom of the root tree. The category trees may be related to each other such that a certain category tree is higher in level than another category tree. In the specific example shown in FIG. 46, category trees C and D are related to each other wherein the category tree C is a higher-level category tree related to the category tree D at the lower level.

Each category tree directly connected to the root tree at the top is referred to as a top-level category tree, and an entity that manages a top-level category tree is referred to as a top-level category entity (TLCE). In the specific example shown in FIG. 46, category trees A, B, and C are top-level categories, and entities that mange these top-level categories are top-level category entities (TLCE's). Each top-level category entity (TLCE) is basically responsible for managing all category trees including the top-level category tree itself and lower-level category trees related to the top-level category tree. In the specific example shown in FIG. 46, the TLCE that manages the category tree C also manages the category tree D. If there is another category tree at a further lower level related to the category tree D, the TLCE that manages the category tree C also manages the further lower-level category tree. However, another category entity (sub category entity) may be established, and the responsibility and the right of management of the lower-level category tree D may be delegated to that sub category entity.

Each device which uses content, such as a recording/reproducing apparatus, is assigned by the top-level category entity (TLCE) to a leaf of a certain tree, and the device holds some of keys assigned to nodes in a path from that leaf to the root. A set of node keys held by one device is referred to as a device node key (DNK) set. The number of keys held by each device (the number of keys included in a DNK set) is determined by the top-level category entity (TLCE).

Figure 47:
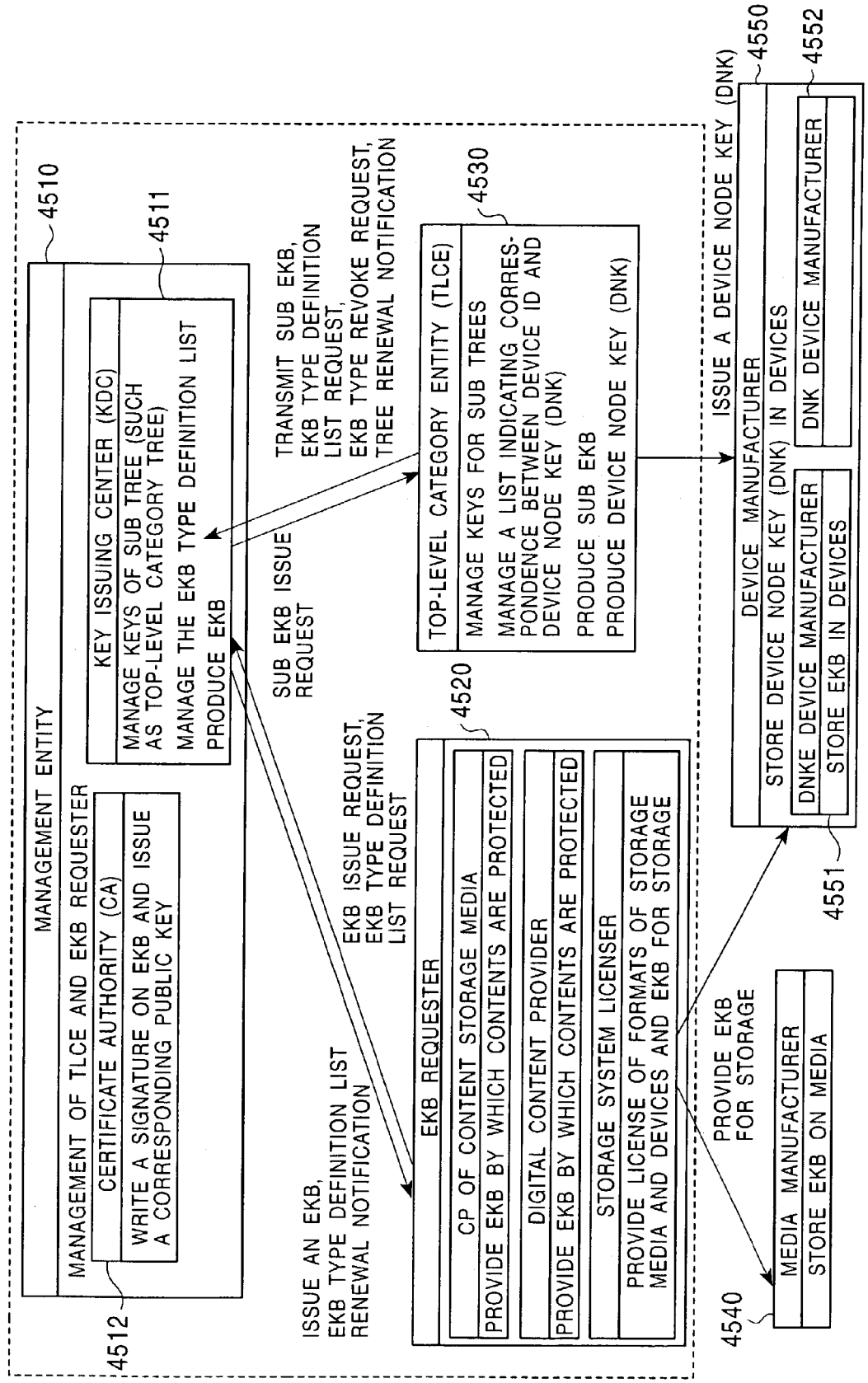
FIG. 47 is a diagram showing examples of processes performed among an EKB requester, a key distribution center, and a top-level category entity (TLCE), in the information processing system according to the present invention.

FIG. 47 shows the outline of processes performed among respective entities such as a key distribution center (KDC), a top-level category entity (TLCE), and an EKB requester.

A key distribution center (KDC) 4511 is included in a management entity 4510 of a tree-based EKB distribution system. The management entity 4510 further includes a certificate authority (CA) 4512 that writes a signature on each EKB.

The key distribution center (KDC) 4511 manages keys of subtrees such as top-level category trees. The key distribution center (KDC) 4511 also manages an EKB type definition list that will be described later and produces EKB's. The certificate authority (CA) 4512 writes a signature on each EKB produced by the key distribution center (KDC) and issues a public key corresponding to a secret key on which a signature is written, for use in verification of the signature.

An EKB requester 4520 requests the key distribution center (KDC) 4511 to issue an EKB. The EKB requester may be a content provider (CP) who provides a content-stored medium such as a CD or DVD on which a content is stored, a content provider (CP) who distributes a digital content, or a storage system licensor who provides a license of a format of a storage system such as a flash memory.

Each EKB requester 4520 provides an EKB corresponding to content, a medium, or a license format such that a key needed in use of the content, the medium, or the license format provided by EKB requester can be extracted by processing the EKB. Each EKB is produced by the key distribution center (KDC) 4511 in response to an EKB request sent to the key distribution center (KDC) 4511 from the EKB requester 4520.

If the EKB requester 4520 receives an EKB issued in response to the EKB request sent to the key distribution center (KDC) 4511, the EKB requester 4520 may provide the EKB to a media manufacturer 4540 and/or a device manufacturer 4550 and may provide a medium or a device, in which the EKB is stored, to a user. Each EKB is produced such that it can be processed by one or more category trees.

In the present system, the EKB's may be produced in various fashions and may be used in various manners. For example, an EKB may be produced such that it can be processed in common by a plurality of category trees (two or three category trees or a greater number of category trees), or may be produced such that it can be processed only by one category tree. An EKB type definition list is used to describe such various types of EKB's in the form of a list. The EKB type definition list is managed by the key distribution center (KDC). The EKB type definition list will be described in further detail later. The EKB requester 4520 can acquire the EKB type definition list by issuing a request for the EKB type definition list to the key distribution center (KDC) 4511. When data in the list is renewed, updated data is transmitted to the EKB requesters 4520 from the key distribution center (KDC) 4511.

As described above, the top-level category entities (TLCE's) 4530 are management entities of category trees directly connected to the root tree. Each top-level category entity (TLCE) 4530 manages keys of a subtree and a correspondence list representing the correspondence between the device ID and the device node key (DNK) set, which is a set of node keys stored in each device for use in processing the EKB. The top-level category entity (TLCE) 4530 also produces a device node key (DNK) set to be stored in a device of a type managed by the top-level category entity (TLCE) 4530 and provides it to a manufacturer 4550 that produces the device.

If the key distribution center (KDC) 4511 receives an EKB request from the EKB requester 4520, the key distribution center (KDC) 4511 produces an EKB in accordance with the EKB request. For example, in a case where the EKB request specifies that the EKB can be processed by two specific top-level category trees, the key distribution center (KDC) 4511 requests those two top-level category entities (TLCE's) 4530 to issue their sub-EKB's. Upon receiving the sub-EKB request, each top-level category entity (TLCE) 4530 produces a sub-EKB that can be used by an authorized device within the category tree to acquire the root key and transmits the resultant sub-EKB to the key distribution center (KDC) 4511. On the basis of the one or more sub-EKB's received from the TLCE's, the key distribution center (KDC) 4511 produces an EKB. The process of producing the EKB on the basis of the sub-EKB's will be described in detail later.

The top-level category entities (TLCE's) 4530, as with the EKB requesters 4520, can acquire the EKB type definition list by sending a request for it to the key distribution center (KDC) 4511.

Each top-level category entity (TLCE) 4530 can also request the key distribution center (KDC) 4511 to delete EKB type definition data associated with the top-level category entity (TLCE) 4530 from the EKB type definition list. For example, the delete request may specify that an EKB type defined as can be shared by another category tree should be deleted from the list. In a case where a tree managed by the a top-level category entity (TLCE) 4530 is renewed, the top-level category entity (TLCE) 4530 sends a renewal notification to the key distribution center (KDC) 4511. The detailed process thereof will be described later with reference to a flow chart.

The device manufactures 4550 can be classified into two types. Device manufactures of one type are DNKE device manufactures 4551 which produce devices in which both a device node key (DNK) set and an EKB are stored. Device manufactures of the other type are DNK device manufactures 4552 which produce devices in which only a device node key (DNK) set is stored.

Figure 48:
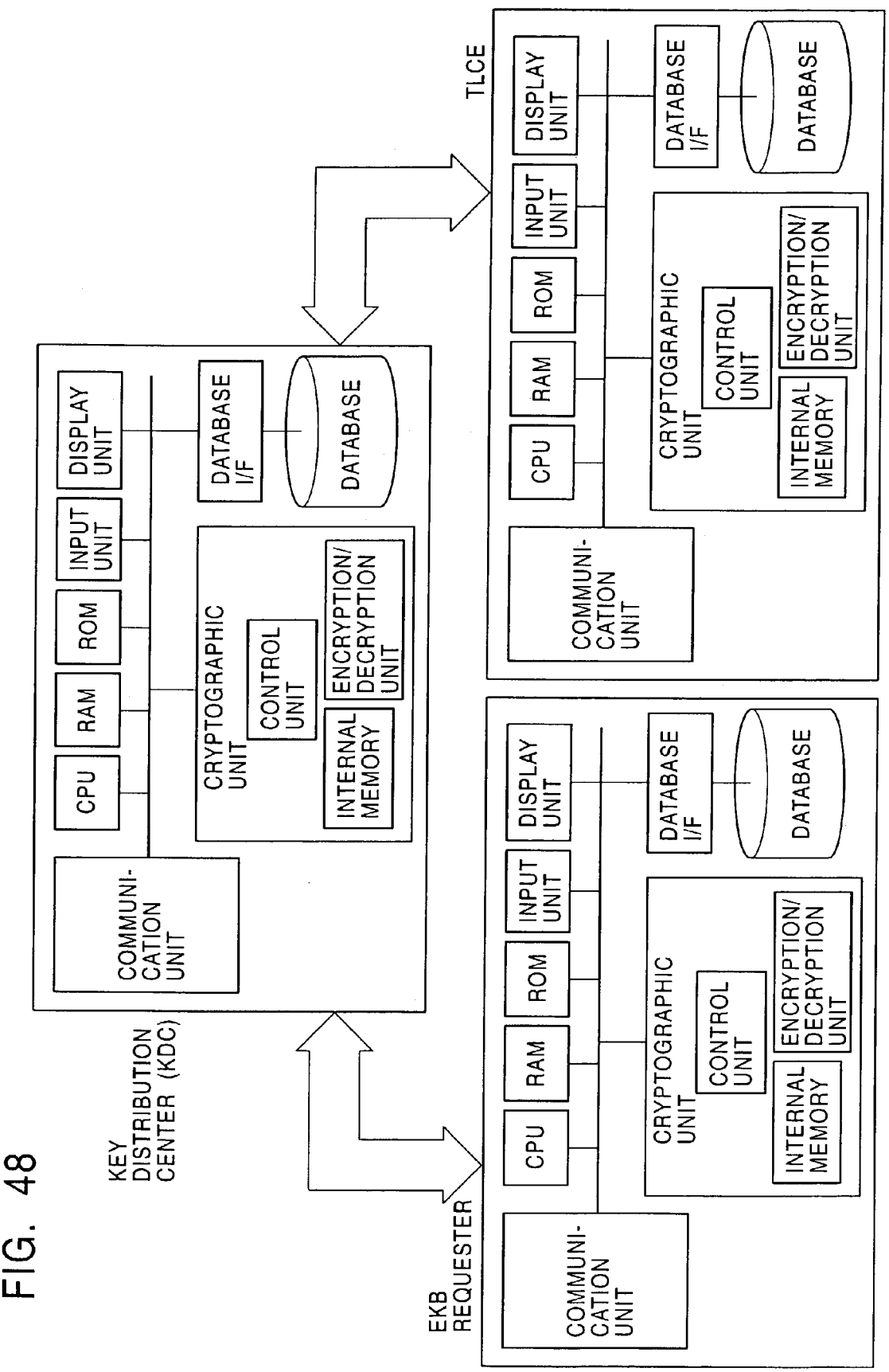
FIG. 48 is a diagram showing an example of hardware configurations of an EKB requester, a key distribution center, and a top-level category entity (TLCE), in the information processing system according to the present invention.

FIG. 48 illustrates, in the form of a block diagram, examples of configurations of the key distribution center (KDC), the EKB request, and the top-level category entity (TLCE) shown in FIG. 47. The key distribution center (KDC), the EKB requester, and the top-level category entity (TLCE) are information processing apparatuses having an encrypted-data communication capability, which are constructed so as to serve as an EKB distribute apparatus, an EKB requesting apparatus, and a category tree management apparatus.

The information processing apparatus of each entity includes a cryptographic unit responsible for general cryptographic process in mutual authentication with another entity and in data communication. The cryptographic unit includes a control unit for generally controlling the cryptographic process associated with authentication, encryption, and decryption. An internal memory of the cryptographic unit serves to store data such as key data and identification data needed in various processed such as mutual authentication, encryption, and decryption. The identification data is used, for example, in mutual authentication with another entity.

An encryption/decryption unit performs, in data transmission using key data stored in the internal memory, authentication, encryption, decryption, data verification, and random number generation.

As for the information processing apparatus serving as the EKB requester, it may also be configured such that a key is not generated by the EKB requester. In this case, components used to generate the key, such as a random number generator, are not necessary. More specifically, in a case where the information processing apparatus serving as the EKB requester generates a root key to be included in an EKB and requests the key distribution center to generate the EKB so as to include the root key, the information processing apparatus has to include means for generating the root key. However, in a case where the information processing apparatus serving as the EKB does not produce the root key to be included in the EKB, but requests the key distribution center (KDC) to produce the root key and further produce the EKB including the root key produced by the key distribution center (KDC), the information processing apparatus does not need to include components such as the random number generator used to produce the key.

Because information such as an encryption key is stored in the internal memory of the cryptographic unit, the internal memory should be constructed such that an unauthorized access to the memory is prevented. More specifically, the cryptographic unit is configured using an anti-tamper memory formed of a semiconductor chip or the like so as to be protected from an external access.

Each entity includes, in addition to the cryptographic unit described above, a CPU (Central Processing Unit), a RAM (Random Access Memory), a ROM (Read Only Memory), an input unit, a display unit, a database interface, and a database.

The CPU (Central Processing Unit), the RAM (Random Access Memory), and the ROM (Read Only Memory) form a control system of the entity. The RAM is used a main memory used by the CPU as a work area in various processes. The ROM is used to store a starting program executed by the CPU.

The database or storage means of each information processing apparatus stores data managed by the entity. For example, in the key distribution center (KDC), management data associated with issued EKB's and the EKB type definition list are stored in its database. In the case of the top-level category entity (TLCE), management data associated with devices belonging to the category tree, such as data indicating correspondence between the devices managed by the TLCE and the device node key (DNK) sets, is stored in the database. In the EKB requester, the database stores management data indicating the correspondence between contents provided by the EKB requester and the EKB's used for the contents and management data indicating the devices to which the contents are provided. It is desirable that the EKB type definition list be stored in an accessible manner also in the information processing apparatuses serving as the EKB requester and the top-level category entity (TLCE). Alternatively, the EKB type definition list may be stored at a Web site that is managed by the key distribution center (KDC) and that can be accessed by the EKB requester and the top-level category entity (TLCE).

Figure 49:
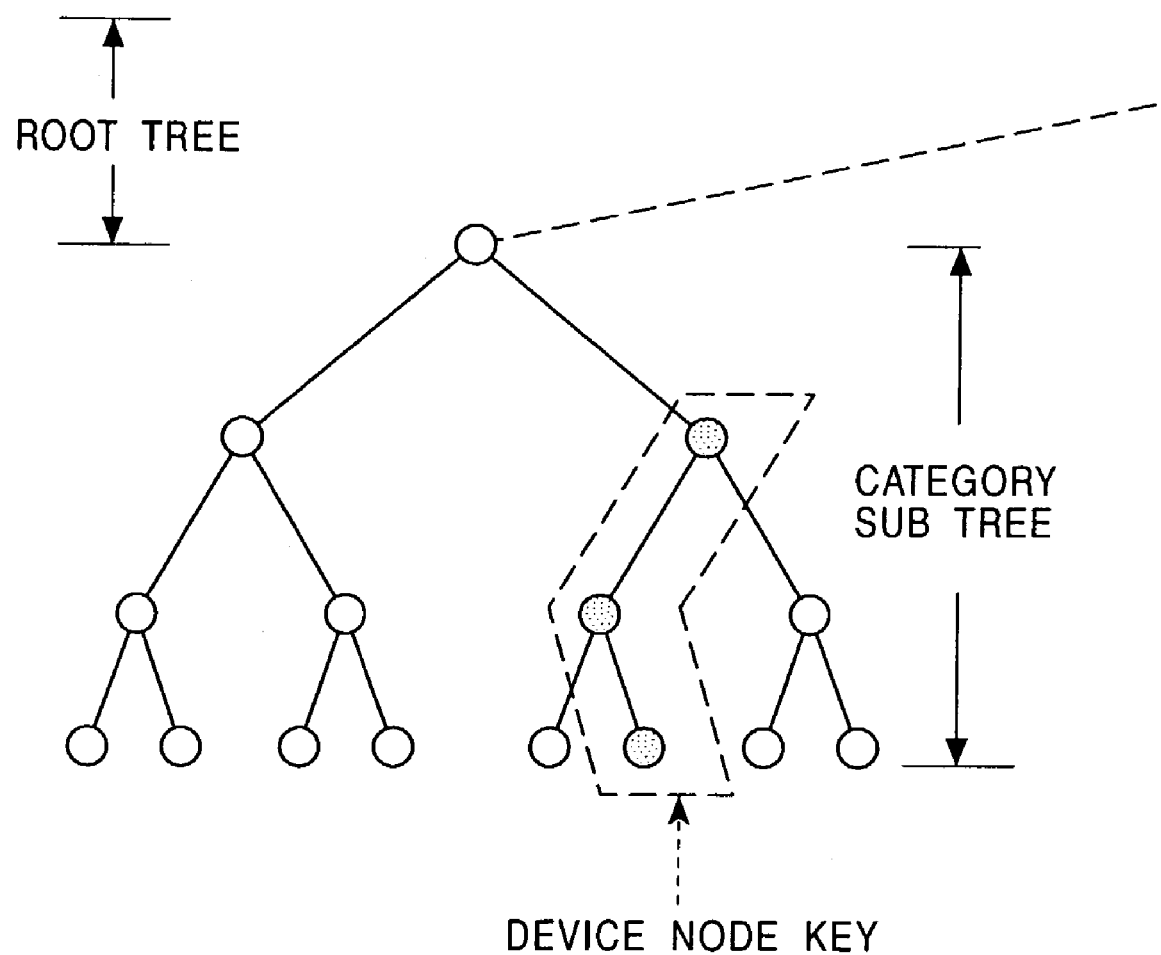
FIG. 49 is a diagram showing device node key (DNK) set held by a device in the information processing system according to the present invention.

As described earlier, devices use a device node key (DNK) set when processing (decrypting) an EKB. An example of a device node key (DNK) set stored in a device is described below with reference to FIG. 49. In FIG. 49, a tree nodes a category tree, in which leaves related to devices are disposed at the bottom. For example, the tree may be a tree managed by a top-level category entity (TLCE). The category tree is connected to a root tree (having an eight-level structure, for example) located at a higher level. Each device holds node keys assigned to nodes in a path from the device to a higher level, as shown in FIG. 49. These keys are held as a device-node key (DNK) set in the device so that an EKB can be decrypted using the device node key (DNK) set.

Basically, each device is assigned to one leaf such that there is no overlap. However, in an exceptional case in which software programs such as PC programs are related to leaves, a version of a software package may be assigned to all leaves. The assignment of devices is determined by the TLCE. That is, the TLCE determines which device is assigned to which leaf, and which node keys are assigned to which device.

The top-level category entity (TLCE) may be a device supplier (manufacturer). In this case, the top-level category entity (TCLE) may supply (sell) a device after storing a device node key (DNK) set therein. That is, it is possible to supply (sell) a device such as a recording/reproducing apparatus including a memory in which node keys of a specific category tree have been stored as a device node key (DNK) set.

EKB Type Definition List

Distribution of an EKB on a category basis has already been described. In a case where an EKB for common use by a plurality of categories is issued, that is, in a case where the issued EKB can be processed by devices belonging to different category trees, there is a possibility that some problems occur.

For example, let us assume herein that two different companies A and B have a license of a format of a rewritable medium (storage medium) such as a portable flash memory; a manufacturer having a license of a medium (portable flash memory) is an entity of a top level category; and category trees managed by companies A and B, respectively, exist at a level below the top-level category. Let us further assume that, in order that devices of companies A and B be compatible with each other and can use various contents in common, an EKB that can be processed (decrypted) by devices belonging to any one of the category trees of companies A and B is produced and distributed by the key distribution center (KDC).

In such a situation, if secrecy of a device node key (DNK) set of one device belonging to a category tree managed by the company A is broken, there is a possibility that all already-distributed contents, which can be used by devices of both companies A and B by using that device node key (DNK) set, may be used in an unauthorized manner. To prevent such unauthorized use, it is needed to renew the EKB for evocation. However, in this case, because the EKB has been produced such that it can be used in common by the two category trees associated with companies A and B, revocation should be performed not only for the category tree associated with company A but for both categories associated with companies A and B.

As described above, in the case where an EKB is distributed such that it can be used in common by a plurality of category trees, renewal of the EKB and revocation should be performed not only for one category tree but for all category trees that use in common the EKB. As a result, company B is influenced by a category tree other than the category tree managed by company B. This results in an increase in complexity of management process.

Herein, a technique of solving the above problem is disclosed below. That is, the right of giving permission of issuing an EKB usable in common by a plurality of categories is granted to the respective category entities that manage the categories. Issuing of an EKB for common use is permitted by an entity only when the entity can accept a risk of a problem which may occur in devices of a category of an entity as a result of occurrence of a problem in a device belonging to another category. However, in a case where the entity cannot accept the risk, the entity does not permit issue or use of a common EKB.

In this method, various kinds of EKB's are produced and used. For example, an EKB may be such an EKB that can be processed by two or three category trees, or a greater number of category trees, but another EKB may be such an EKB that can be processed only by a single category tree. An EKB type definition list is used to describe such various types of EKB's in the form of a list. FIG. 50 shows an example of an EKB type definition list. The EKB type definition list is stored and managed by the key distribution center (KDC). The EKB type definition list is provided to, or can be accessed by, EKB requesters or TLCE's, as required.

As shown in FIG. 50, the EKB type definition list includes fields of "EKB type identification number", "node", and "description". The "EKB type identification number" is a number identifying a specific one of various EKB's listed in the EKB type definition list. If the identification number is different, then the category tree or the combination of category trees that allowed to process the EKB become different.

The "node" field is used to describe the top-node ID of category trees to which a specific EKB can be applied. For example, for an EKB of an EKB type identification number of 1, the top-node ID of a category tree associated with an MS (memory media sold under the trademark MEMORY STICK) is assigned. On the other hand, for an EKB of an EKB type identification number of 3, the top-node ID of the category tree associated with the MS (MEMORY STICK) and the top-node ID of a category associated with a PHS are assigned.

The field of "description" is used to store descriptions of various types EKB's listed in the EKB type definition list. For example, the data in the "description" field for the EKB of the EKB type identification number of 1 indicates that this EKB is for the MS (MEMORY STICK), and the data in the "description" field for the EKB of the EKB type identification number of 3 indicates that this EKB can be used in common by category trees of the MS (MEMORY STICK) and the PHS.

The EKB type definition list shown in FIG. 50 is managed by the key distribution center (KDC). An entity such as a content provider, which is going to distribute encrypted data such as an encrypted key or an encrypted content encrypted using a key that can be extracted by processing the EKB, selects, from the EKB type definition list shown in FIG. 50, an EKB type that can be processed by a category including devices to which the content is going to be supplied. The content provider then requests the key distribution center (KDC) to produce an EKB specified by the corresponding EKB type identification number.

When various types of EKB's are registered in the EKB type definition list, registration should be performed with the approval of the top-level category entities (TLCE's) of the category trees to be registered. When, for example, TLCE-A of the category tree refused issue of an EKB shared by another category, an EKB type that is shared by the category tree A and said another category is not registered in the EKB type definition list.

In a case where all TLCE-A of the category tree A, TLCE-B of the category tree B, and TLCE-C of the category tree C, have approved issue of an EKB for common use, an EKB type that can be processed in common by those three category trees is registered in the EKB type definition list.

Thereafter, a content provider can specify the EKB type identification number assigned to that EKB type and can request the key distribution center (KDC) to issue a corresponding EKB.

That is, in order to register a new EKB type and a corresponding EKB type identification number in the EKB type definition list, the following process is required.

(1) All TLCE's, which manage categories relating to an EKB type having an EKB type identification number to be registered, send an EKB type registration request to the key distribution center (KDC).

(2) The key distribution center (KDC) confirms that the EKB type registration requests have been received from all top-level category entities (TLCE's) of category trees which will be capable of processing an EKB of the EKB type requested to be registered. After the confirmation, the key distribution center (KDC) defines a new EKB type identification number for the EKB type and adds it to the EKB type definition list.

(3) The key distribution center (KDC) sends an EKB type definition list renewal notification to all TLCE's and EKB requesters to notify that the EKB type definition list has been renewed.

The EKB type definition list is opened for use by all TLCE's and EKB requesters by sending it to all TLCE's and EKB requesters or by putting it at a Web site. Thus, TLCE's and EKB requesters can acquire EKB type information described in the newest EKB type definition list.

EKB Type Registration

Figure 51:
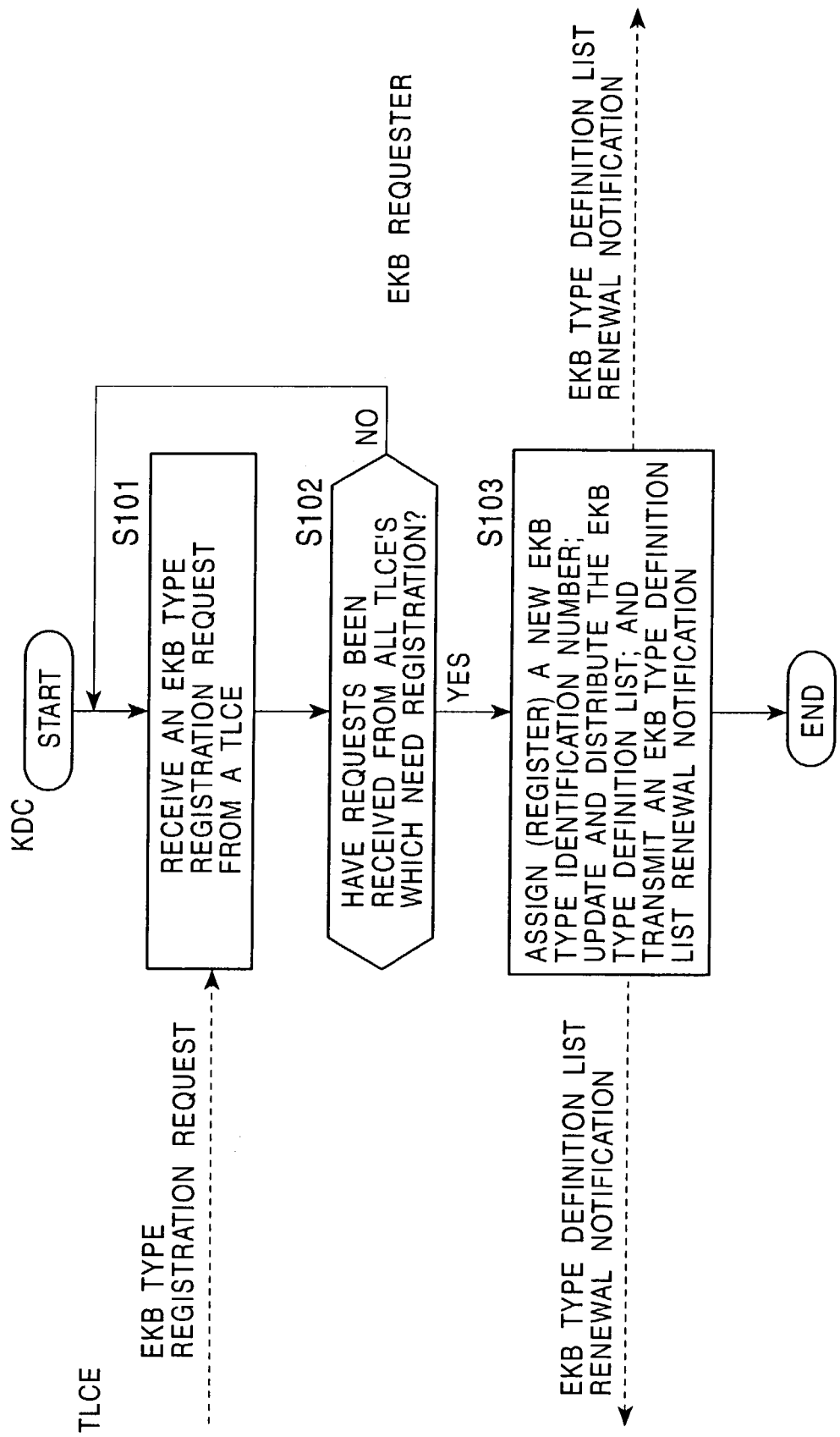
FIG. 51 is a flow chart of an EKB type registration process performed in the information processing system according to the present invention.

A process performed by the key distribution center (KDC) before registering a new EKB type in the EKB type definition list is described below with reference to FIG. 51. First, the key distribution center (KDC) receives an EKB type registration request from an TLCE that wants to register a new EKB type (S101). The EKB type registration request from the TLCE includes a description of the number of categories that should be able to use in common the EKB to be registered. The key distribution center (KDC) determines whether as many similar EKB type registration requests as the number of categories described in the request have been received from TLCE's (S102). If and only if as many EKB type registration requests as the number of categories described in the request have been received from TLCE's, the key distribution center (KDC) registers the new EKB type in the EKB type definition list in accordance with the request. The key distribution center (KDC) performs a list renewal process and issues a list renewal notification (S103). The renewal notification is sent to all TLCE's and EKB requesters.

As described above, the key distribution center (KDC) performs registration of a new EKB type identifier into the EKB type definition list only when approval of the registration has been obtained from all category entities which manage the category trees specified as category trees which should be able to process the EKB type to be registered.

In the above process, mutual authentication and encryption of transmission data are performed, as required, in communication between the key distribution center (KDC) and TLCE's or EKB requesters. Furthermore, encryption of other messages, writing of signature, and data verification may also be performed. In a case where authentication or cryptographic communication is performed using the public key cryptographic technology, it is required that entities already have their public keys.

Revocation of an EKB Type

When it is needed to revoke all devices belonging to a certain category, the top-level category entity (TLCE) issues a request for revocation of EKB types associated with the category to the key distribution center (KDC). Furthermore, when a certain service is going to be terminated or when there is some reason, the top-level category entity (TLCE) may issue a request for revocation of an EKB type from the present registration to the KDC.

Figure 52:
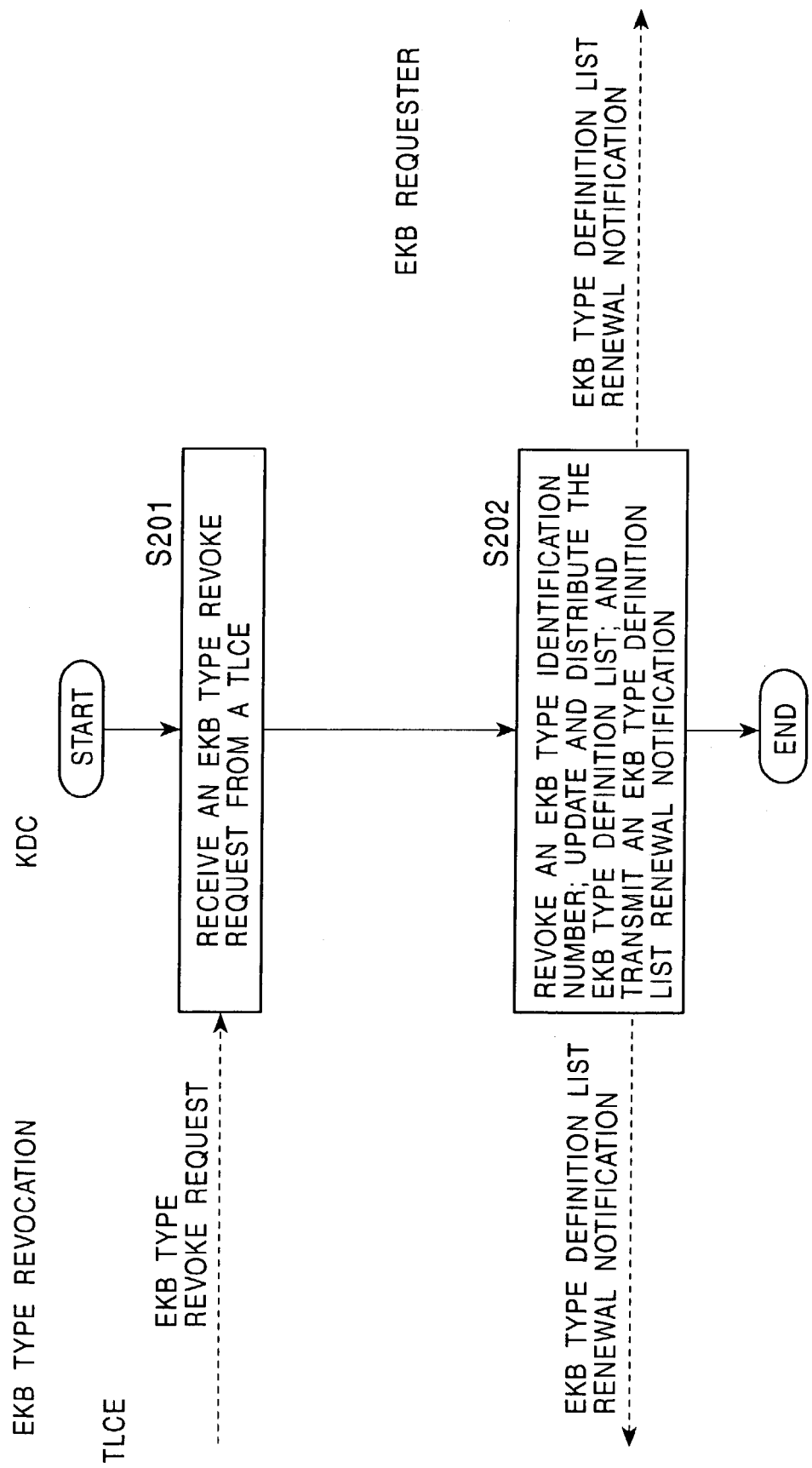
FIG. 52 is a flow chart of an EKB type revocation process performed in the information processing system according to the present invention.

The process of revocation of an EKB type is described below with reference to a flow chart shown in FIG. 52. First, the key distribution center (KDC) receives an EKB type revocation request from an TLCE that wants to revoke an EKB type (S201). If the key distribution center (KDC) receives the EKB type revocation request from the TLCE, the key distribution center (KDC) confirms that the issuer of the request is the TLCE that manages the category associated with the EKB type requested to be revoked. After confirmation, the key distribution center (KDC) revokes, from the EKB type definition list, the EKB type identification number corresponding to the EKB type specified by the EKB type revocation request, and performs renewal of the EKB type definition list. Thereafter, the key distribution center (KDC) issues a list renewal notification (S202). The renewal notification is sent to all TLCE's and EKB requesters.

As described earlier, the key distribution center (KDC) performs revocation of an EKB type identifier registered in the EKB type definition list, if and only if a revocation request is received from at least one of category entities managing one or more category trees selected as category trees that can be processed on the basis of an EKB type requested to be revoked. In this case, approval or the other category entities is not needed.

In the above process, mutual authentication and encryption of transmission data are performed, as required, in communication between the key distribution center (KDC) and TLCE's or EKB requesters. Furthermore, encryption of other messages, writing of signature, and data verification may also be performed. In a case where authentication or cryptographic communication is performed using the public key cryptographic technology, it is required that entities already have their public keys.

EKB Type Definition List Renewal Notification

For example, in a case where, in a certain category tree, the TLCE managing that category tree has performed some process resulting in a change in the state of the tree, such as revocation of a device or a change in a device node key (DNK) set stored in a certain device into another device node key (DNK) set, the TLCE has to notify the EKB requesters or TLCE's using EKBs associated with that device of the fact that the process has been performed.

When revocation of a device has been performed, if a notification of the revocation is not sent, a content provider (CP) may use an old EKB in transmission of an encrypted content. The old EKB can be processed (decrypted) even by the revoked device, and thus there is a possibility that unauthorized use of the content is continued. In a case where a device node key (DNK) set has been renewed, the old DNK replaced with the new one is usually discarded and a device has the new DNK. However, if a content provider does not use an EKB in which the new DNK is reflected, a device having the new DNK cannot process (decrypt) the EKB and thus cannot access the content.

To avoid such a problem, a TLCE has to send a tree change notification to the key distribution center (KDC) when one of changes described below occurs:

A change in a tag part of a EKB performed in response to revocation of a device

A change in a value of a DNK set stored in at least one device, performed in response to renewal of a device node key (DNK) set.

The tree change notification includes information indicating an EKB type identification number to be changed in the EKB type definition list, information indicating a category associated with that EKB type identification number, and information indicating what has occurred, for example, indicating that revocation or DNK renewal has been performed.

Figure 53:
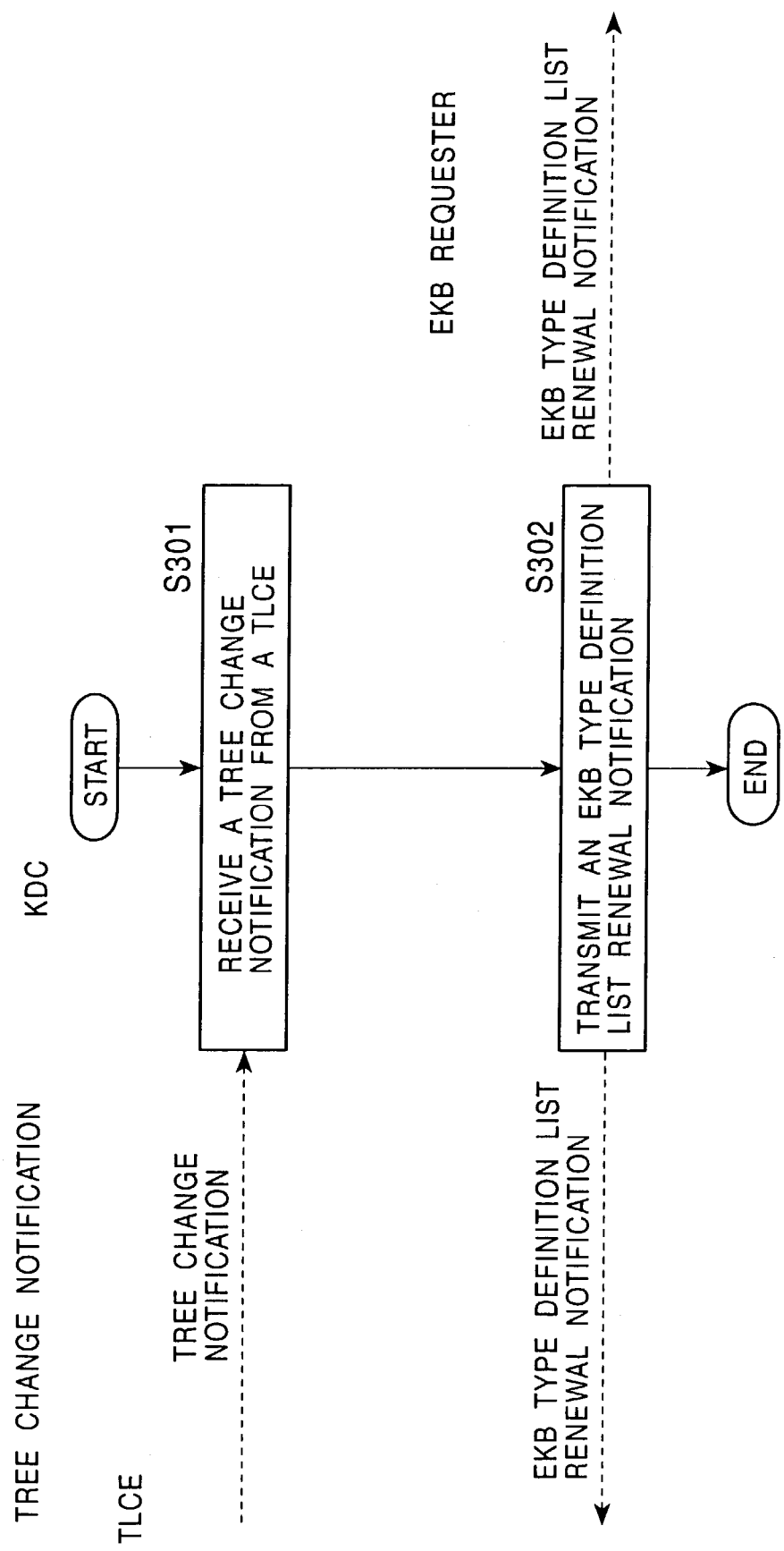
FIG. 53 is a flow chart of a tree change notification process, performed in the information processing system according to the present invention.

The process of EKB type definition list renewal notification is described below with reference to a flow chart shown in FIG. 53. First, the key distribution center (KDC) receives a tree change notification from a TLCE (S301). Upon receiving the tree change notification from the TLCE, the key distribution center (KDC) extracts an EKB type identification number associated with the category from the EKB type definition list, and sends an EKB type definition list renewal notification to all TLCE's and EKB requesters to notify what kind of change (revocation or DNK replacement) has occurred and which EKB type identification number is influenced by the change. In the above process, mutual authentication and encryption of transmission data are performed, as required, in communication between the key distribution center (KDC) and TLCE's or EKB requesters. Furthermore, encryption of other messages, writing of signature, and data verification may also be performed. In a case where authentication or cryptographic communication is performed using the public key cryptographic technology, it is required that entities already have their public keys.

EKB Type Definition List Request

In order to obtain a newest version of EKB type definition list, a top-level category entity (TLCE), a sub-category entity (SCE) other than the TLCE, or an EKB requester such as a content provider may send a request for the EKB type definition list to the key distribution center (KDC). In response to the request, the key distribution center (KDC) returns the newest version of EKB type definition list to the requester.

Figure 54:
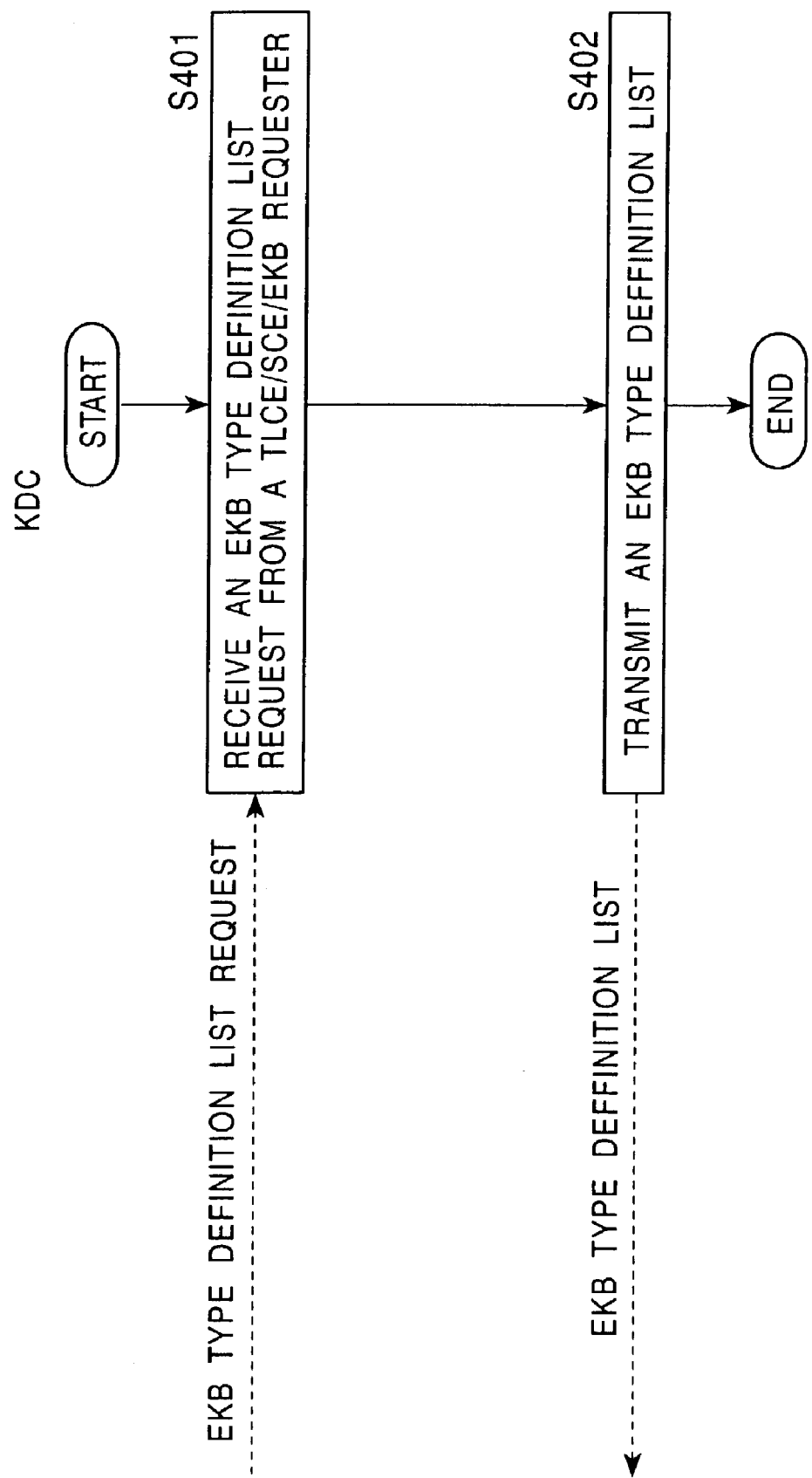
FIG. 54 is a flow chart of an EKB type list requesting process performed in the information processing system according to the present invention.

The EKB type definition list request process is described below with reference to a flow chart shown in FIG. 54. First, the key distribution center (KDC) receives an EKB type definition list from a TLCE, a sub-category entity, or an EKB requester (S401). Upon receiving the EKB type definition list, the key distribution center (KDC) extracts the newest version of EKB type definition list and transmits it to the entity which has issued the request. In the above process, mutual authentication and encryption of transmission data are performed, as required, in communication between the key distribution center (KDC) and TLCE's, sub-category entities, or EKB requesters. Furthermore, encryption of other messages, writing of signature, and data verification may also be performed. In a case where authentication or cryptographic communication is performed using the public key cryptographic technology, it is required that entities already have their public keys.

Issuing an EKB

An EKB is issued in response to an EKB request received from an EKB requester. Specific examples of EKB requesters are listed below.:

[a] Content provider (CP) that provides a content-stored medium such as a CD or DVD,

[b] Content provider that provides electronic content distribution (ECD) service,

[c] Holder of a storage system format

The EKE requester is an entity that provides a service, a medium, or a device in which content or a format can be used by acquiring a key by decrypting an EKB.

The storage system format holders described in [c] can be classified into two types as described below:

[c1] Format holder that provides an acquired EKB to a manufacturer of a storage medium according to a format in which the EKB is stored into the storage medium when it is produced.

[c2] Format holder that provides an acquired EKB to a manufacturer of a recording device according to a format in which the EKB is stored into the recording device when it is produced.

The EKB issue process is described below.

(1) Production of a Content Key

First, an EKB requester such as a content provider produces a content key to be used in conjunction with a content, a device, or a medium the EKB requester provides.

For example, in the case where the EKB requester is:

[a] a content provider (CP) that provides a content-stored medium such as a CD or DVD, or

[b] a content provider that provides electronic content distribution (ECD) service, the produced content key is used to protect the content stored on the medium or protect the content during the electronic content distribution (ECD) service.

On the other hand, when the EKB requester is:

[c1] a format holder that provides an acquired EKB to a manufacturer of a storage medium according to a format in which the EKB is stored into the storage medium when it is produced, the content key is used to protect the content stored on the medium.

In the case where the EKB requester is:

[c2] a format holder that provides an acquired EKB to a manufacturer of a recording device according to a format in which the EKB is stored into the recording device when it is produced, the content key is used to protect the content stored using the recording device.

The mechanism, such as an cryptographic algorithm, of protecting the content using the content key may be determined arbitrarily for each format.

(2) Production of a Root Key

The EKB requester produces a root key that can be extracted by decrypting the EKB. Alternatively, the root key may be acquired from the key distribution center (KDC) instead of producing it. The root key is used to protect (encrypt) the content key. The mechanism, such as an cryptographic algorithm, of protecting the content key using the root key may be determined arbitrarily for each format.

(3) Request for Issue of an EKB

The EKB requester sends an EKB issue request to the key distribution center (KDC).

The EKB issue request includes information indicating the root key and information specifying one of EKB type identification numbers registered in the EKB type definition list, to indicate a category including the device to which the root key is to be transmitted using the EKB. On the basis of the EKB type definition list stored in the storage medium of the EKB requester, or on the basis of the EKB type definition list acquired from a site on a network, the EKB requester selects an EKB type associated with a category including the device to which service such as providing content is to be provided. The EKB requester then sends to the key distribution center (KDC) an EKB issue request including information specifying the EKB type identification number indicating the selected EKB type.

(4) Issue of EKB

In accordance with the EKB issue request received from the EKB requester, the key distribution center (KDC) produces an EKB such that the EKB includes the root key if the root key is not included in the EKB issue request. However, if the EKB issue request does not include the root key and if the EKB issue request includes a request for production of the root key, the key distribution center (KDC) produces the root key and further produces an EKB including the produced root key. The resultant EKB is transmitted to the EKB requester.

The EKB produced by the key distribution center (KDC) can be of a type that can be processed only by a single category tree or of a type that can be processed by a plurality of category trees. On the basis of the EKB type identification number specified in the EKB issue request, the key distribute center (KDC) extracts a category associated with the EKB type identification number, that is, extracts the node described in the node field, corresponding to the EKB type identification number, of the EKB type definition list. In the node field, the top node ID of the category is described. The entity managing that category can be known from this node ID. On the basis of the node ID, the key distribution center (KDC) sends a sub-EKB issue request to the top-level category entity (TLCE) that manages the category. The sub-EKB issue request includes information indicating the root key and information indicating the category.

If the TLCE receives the sub-EKB issue request from the key distribution center (KDC), the TLCE produces a sub-EKB such that devices (non-revoked devices) within specified one or more categories can finally extract the root key from the sub-EKB, and the TLCE transmits the resultant sub-EKB to the key distribution center (KDC).

The sub-EKB produced by the top-level category entity (TLCE) has a data structure similar to that of a usual EKB (FIG. 6) except that the version number and other information for verification (version check value) are not included. The algorithm of encrypting a higher-level node key or a root key using a leaf key or a lower-level node key described in the sub-EKB, the key length, and the mode may be arbitrarily determined for each TLCE (format holder) that produces the sub-EKB. This makes it possible to employ a particular security scheme differently from the other formats. A default encryption algorithm may be determined. For example, the triple-DES according to FIPS46-2 (Federal Information Processing Standards Publication 46-2) may be employed as the default encryption algorithm such that the triple-DES algorithm is employed if the TLCE's do not object to it. In the case where each TLCE arbitrarily determines the encryption algorithm or the key length, when sub-EKB's produced by different TLCE's are combined together into a single EKB, each (encrypted) key is rewritten into data with a predetermined length, such as 16 bytes, so that the resultant combined EKB can be used by any device managed by any TLCE. By properly determining the data format of the combined EKB used in common in a plurality of category trees, it becomes possible for any device in any category tree to correctly determine the location of the key data to be used. For example, if each block of key data in the EKB is represented in 16 bytes, the device can sequentially extract the correct key data that can be processed by the device, and can finally acquire the root key.

That is, in accordance with the data format of the combined EKB produced from a plurality of sub-EKB's, a plurality of key data are stored in fixed-length data fields. Therefore, when sub enabling key blocks (sub-EKB's) having different key data lengths according to different algorithms are combined into a single EKB, even if a plurality of encrypted key data of sub-EKB's are rearranged in accordance with the locations of the nodes or leaves in the key tree, it is possible to correctly extract necessary key data in accordance with the tags described in the EKB. Such a combined EKB may be distributed to users (devices) by means of transmission via a network or by providing a storage medium on which the EKB is stored.

The key distribution center (KDC) assembles or combines the sub-EKB's received from TLCE's as required, and adds a version number and verification information. The resultant completed EKB is transmitted to the EKB requester. A digital signature using the public key cryptography may be written by a certificate authority (CA) other than the key distribution center (KDC).

Figure 55:
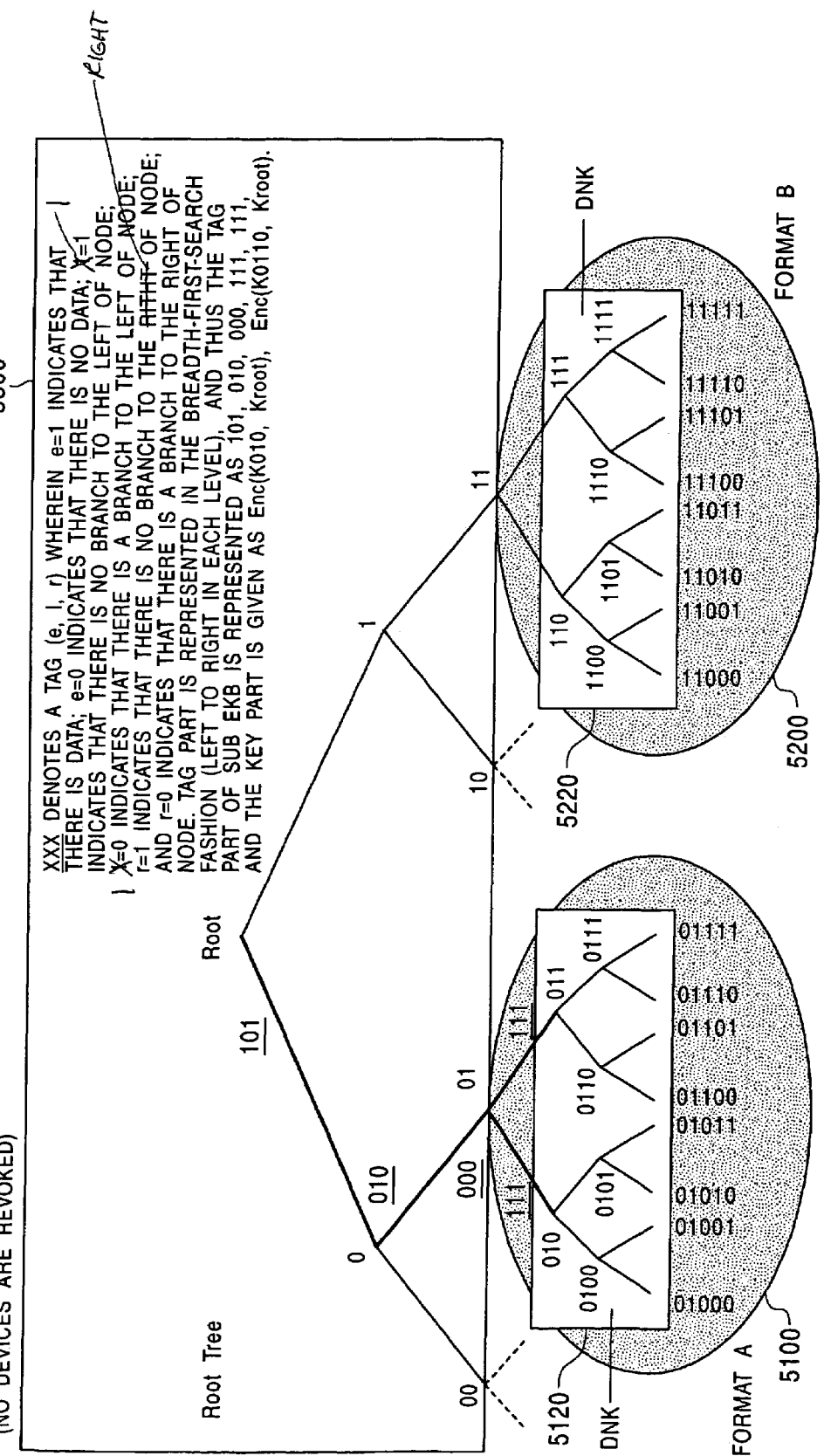
FIG. 55 is a diagram showing an sub-EKB production process performed in the information processing system according to the present invention.

The process of producing sub-EKB's and combining them into a single EKB is described with reference to FIG. 55. FIG. 55 shows a sub-EKB-(A), which is produced by a TLCE of a category tree A (5100) in the process of producing a combined EKB that can be used in common by both category trees A (5100) and B (5200). The sub-EKB-(A) is produced such that each device in the category tree A (5100) can extract the root key. Although in the previous examples, the root tree 5300 has an 8-level tree structure, a 2-level tree structure is assumed in the present example for the purpose of simplicity.

In FIG. 55, each underlined 3-digit number [XXX] in the tree structure denotes a tag (e, l, r) in the EKB. As described earlier (FIGS. 26 and 27), e=1 denotes that there is data, and e=0 denotes that there is no data. l=1 denotes that there is no branch extending to left, and l=0 denotes that there is a branch extending to left. r=1 denotes that there is no branch extending to right, and r=0 denotes that there is a branch extending to right.

In order to produce the sub-EKB-(A) such that all devices (leaves) in the category tree A (5100) shown in FIG. 55 can extract the root key, the sub-EKB-(A) should include data produced by encrypting the root key using a node key held in common by all leaves. Each device has node keys in its path in the device node key (DNK) region 5120 of the category tree A (5100) shown in FIG. 55. Therefore, if the root key is encrypted using a node key at the top in the DNK region 5120, then the resultant EKB satisfies the above requirement.

Thus, the TLCE of the category tree A (5100) produces the sub-EKB-(A) such that its tag part consists of 101, 010, 000, 111, and 111, and its key part consists of Enc(K010, Kroot) and Enc(K011, Kroot). The TLCE of the category tree A (5100) transmits the resultant sub-EKB-(A) to the key distribution center (KDC).

A sub-EKB-(B) produced by the category tree B (5200) is described below with reference to FIG. 56. In order to produce the sub-EKB-(B) such that all devices (leaves) in the category tree B (5200) can extract the root key, the sub-EKB-(B) should include data produced by encrypting the root key using a node key held in common by all leaves. Each device has node keys in its path in the device node key (DNK) region 5220 of the category tree B (5200) shown in FIG. 56. Therefore, if the root key is encrypted using a node key at the top in the DNK region 5220, then the resultant EKB satisfies the above requirement.

Thus, the TLCE of the category tree B (5200) produces the sub-EKB-(B) such that its tag part consists of 110, 010, 000, 111, and 111, and its key part consists of Enc(K110, Kroot) and Enc(K111, Kroot). The TLCE of the category tree B (5200) transmits the resultant sub-EKB-(B) to the key distribution center (KDC).

Figure 57:
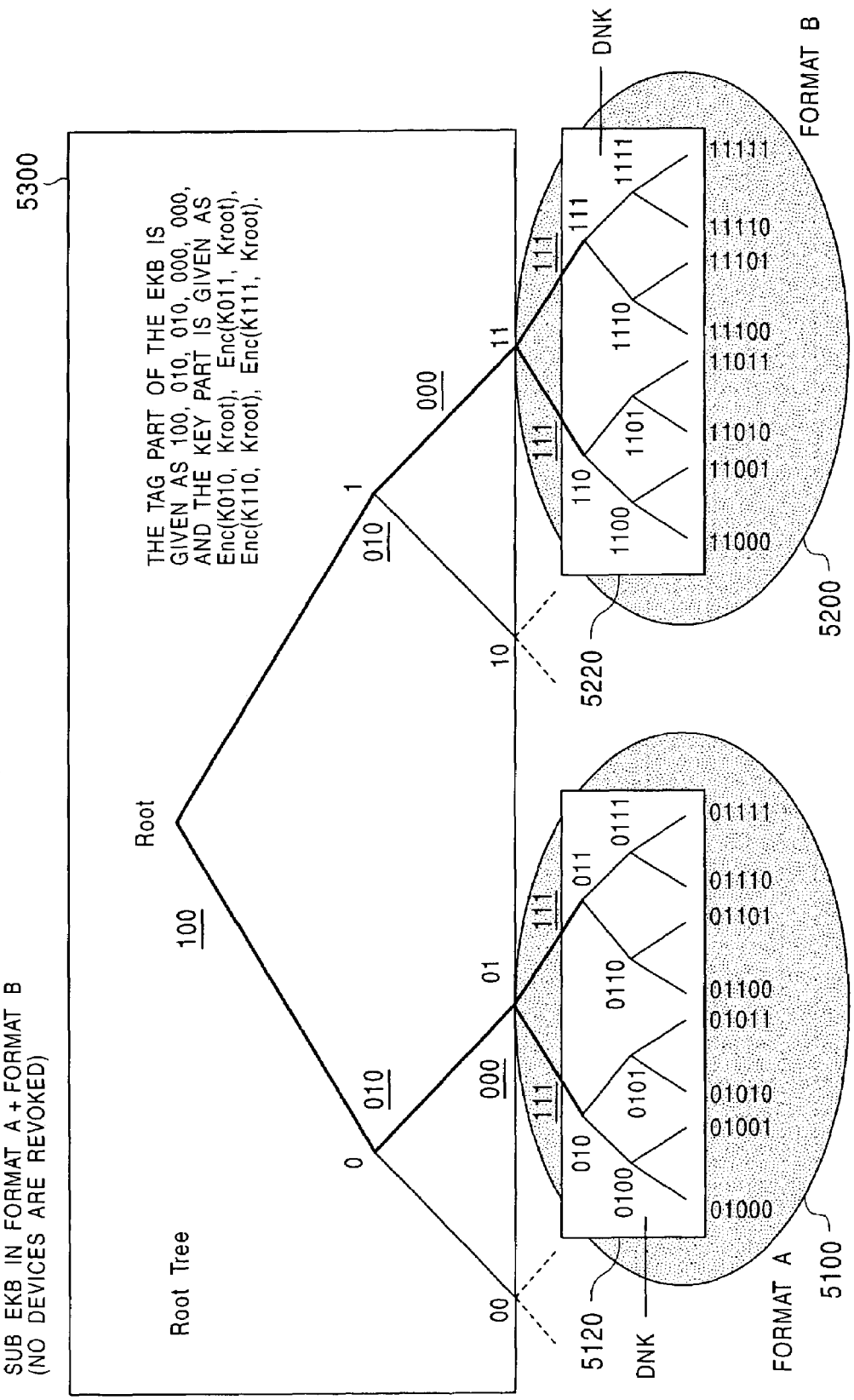
FIG. 57 is a diagram showing a process of producing an EKB by combining sub-EKB's in the information processing system according to the present invention.

The key distribution center (KDC) produces a combined EKB from the sub-EKB-(A) and the sub-EKB-(B) produced by the respective TLCE's. The process of producing the combined EKB is described below with reference to FIG. 57. The combined EKB is produced such that all devices belonging to the category tree A (5100) and all devices belonging to the category tree B (5200) can extract the root key from the EKB. Basically, the combined EKB can be produced by combining the sequences of key data of the received sub-EKB's into a single sequence of key data such that the locations of key data in the sequence correspond to the locations in the tree from top to bottom and from left to right.

Thus, the tag part of the combined EKB becomes 100, 010, 010, 000, 000, 111, 111, 111, 111, and the key part becomes Enc(K010, Kroot), Enc(K011, Kroot), Enc(K110, Kroot), Enc(K111, Kroot). If each block of key data in the key part is represented by, for example, 16 bytes, as described above, then each device in the category trees can detect the locations of the key data that can be processed by the device, and thus can extract the root key from the combined EKB.

In the above example of the process of producing the sub-EKB's and the combined EKB, it is assumed that any category tree does not include a revoked device. The process of producing sub-EKB's and a combined EKB is described below for the case where there is a revoked device.

Figure 58:
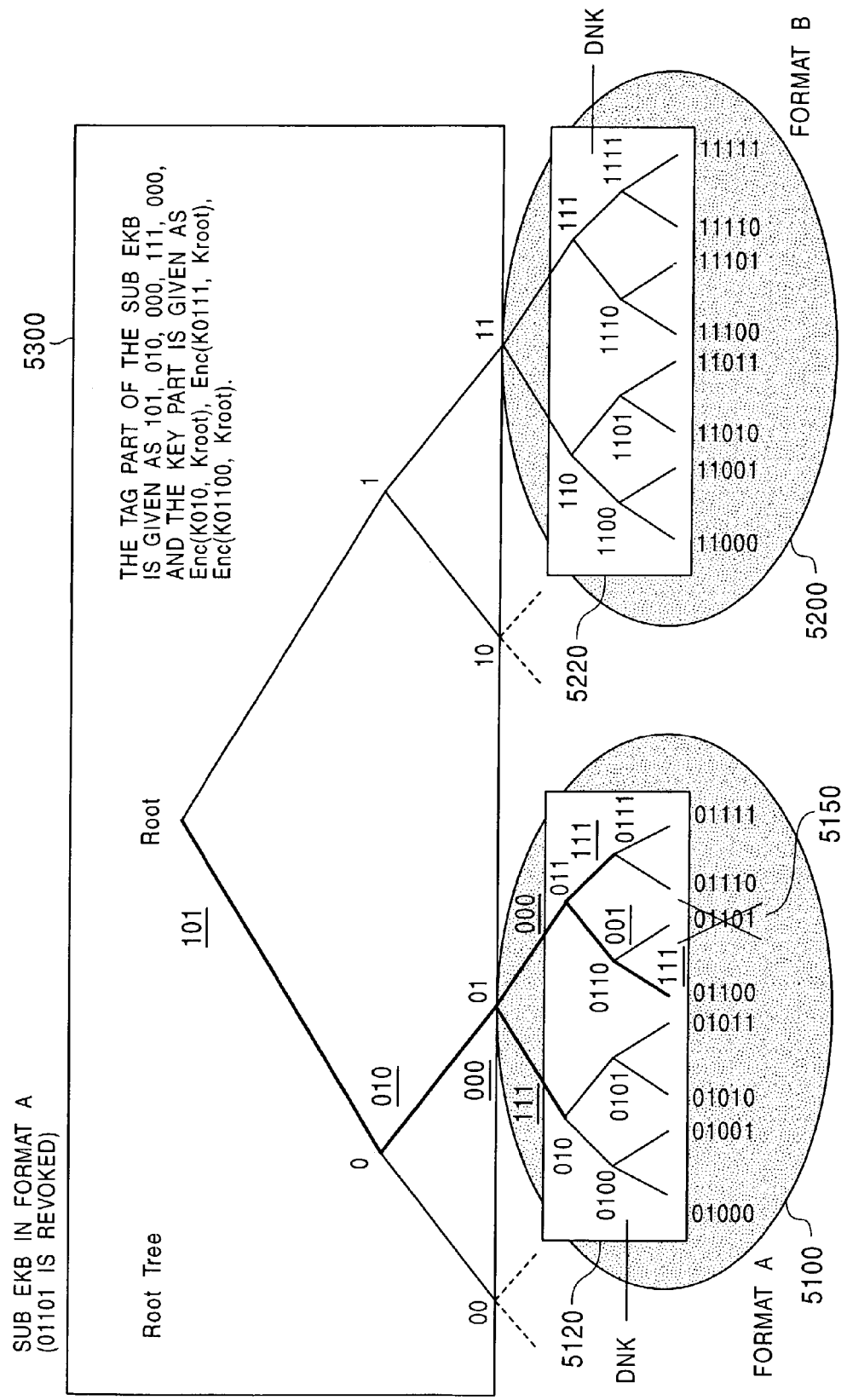
FIG. 58 is a diagram showing a process of producing a sub-EKB in a situation in which there is a device to be revoked, in the information processing system according to the present invention.

FIG. 58 shows the process of producing a sub-EKB when the category tree A (5100) includes a revoked device (01101) 5150. In this case, the sub-EKB is produced as a sub-EKB-(A') that cannot be processed by the revoked device (01101) 5150 but can be processed by the other devices in the category tree A (5100).

In this specific example, the sub-EKB is produced by selecting key data along the paths denoted by bold lines in FIG. 58. Thus, the sub-EKB-(A') produced by the TLCE of the category tree A (5100) includes a tag part consisting of 101, 010, 000, 111, 000, 001, 111, and 111, and a key part consisting of Enc(K010, Kroot), Enc(K0111, Kroot), and Enc(K01100, Kroot). The TLCE of the category tree A (5100) transmits the resultant sub-EKB-(A') to the key distribution center (KDC).

The key distribution center (KDC) produces a combined EKB from the sub-EKB-(A') and a sub-EKB-(B) received from the TLCE of the category tree B (5200) (FIG. 56). The process of producing the combined EKB is described below with reference to FIG. 59. The combined EKB is produced such that all devices belonging to the category tree A (5100) except for the revoked device (01101) 5150 and all devices belonging to the category tree B (5200) without exception can extract the root key from the EKB. Basically, the combined EKB can be produced by combining the sequences of key data of the received sub-EKB's into a single sequence of key data such that the locations of key data in the sequence correspond to the locations in the tree from top to bottom and from left to right.

Thus, the tag part of the combined EKB consist of 100, 010, 010,000, 000, 111, 000, 111, 111, 001, 111, and 111, and the key part consists of Enc(K010, Kroot), Enc(K110, Kroot), Enc(K111, Kroot), Enc(K0111, Kroot), and Enc (K01100, Kroot). This combined EKB allows extraction of the root key, for all devices belonging to the category tree A (5100) except for the revoked device (01101) 5150 and for all devices belong to the category tree B (5200) without exception.

(5) Use of EKB

The EKB produced by the key distribution center (KDC) via the process described above is transmitted to the EKB requester.

For example, in the case where the EKB requester is:

[a] a content provider (CP) that provides a content-stored medium such as a CD or DVD, or

[b] a content key is encrypted using the root key that can be extracted from the EKB, and content is encrypted using the content key and distributed. The resultant content can be used only by authorized devices which belong to the specific category and thus can process the EKB.

On the other hand, when the EKB requester is:

[c1] a format holder that provides an acquired EKB to a manufacturer of a storage medium according to a format in which the EKB is stored into the storage medium when it is produced, the produced EKB and the content key encrypted using the root key are provided to the storage medium manufacturer, and storage media on which the EKB and the content key encrypted using the root key are stored are produced by the storage medium manufacturer or the EKB requester itself, and the produced storage media are distributed. In this case, only the devices which belong to the specific category tree and thus can process the EKB can perform encryption and decryption using the EKB stored on the storage medium in the operation recording/reproducing the content.

In the case where the EKB requester is:

[c2] a format holder that provides an acquired EKB to a manufacturer of a recording device according to a format in which the EKB is stored into the recording device when it is produced, the produced EKB and the content key encrypted using the root key are provided to the recording device manufacturer, and recording devices in which the EKB and the content key encrypted using the root key are stored are produced by the recording device manufacturer or the EKB requester itself, and the produced recording devices are distributed. In this case, only the devices which belong to the specific category tree and thus can process the EKB can perform encryption and decryption using the EKB in the operation of recording/reproducing the content.

In the above process, mutual authentication and encryption of transmission data are performed, as required, in communication between entities, EKB requesters, the key distribution center (KDC), and TLCE's. Furthermore, encryption of other messages, writing of signature, and data verification may also be performed. In a case where authentication or cryptographic communication is performed using the public key cryptographic technology, it is required that entities already have their public keys.

Producing an EKB by Simply Combining Sub-EKB's

In the above-described process of producing a combined EKB from sub-EKB's, a sequence of encrypted key data included in the respective sub-EKB's are rearranged such that the locations of key data in the sequence correspond to the locations in the whole tree from top to bottom. A technique of producing a combined EKB by simply combining sub-EKB's produced by TLCE's of category trees into a single EKB without performing rearrangement is described below.

Figure 60:
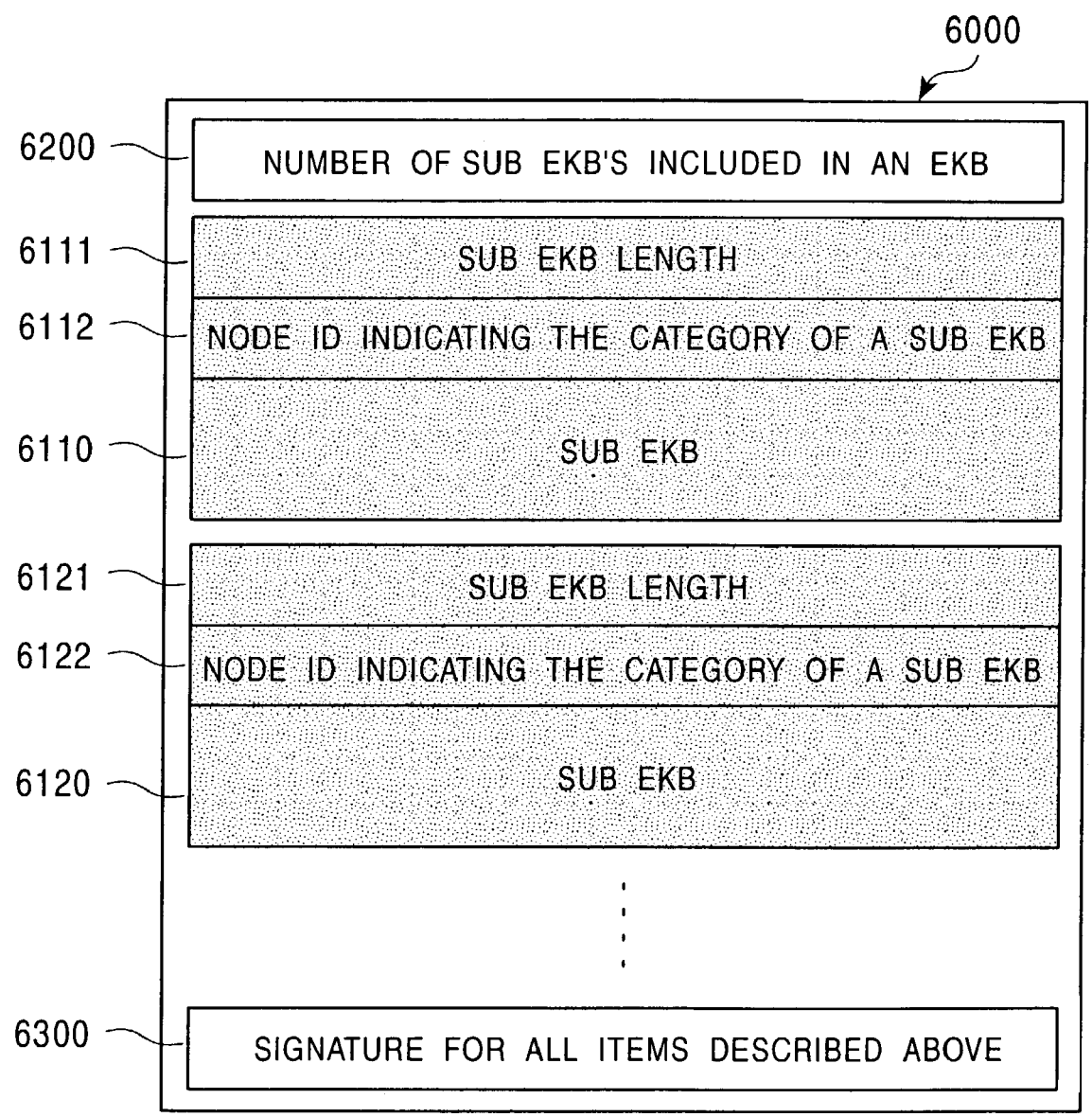
FIG. 60 is a diagram showing a data format of a combined EKB produced from sub-EKB's used in the information processing system according to the present invention.

FIG. 60 shows an example of a combined EKB 6000 produced by simply combining sub-EKB's produced by TLCE's of category trees into a single EKB without performing rearrangement.

In the process of issuing an EKB, the key distribution center (KDC) sends a sub-EKB production request to TLCE's which are entities managing category trees corresponding to an EKB type identification number, in the EKB type definition list, specified by an EKB requester. Sub-EKB's 6110, 6120 and so on received from TLCE's are simply combined together into a single EKB thereby producing a combined EKB 6000. In order that each device belonging to a specific category can select, from the combined EKB 6000, a sub-EKB which corresponds to the specific category the device belongs to and thus which can be processed by the device, data (data length) 6111 (or 6121) indicating the data size of each sub-EKB and data (node ID) 6112 (or 6122) indicating the category corresponding to each sub-EKB are added.

That is, the combined EKB includes, in addition to the selected sub-EKB's, the data indicating the data length of respective sub-EKB storage areas and the node ID's, serving as sub-EKB identification data, of the respective category trees corresponding to the sub-EKB's. Furthermore, information indicating the number of sub-EKB's included in the combined EKB is described in the header 6200. Still furthermore, a signature 6300 is produced (by a certificate authority or the like) in accordance with the data of the combined EKB and added thereto.

Figure 61:
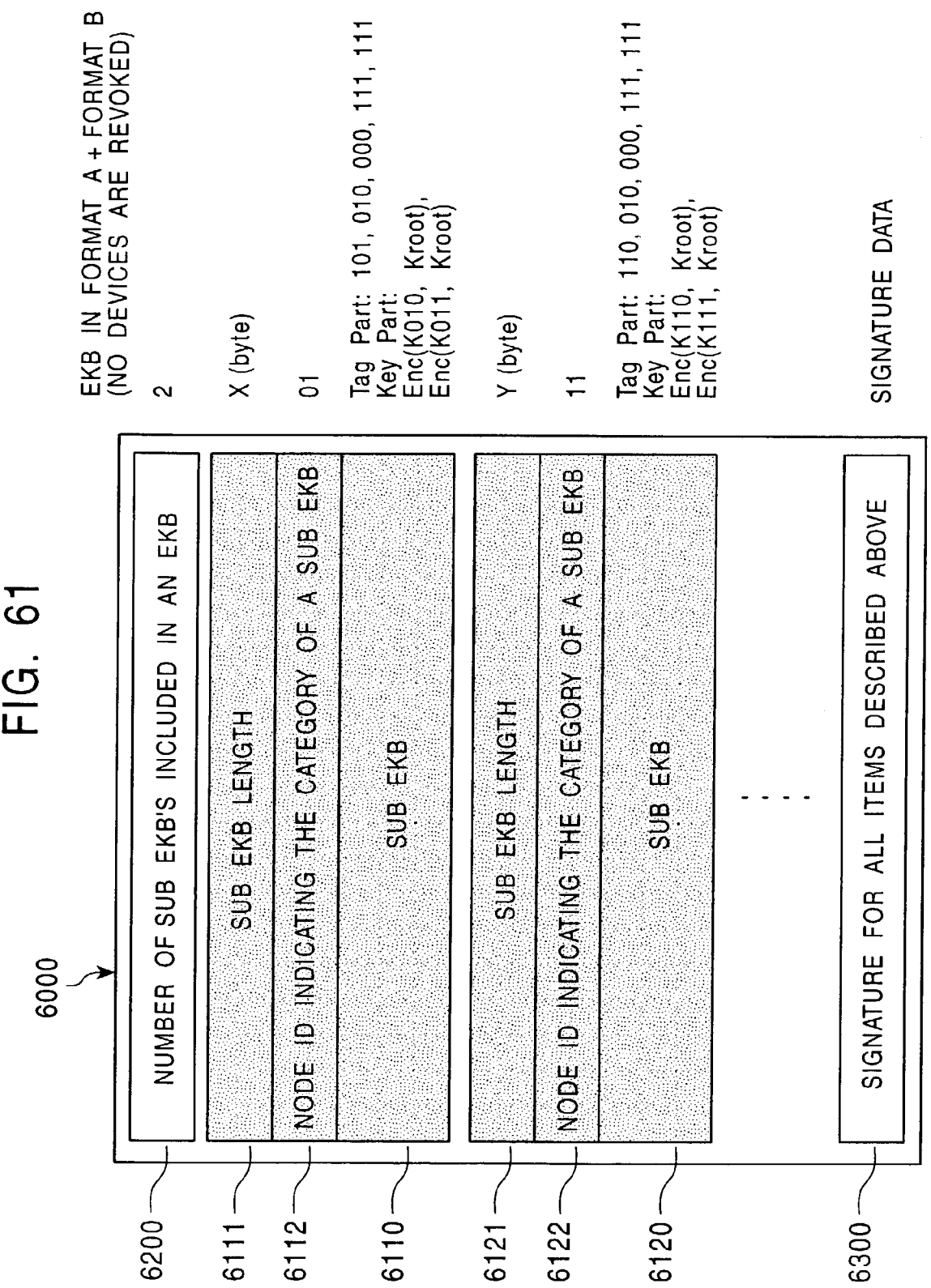
FIG. 61 is a diagram showing a data format of a combined EKB produced from sub-EKB's used in the information processing system according to the present invention.

FIG. 61 shows a combined EKB 6000 produced in the manner described above with reference to FIG. 57. A sub-EKB described in a sub-EKB field 6110 is exactly the same as the sub-EKB-(A) produced by the TLCE of the category tree A described above with reference to FIG. 55, wherein the tag part thereof consists of 101, 010,000, 111, and 111, and the key part consists of Enc(K010, Kroot) and Enc(K011, Kroot). A sub-EKB described in a sub-EKB field 6120 is exactly the same as the sub-EKB-(B) produced by the TLCE of the category tree B described above with reference to FIG. 56, wherein the tag part thereof consists of 110, 010,000, 111, and 111, and the key part consists of Enc(K110, Kroot) and Enc(K111, Kroot).

Figure 59:
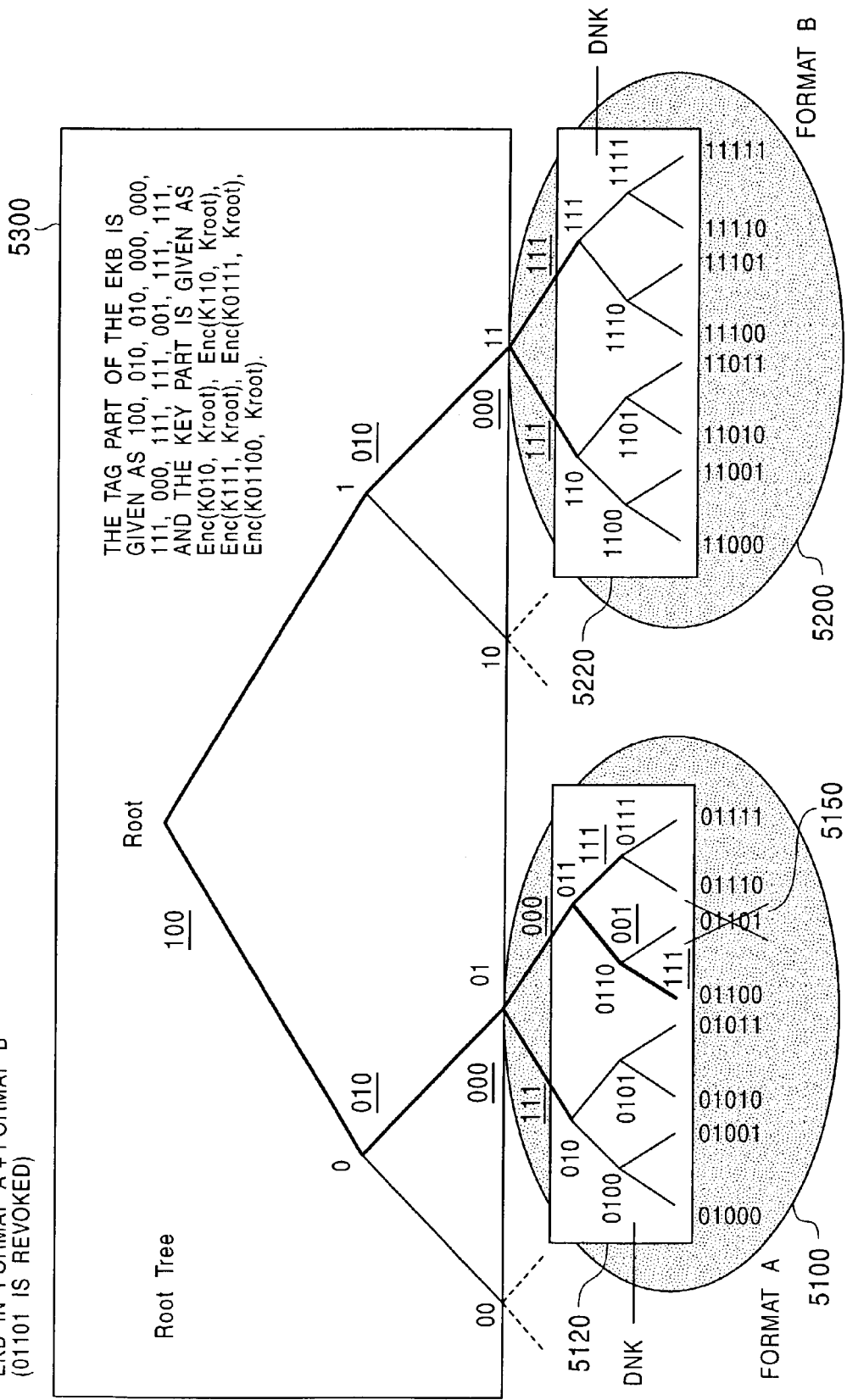
FIG. 59 is a diagram showing a process of producing an EKB by combining sub-EKB's in a situation in which there is a device to be revoked, in the information processing system according to the present invention.
Figure 62:
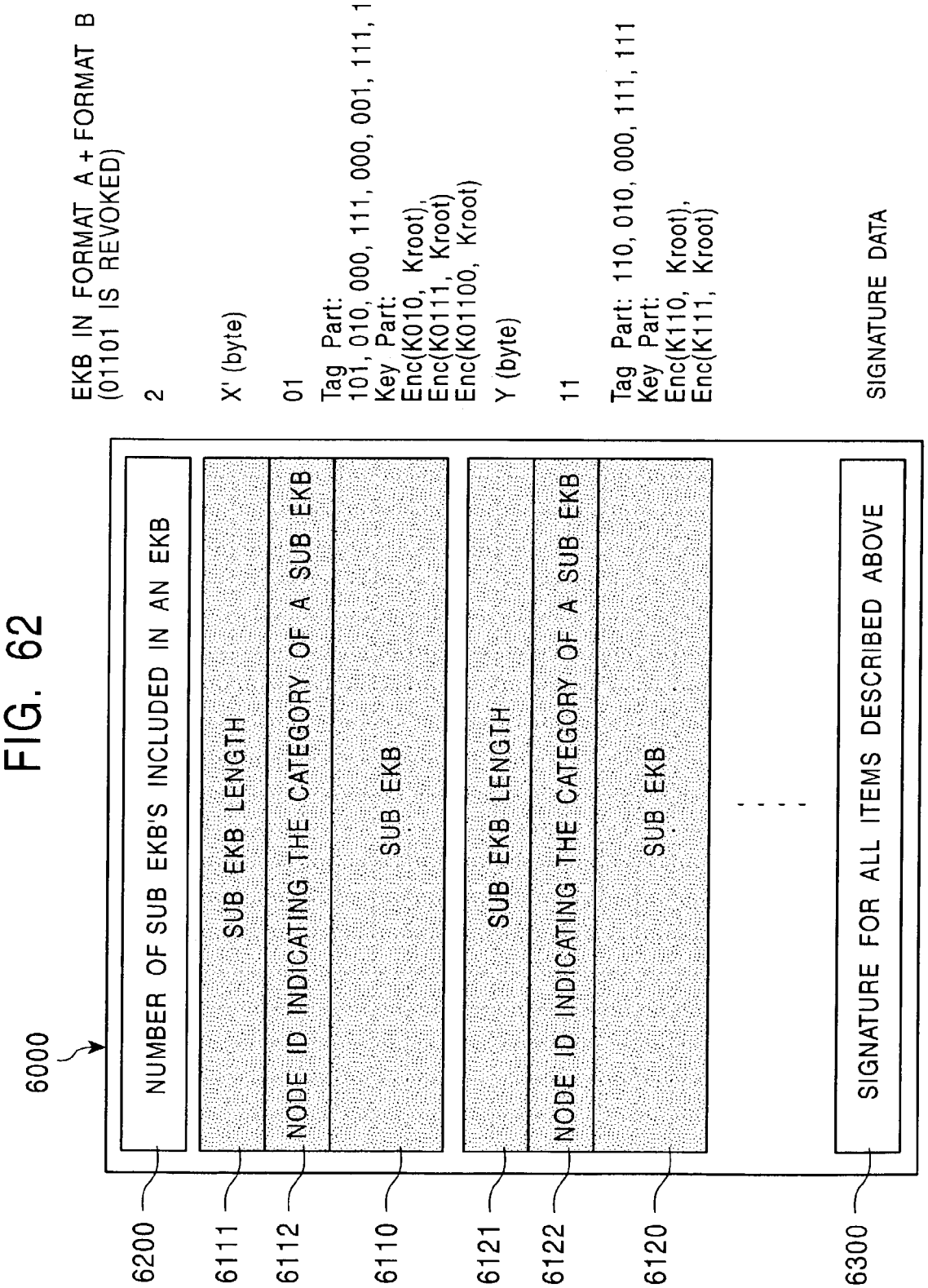
FIG. 62 is a diagram showing a data format of a combined EKB which is produced from sub-EKB's in a situation in which there is a device to be revoked, in the information processing system according to the present invention.

FIG. 62 shows the data structure of a combined EKB 6000 produced from sub-EKB's, shown in FIGS. 58 and 59, produced in a situation in which there is a revoked device. A sub-EKB described in a sub-EKB field 6110 is exactly the same as sub-EKB-(A') produced by the TLCE of the category tree A described above with reference to FIG. 58, wherein the tag part thereof consists of 101, 010,000, 111, 000, 001, 111, and 111, and the key part consists of Enc(K010, Kroot), Enc(K0111, Kroot), and Enc(K01100, Kroot). A sub-EKB described in a sub-EKB field 6120 is exactly the same as sub-EKB-(B) produced by the TLCE of the category tree B, including no revoked device, described above with reference to FIG. 56, wherein the tag part thereof consists of 110, 010,000, 111, and 111, and the key part consists of Enc(K110, Kroot) and Enc(K111, Kroot).

The combined EKB described above makes it possible for each device belonging to a specific category to select a sub-EKB corresponding to that specific category and process (decrypt) the selected sub-EKB. This allows a sub-EKB to be produced for each category (TLCE) using an absolutely arbitrary cryptographic algorithm or key length. In other words, each TLCE can determine the cryptographic algorithm and the key length without being influenced by the other categories.

The key distribution center (KDC) does not need to disassemble and reassemble the tag parts and the key data parts of sub-EKB's received from respective TLCE's, and thus the complexity of the process is eased.

When a device acquires an EKB produced according to the present scheme, the device can detect an sub-EKB corresponding to a category to which the device belongs, and can extract a root key by processing the sub-EKB in accordance with a specific procedure determined by a TLCE managing the device. It is not needed to know the procedures determined by the TLCE's of the other categories. It is also not needed to describe keys in a sub-EKB such that the keys have a fixed length, and, theoretically, the key length may be set to any arbitrary value.

Revocation (1)

A revocation process performed in a case where an EKB usable in common by a plurality of categories is described below. First, a revocation process is described which may occur in a situation in which encrypted content is acquired from the outside via a network or a medium, a content key is decrypted using a key extracted from an EKB, and finally the content is decrypted.

Figure 63:
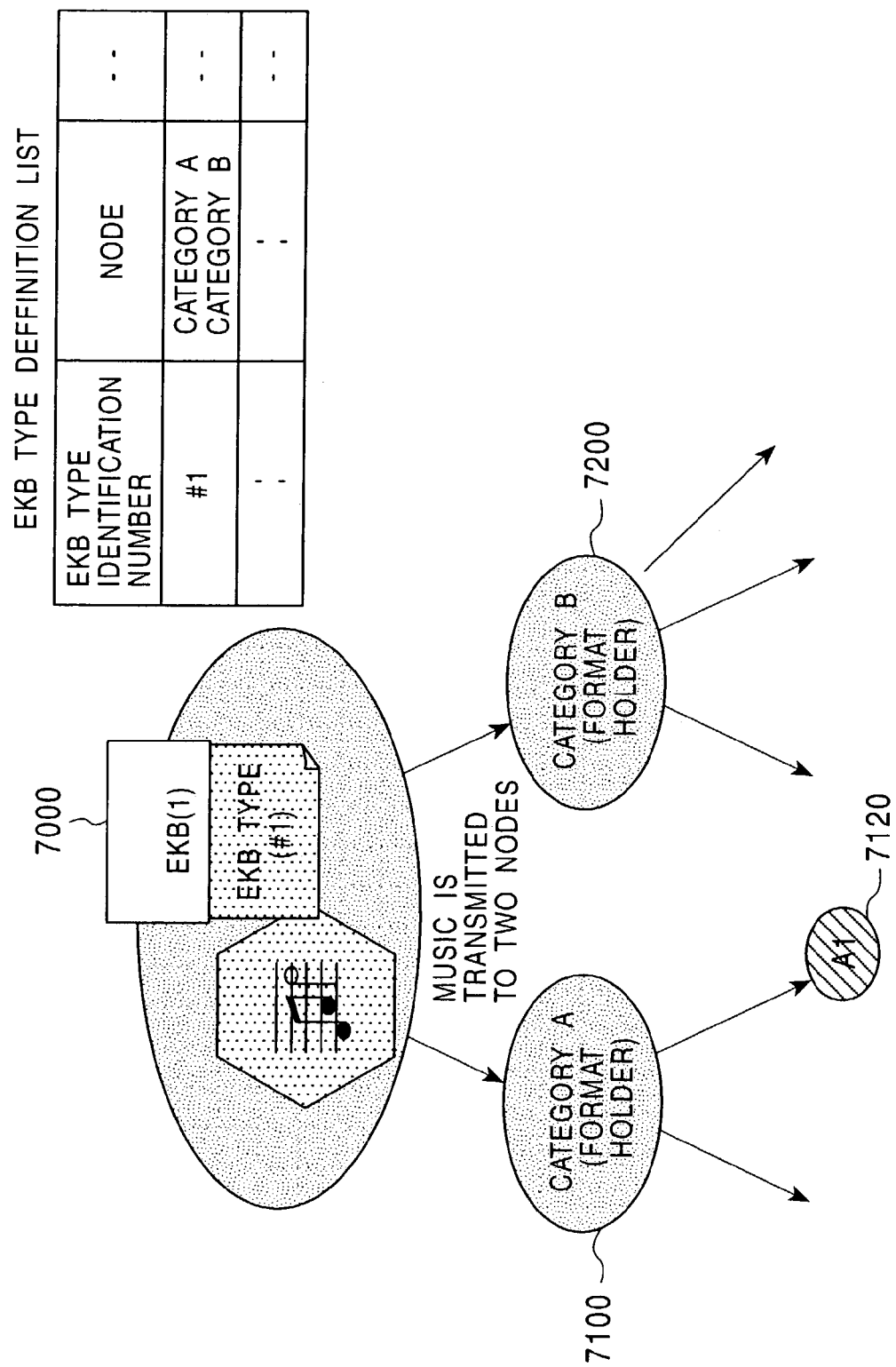
FIG. 63 is a diagram showing a revocation process in data distribution system in the information processing system according to the present invention.

Referring to FIG. 63, an EKB 7000 is assumed to be used in common by a category tree A (7100) and a category tree B (7200). The EKB 7000 used in common by the category tree A (7100) and the category tree B (7200) is assigned an EKB type identification number #1 in the EKB type definition list.

In such a situation, a content provider provides content encrypted using a content key via a network or a medium, and devices belong to a category tree A (7100) and devices belonging to a category tree B (7200) use the content by extracting a root key from the EKB 7000, acquiring the content key by performing decryption using the root key, and finally decrypting the encrypted content using the content key.

In this situation, if breakage of secrecy of key data or another unauthorized state of a device A1 (7120) belonging to the category tree A (7100) is detected, the device A1 (7120) is revoked.

To perform revocation, the TLCE of the category tree A (7100) first issues a tree change notification (FIG. 53) to the key distribution center (KDC). In accordance with the received tree change notification, the key distribution center (KDC) sends a notification to TLCE's and EKB requesters managed by the key distribution center (KDC). The notification includes only information indicating that the tree change notification has been received, and renewal of the EKB type definition list is not performed at this point of time.

The tree change notification issued in response to revocation may be sent only to entities of EKB requesters using the EKB that can be processed by the category tree in which revocation occurs, or further to category entities that manage other category trees using the same EKB as that used by the category tree in which revocation occurs. In order to make it possible to perform the above process, the key distribution center (KDC) holds a list of users of already-issued EKB's, in which EKB requesters using specific EKB types and corresponding EKB type identification numbers are listed.

A content provider, which provides content to devices in the category tree in which revocation has been performed and which is also an EKB requester in this situation, requests the key distribution center (KDC) to produce an EKB renewed such that only devices other than the revoked device can process the EKB. In this specific case, the content provider behaving as the EKB requester in such a situation specifies the EKB type identification number #1, indicating the EKB type that is used in common by the category tree A (7100) and the category tree B (7200). Thereafter, the EKB requester produces a new root key and sends it to the KDC, or alternatively, the EKB requester requests the KDC to produce a new root key.

In accordance with the specified EKB type identification number #1, the key distribution center (KDC) searches the EKB type definition list to detect nodes of relating category trees and requests TLCE's of category trees A (7100) and B (7200) corresponding to the detected nodes to produce a sub-EKB from which authorized devices can extract a new root key.

In response to the request, each of TLCE's of the category trees A (7100) and B (7200) produces a sub-EKB. In this specific case, in the category tree A (7100), a sub-EKB-(A) is produced such that only devices other than the revoked device A1 (7120) can extract a new root key from the sub-EKB-(A).

In the category tree B (7200), if there is no revoked device, a sub-EKB-(B) is produced such that all devices belonging to the category B (7200) can extract a new root key from the sub-EKB-(B) and the resultant sub-EKB-(B) is transmitted to the key distribution center (KDC).

The key distribution center (KDC) produces a combined EKB from the sub-EKB's received from the respective TLCE's in the above-described manner, and transmits the resultant EKB to the EKB requester (content provider).

The EKB requester (content provider) distributes content using the new EKB received from the key distribution center (KDC). More specifically, the EKB requester (content provider) encrypts the content using a content key and encrypts the content key using the root key extracted by decrypting the EKB, and distributes the encrypted content and content key. The devices belonging to the category tree A (7100) and the devices belonging to the category tree B (7200) can use the content by extracting the root key from the EKB, extracting the content key by performing decryption using the root key, and finally decrypting the encrypted content using the content key. However, the revoked device A1 (7120) in the category tree A (7100) cannot process the renewed EKB and thus cannot use the content.

In the example described above, the key distribution center (KDC) does not renew the EKB type definition list at the point of time at which the tree change notification is received from the TLCE. Alternatively, at the point of time at which the tree change notification is received, the key distribution center (KDC) may renew the EKB and the EKB type definition list in accordance with the tree change notification, and may transmit the renewed EKB type definition list to the EKB requesters and TLCE's.

Revocation (2)

A revocation process is now described which may occur in a situation in which various contents are encrypted and stored by a user into a recording device or a storage medium in which an EKB is stored, wherein a root key extracted from the EKB stored in the recording device or the storage medium is used as a key needed in encryption and decryption. This type of recording device or storage medium is said to be of a self-recording type.

Referring to FIG. 64, an EKB 7000 is assumed to be used in common by a category tree A (7100) and a category tree B (7200). That is, the EKB for common use is stored in recording devices or the storage media used in common in the category tree A (8100) and the category tree B (8200), and users record and play back content by means of encryption and decryption using the EKB. The EKB 8000 used in common by the category tree A (8100) and the category tree B (8200) is assigned an EKB type identification number #1 in the EKB type definition list.

In this situation, if breakage of secrecy of key data or another unauthorized state of a device A1 (8120) belonging to the category tree A (8100) is detected, the device A1 (8120) is revoked.

To perform revocation, the TLCE of the category tree A (8100) first issues a tree change notification (FIG. 53) to the key distribution center (KDC). In accordance with the received tree change notification, the key distribution center (KDC) sends a notification to the TLCE's managed by the key distribution center (KDC) and to associated EKB requesters. The notification includes only information indicating that the tree change notification has been received, and renewal of the EKB type definition list is not performed at this point of time.

In order to prevent contents from being further used by the revoked device A1 (8120), the TLCE of the category tree in which revocation has occurred requests the key distribution center (KDC) to produce an EKB renewed such that only devices other than the revoked device can process the EKB. In this situation, this TLCE behaves as an EKB requester. In this specific case, the TLCE behaving as the EKB requester in such a situation specifies the EKB type identification number #1 indicating the EKB type that is used in common by the category tree A (8100) and the category tree B (8200). Thereafter, the EKB requester produces a new root key and sends it to the KDC, or alternatively, the EKB requester requests the KDC to produce a new root key.

In accordance with the specified EKB type identification number #1, the key distribution center (KDC) searches the EKB type definition list to detect nodes of relating category trees and requests TLCE's of category trees A (8100) and B (8200) corresponding to the detected nodes to produce a sub-EKB from which authorized devices can extract a new root key.

In response to the request, each of the TLCE's of the category trees A (8100) and B (8200) produces a sub-EKB. In this specific case, in the category tree A (8100), a sub-EKB-(A) is produced such that only devices other than the revoked device A1 (8120) can extract a new root key from the sub-EKB-(A). In the category tree B (8200), if there is no revoked device, a sub-EKB-(B) is produced such that all devices belonging to the category B (8200) can extract a new root key from the sub-EKB-(B), and the resultant sub-EKB-(B) is transmitted to the key distribution center (KDC).

The key distribution center (KDC) produces a combined EKB from the sub-EKB's received from the respective TLCE's in the above-described manner, and transmits the resultant EKB to the respective TLCE's (format holders).

Each TLCE (format holder) sends the new EKB received from the key distribution center (KDC) to devices to update the EKB stored in the devices. The devices belonging to the category tree A (8100) and the devices belonging to the category tree B (8200) can record new content into the devices using, in the encryption/decryption process, the root key extracted from the updated EKB. The recorded content encrypted using the new EKB can be decrypted only when the corresponding EKB is applied, and thus the revoked device cannot use the content.

The present invention has been described in detail above with reference to particular embodiments. It will be apparent to those skilled in the art that various modifications and substitution to those embodiments may be made in the embodiment chosen for illustration without departing from the spirit and scope of the invention. That is, the embodiments have been described above by way of example and not limitation. The scope of the invention is to be determined solely by the appended claims.

In the information processing system and method according to the present invention, as described above, a key tree is produced so as to include a plurality of subtrees serving as category trees that are grouped in accordance with categories and managed by category entities. An enabling key block (EKB) is produced so as to include data produced by selecting a path in the key tree and encrypting a higher-level key in the selected path using a lower-level key in the selected path. The resultant enabling key block (EKB) is provided to a device, wherein issuing of EKBs is managed on the basis of the an EKB type definition list representing the correspondence between an EKB type identifier and one or more identification data identifying one or more category trees that can process an EKB of an EKB type identified by the EKB type identifier. This makes it possible for an EKB requester, which issues an EKB production request, to easily select a category to which the EKB is to be applied.

Furthermore, in the information processing system and method according to the present invention, when a requester issues a request for production of an enabling key block (EKB), the requester may produce a root key or may request the key distribution center to produce a root key. This results in a reduction in a job performed by the requester. When the key distribution center produces an EKB, the key distribution center requests a category entity serving as a category manager to produce a sub-EKB. Thus, the EKB can be produced and managed in a highly efficient manner.

Furthermore, in the information processing system and method according to the present invention, in which a key tree is produced so as to include a plurality of sub-trees serving as category trees that are grouped in accordance with categories and managed by category entities, an enabling key block (EKB) is produced so as include data produced by selecting a path in the key tree and encrypting a higher-level key in the selected path using a lower-level key in the selected path. The resultant enabling key block (EKB) is provided to a device. The enabling key block (EKB) stored in the information storage medium may have the form of a combined EKB produced by combining sub enabling key blocks (sub-EKBs) that can be decrypted in respective sub trees of the key tree. The key data included in the combined EKB may be stored in a fixed-length data field. This makes it possible for each device to decrypt the EKB, even in a case where sub-EKBs based on various different algorithms are combined into the EKB.

Furthermore, in the information processing system and method according to the present invention, in which a key tree is produced so as to include a plurality of sub-trees serving as category trees that are grouped in accordance with categories and managed by category entities, an enabling key block (EKB) is produced so as include data produced by selecting a path in the key tree and encrypting a higher-level key in the selected path using a lower-level key in the selected path. The resultant enabling key block (EKB) is provided to a device. The EKB may have the form of a combined EKB produced by combining sub enabling key blocks (sub-EKBs) that can be decrypted in respective sub trees of the key tree such that the sub enabling key blocks (sub-EKBs) are stored in the combined EKB while maintaining original key arrangements in the respective sub enabling key blocks (sub-EKBs) Sub-EKB identification data and data indicating the data length of a sub EKB storage area corresponding to each sub-EKB are added to the combined EKB. This makes it possible for each device to decrypt the EKB, even in the case where sub-EKBs based on various different algorithms are combined into the EKB.

The invention claimed is:

1. An information processing system, comprising:
   a key tree including a plurality of leaves, a root, and a plurality of nodes existing in paths from the plurality of leaves to the root;
   a plurality of devices assigned to at least some of the leaves;
   a plurality of keys assigned to the root, to at least some of the leaves and to at least some of the nodes;
   an enabling key block (EKB) including encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path, the EKB being provided to the selected device;
   an EKB requester operable to issue an EKB production request selected from the group consisting of
      (i) a first EKB production request to produce the EKB including an already-produced root key, and
      (ii) a second EKB production request to produce a new root key and to produce the EKB including the new root key;
   a key distribution center (KDC) operable to receive the EKB production request, to generate the EKB including the already-produced root key in response to the first EKB production request, and to generate the EKB including the new root key in response to the second EKB production request;
   at least one category entity, wherein the key tree further includes a plurality of sub-trees serving as category trees that are grouped in accordance with categories and managed by the at least one category entity; and
   the EKB requester is operable to select an EKB type identifier for identifying an EKB type, the EKB type identifier being selected on the basis of an EKB type definition list representing a correspondence between the EKB type identifier and identification data capable of identifying at least one of the category trees that is operable to process EKBs of the EKB type identified by the EKB type identifier, and to output, as the first or the second EKB production request, the EKB production request including the selected EKB type identifier,
   wherein the EKB type definition list is acquired from a storage means or an accessible site on a network.

2. An information processing method for use in a system having a key tree, the key tree including a plurality of leaves, a root, and a plurality of nodes existing in paths from the leaves to the root, wherein the key tree further includes a plurality of sub-trees serving as category trees that are grouped in accordance with categories and managed by at least one category entity, the method comprising:
   assigning a plurality of devices to at least some of the leaves;
   assigning a plurality of keys to the root, to at least some of the leaves, and to at least some of the nodes;
   outputting an enabling key block (EKB) production request to a key distribution center (KDC), the EKB production request being selected from the group consisting of:
      (i) a first EKB production request to produce an EKB including an already-produced root key, and (ii) a second EKB production request to produce a new root key and to produce the EKB including the new root key;

producing the EKB at the KDC, the EKB including encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path, the EKB also including the already-produced root key in the case of the first EKB production request or the new root key in the case of the second EKB production request;

providing the EKB to the selected device;

selecting an EKB type identifier for identifying an EKB type, the EKB type identifier being selected based on an EKB type definition list representing a correspondence between the EKB type identifier and identification data capable of identifying at least one of the category trees that is operable to process EKBs of the EKB type identified by the EKB type identifier;

outputting, as the first or the second EKB production request, the EKB production request including the selected EKB type identifier; and acquiring the EKB type definition list from a storage means or an accessible site on a network.

3. An information processing system, comprising:

a key tree including a plurality of leaves, a root, and a plurality of nodes existing in paths from the plurality of leaves to the root;

a plurality of devices assigned to at least some of the leaves;

a plurality of keys assigned to the root, to at least some of the leaves, and to at least some of the nodes;

an enabling key block (EKB) including encrypted data produced by selecting one of the paths in the key tree and encrypting a higher-level key in the selected path using a lower-level key in the selected path such that the encrypted data can be decrypted only by a selected one of the devices capable of using a node key set corresponding to the selected path, the EKB being provided to the selected device, wherein the EKB is a combined EKB having key data, the combined EKB being produced by combining sub-enabling key blocks (sub-EKBs) that can be decrypted in at least one sub-tree of the key tree, the key data being stored in a fixed-length data field.

4. An information processing system according to claim 3, further comprising:

a key distribution center (KDC), wherein the at least one sub-tree comprises a category tree categorized in accordance with one or more categories and managed by a category entity;

each sub-EKB is capable of being processed in accordance with a selected one of the keys, the selected key being associated with one of the leaves or one of the nodes belonging to the category tree; and the KDC is operable to produce the EKB so that the EKB can be processed by the category tree.

5. An information processing system according to claim 3, further comprising:

a key distribution center (KDC);

wherein each sub-EKB has its own algorithm and key data length, and during production of the combined EKB, the KDC stores the key data in the fixed-length data field.

6. An information processing system according to claim 3, further comprising:

a tag, wherein at least part of the key data is encrypted key data, the encrypted key data being produced by encrypting each of the keys assigned to respective ones of the nodes using a lower-level node key or a lower-level leaf key, and the tag indicates the presence or absence of encrypted key data associated with a node or a leaf below and to the left or right of a node location of the encrypted key data stored in the combined EKB.

7. An information processing system according to claim 3, wherein the combined EKB includes a first key as the encrypted key data, the first key corresponding to a node or a leaf of a hierarchical tree reconstructed by selecting one of the paths to form a simplified tree, the simplified tree including, at its lowest level, an endpoint node or an endpoint leaf capable of decrypting the combined EKB and then removing an unnecessary node from the simplified tree.

8. An information processing system according to claim 3, wherein the combined EKB has a key tree structure produced by rearranging encrypted key data included in selected ones of the sub-EKBs in accordance with locations of the nodes or the leaves in the key tree.

9. An information storage medium having information stored thereon, the information comprising:

an enabling key block (EKB);

a key tree including at least one sub-tree serving as a category tree categorized in accordance with a category, the category tree including a plurality of leaves, a root, and a plurality of nodes existing in paths from the leaves to the root;

data identifying an assignment of a plurality of devices to at least one of the leaves; and a plurality of keys assigned to the root, to at least some of the leaves, and to at least some of the nodes;

the enabling key block including encrypted data produced by selecting one of the paths in the key tree and encrypting a higher-level key in the selected path using a lower-level key in the selected path such that the encrypted data can be decrypted only by a selected one of the devices capable of using a node key set corresponding to the selected path, the EKB having a form of a combined EKB including key data, the combined EKB being produced by combining sub-enabling key blocks (sub-EKBs) that can be decrypted in the at least one sub-tree of the key tree, and the key data being stored in a fixed-length data field.

10. An information storage medium according to claim 9, wherein each sub-EKB has its own algorithm and key data length, and a key data storage area of the combined EKB has a fixed length.

11. An information processing method for use in a system having a key tree, the key tree including a plurality of leaves, a root, a plurality of sub-trees, and a plurality of nodes existing in paths from the leaves to the root, the method comprising:

assigning a plurality of devices to at least some of the leaves;

assigning a plurality of keys to the root, to at least some of the leaves, and to at least some of the nodes;

providing a plurality of sub-enabling key blocks (sub-EKBs);

combining the sub-EKBs to produce an EKB having the form of a combined EKB that can be decrypted in selected sub-trees of the key tree, the EKB including encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path, the EKB also including key data stored in a fixed-length data field; and providing the EKB to the selected device.

12. An information processing method according to claim 11, wherein the plurality of sub-trees are category trees grouped in accordance with categories and managed by category entities, the EKB is produced by a key distribution center (KDC) based on the sub-EKBs, and the EKB is capable of being processed in common by the category trees, the method further comprising:

producing the sub-EKBs using the category entities, the sub-EKBs being capable of being processed in accordance with one of the keys which is related to a selected one of the leaves or to a selected one of the nodes belonging to a selected one of the category trees.

13. An information processing method according to claim 12, wherein:

each of the sub-EKBs has its own algorithm and key data length; and in producing the combined EKB based on the sub-EKBs, the KDC stores the key data in the fixed-length data field.

14. An information processing method according to claim 11, wherein the EKB further includes:

encrypted key data produced by encrypting the keys assigned to the nodes of the key tree using a lower-level node key or a lower-level leaf key; and a tag indicating the presence or the absence of additional encrypted key data at a chosen node or a chosen leaf below and to the left or right of a node location of the encrypted key data stored in the EKB.

15. An information processing method according to claim 11, wherein the EKB further includes a first key having encrypted key data, the first key corresponding to a node or a leaf of a hierarchical tree reconstructed by selecting a path forming a simplified tree, the simplified tree including, at its lowest level, an endpoint node or an endpoint leaf that is capable of decrypting the EKB and then removing an unnecessary node from the simplified tree.

16. An information processing method according to claim 11, wherein the combined EKB has a key tree structure produced by rearranging encrypted key data included in selected ones of the sub-EKBs in accordance with locations of the nodes or the leaves in the key tree.

17. A recording medium recorded with a computer program for producing an enabling key block (EKB) in a system having a key tree, the key tree including a plurality of leaves, a root, sub-trees, and a plurality of nodes existing in paths from the leaves to the root, the computer program comprising:

assigning a plurality of devices to at least some of the leaves;

assigning a plurality of keys to the root, to at least some of the leaves, and to at least some of the nodes;

providing a plurality of sub-enabling key blocks (sub-EKBs);

combining the sub-EKBs to produce an EKB having the form of a combined EKB that can be decrypted in selected sub-trees of the key tree, the EKB including encrypted data produced by selecting one of the paths in the key tree and encrypting a higher-level key in the selected path using a lower-level key in the selected path such that the encrypted data can be decrypted only by a selected one of the plurality of devices capable of using a node key set corresponding to the selected path, the EKB also including key data stored in a fixed-length data field; and providing the EKB to the selected device.

* * * * *